US012812255B2

(12) United States Patent
Mikawa et al.

(10) Patent No.: US 12,812,255 B2
(45) Date of Patent: Nov. 24, 2026

(54) CAPTURE CONTROL APPARATUS, CAPTURE CONTROL METHOD, AND IMAGE CAPTURE SYSTEM FOR CONTROLLING OPERATION OF A PLURALITY OF IMAGE CAPTURE APPARATUSES

(71) Applicant: CANON KABUSHIKI KAISHA, Tokyo (JP)

(72) Inventors: Atsushi Mikawa, Tokyo (JP); Tomohiro Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 18/891,098

(22) Filed: Sep. 20, 2024

(65) Prior Publication Data

US 2025/0113106 A1 Apr. 3, 2025

(30) Foreign Application Priority Data

Sep. 28, 2023 (JP) ................................ 2023-168870

(51) Int. Cl.
*H04N 23/695* (2023.01)
*H04N 23/661* (2023.01)
(Continued)

(52) U.S. Cl.
CPC ......... *H04N 23/695* (2023.01); *H04N 23/661* (2023.01); *H04N 23/67* (2023.01); *H04N 23/69* (2023.01); *H04N 23/73* (2023.01)

(58) Field of Classification Search
CPC .... H04N 23/695; H04N 23/661; H04N 23/67; H04N 23/69; H04N 23/73; H04N 23/662; H04N 23/698; H04N 23/90
See application file for complete search history.

(56) References Cited

U.S. PATENT DOCUMENTS 8,421,870 B2 * 4/2013 Kang .................... H04N 23/90 348/218.1
12,046,041 B2 * 7/2024 Kaleko ............... G06V 40/103
(Continued)

FOREIGN PATENT DOCUMENTS

JP 2017168885 A 9/2017
JP 2018107553 A 7/2018
(Continued)

OTHER PUBLICATIONS

The above foreign patent documents were cited in the Jun. 2, 2025 Japanese Office Action, which is enclosed without an English Translation, that issued in Japanese Patent Application No. 2023-168870.

*Primary Examiner* — Padma Haliyur

(74) *Attorney, Agent, or Firm* — Cowan, Liebowitz & Latman, P.C.

(57) ABSTRACT

Disclosed is a capture control apparatus that controls capture directions and angles of view of two or more sub cameras, among a plurality of cameras including a main camera and the sub cameras, based on roles set on the sub cameras and on a subject of interest and an angle of view of the main camera. If it is determined that the main camera satisfies a predetermined condition, the apparatus selects at least one of the sub cameras, and changes content of control for the selected sub camera so as to track and capture the subject of interest of the main camera under a setting different from a setting of the main camera.

32 Claims, 28 Drawing Sheets

(51) Int. Cl.
*H04N 23/67* (2023.01)
*H04N 23/69* (2023.01)
*H04N 23/73* (2023.01)

(56) References Cited

U.S. PATENT DOCUMENTS

2009/0309973 A1* 12/2009 Kogane .................. H04N 7/185
348/E7.085
2015/0116502 A1* 4/2015 Um ......................... G06T 7/292
348/169
2016/0227128 A1* 8/2016 Um .................. G08B 13/19641
2017/0223261 A1* 8/2017 Shimizu ................. G03B 13/36
2018/0332218 A1* 11/2018 Yoshimura ............. H04N 23/90
2019/0230269 A1* 7/2019 Saito ................ G08B 13/19617
2020/0364848 A1* 11/2020 Fujita .................... G06T 7/0002
2021/0152731 A1* 5/2021 Wakamatsu ........... H04N 23/61
2021/0185221 A1* 6/2021 Shimauchi ........... H04N 23/611
2021/0258504 A1* 8/2021 Omori ................. G06F 3/04845
2021/0266451 A1* 8/2021 Takahashi .............. H04N 23/90
2021/0314497 A1* 10/2021 Nemeth ................. H04N 23/90
2022/0067917 A1* 3/2022 Ohya ........................ G06T 1/60
2023/0116612 A1* 4/2023 Kato .................... H04N 23/662
348/211.3
2025/0008223 A1* 1/2025 Kang ................... H04N 5/2628

FOREIGN PATENT DOCUMENTS

JP 2020025248 A 2/2020
JP 2020182075 A 11/2020

* cited by examiner

FIG. 3

| ROLE | SUB CAMERA ROLE (CAMERA_ROLE) | |
|---|---|---|
| | TRACKING TARGET SUBJECT | ZOOM |
| MAIN FOLLOW | SAME AS MAIN | IN-PHASE WITH MAIN |
| MAIN COUNTER | | ANTIPHASE TO MAIN |
| ASSIST FOLLOW L | DIFFERENT FROM MAIN (LEFT SIDE) | IN-PHASE WITH MAIN |
| ASSIST COUNTER L | | ANTIPHASETO MAIN |
| ASSIST FOLLOW R | DIFFERENT FROM MAIN (RIGHT SIDE) | IN-PHASE WITH MAIN |
| ASSIST COUNTER R | | ANTIPHASE TO MAIN |
| EXPOSURE SHIFT | SAME AS MAIN | IN-PHASE WITH MAIN |
| DIAPHRAGM COUNTER | | |
| WIDE-ANGLE | | |

| ROLE | CONTROL OF SUB CAMERA | |
|---|---|---|
| | TRACKING TARGET SUBJECT | ZOOM |
| MAIN FOLLOW | SAME AS MAIN | IN-PHASE WITH MAIN |
| MAIN COUNTER | SAME AS MAIN | OPPOSITE PHASE TO MAIN |
| ASSIST FOLLOW | DIFFERENT FROM MAIN (LEFT SIDE) | IN-PHASE WITH MAIN |
| ASSIST COUNTER | DIFFERENT FROM MAIN (LEFT SIDE) | OPPOSITE PHASE TO MAIN |

CAPTURED IMAGE OF OVERHEAD CAMERA 300
(OVERHEAD CAMERA COORDINATE SYSTEM)

CAPTURED IMAGE OF OVERHEAD CAMERA 300

COORDINATE TRANSFORMATION VIEW OF CAPTURED IMAGE OF OVERHEAD CAMERA 300

CAPTURE CONTROL APPARATUS, CAPTURE CONTROL METHOD, AND IMAGE CAPTURE SYSTEM FOR CONTROLLING OPERATION OF A PLURALITY OF IMAGE CAPTURE APPARATUSES

BACKGROUND OF THE INVENTION

Field of the Invention

The present invention relates to a capture control apparatus, a capture control method, and an image capture system, and in particular to a technique to control a plurality of image capture apparatuses.

Description of the Related Art

Japanese Patent Laid-Open No. 2020-25248 describes an image capture system in which a plurality of cameras are classified as a main camera and a sub camera, and the sub camera is controlled so as to capture the same subject as the main camera.

The image capture system described in Japanese Patent Laid-Open No. 2020-25248 can perform automatic image capture in which a plurality of cameras are brought into coordination with one another; accordingly, labor can be saved. Meanwhile, there is a risk that appropriate measures cannot be taken on the occurrence of an unexpected change in a capture environment, like in a case where a camera becomes incapable of capturing an expected video due to failure or the like, and in a case where there has been an accident involving a subject.

SUMMARY OF THE INVENTION

In view of the aforementioned problem with conventional techniques, an aspect of the present disclosure realizes automatic measures on the occurrence of an unexpected change in a capture environment in a capture control apparatus and a capture control method that realize automatic image capture in which a plurality of cameras are brought into coordination with each other.

According to an aspect of the present invention, there is provided a capture control apparatus, comprising: one or more processors that execute a program stored in a memory and thereby function as: a control unit configured to control capture directions and angles of view of two or more sub cameras, among a plurality of cameras including a main camera and the sub cameras, based on roles set on the sub cameras and on a subject of interest and an angle of view of the main camera; and a determination unit configured to determine whether the main camera satisfies a predetermined condition, wherein in a case where it has been determined that the main camera satisfies the condition, the control unit selects at least one of the sub cameras, and changes content of control for the selected sub camera so as to track and capture the subject of interest of the main camera under a setting different from a setting of the main camera.

According to another aspect of the present invention, there is provided a capture control method executed by a capture control apparatus, the capture control method comprising: controlling capture directions and angles of view of two or more sub cameras, among a plurality of cameras including a main camera and the sub cameras, based on roles set on the sub cameras and on a subject of interest and an angle of view of the main camera; and determining whether the main camera satisfies a predetermined condition, wherein the controlling includes selecting at least one of the two or more sub cameras in a case where it has been determined that the main camera satisfies the condition, and changing content of control for the selected sub camera so as to track and capture the subject of interest of the main camera under a setting different from a setting of the main camera.

According to a further aspect of the present invention, there is provided a capture control apparatus, comprising: one or more processors that execute a program stored in a memory and thereby function as: a control unit configured to control a capture direction and an angle of view of each of a plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state.

According to another aspect of the present invention, there is provided a capture control method executed by a capture control apparatus, the capture control method comprising: controlling a capture direction and an angle of view of each of a plurality of cameras based on at least roles that have been respectively set on the plurality of cameras; and determining whether a camera in a first state that is not performing an operation associated with the role set thereon exists among the plurality of cameras, wherein the controlling includes selecting at least one of cameras that are included among the plurality of cameras and are other than the camera in the first state in a case where it has been determined that the camera in the first state exists, and changing content of control for the selected sub camera so as to execute image capture that supplements a video to be captured by the camera in the first state.

According to a further aspect of the present invention, there is provided an image capture system, comprising: a capture control apparatus; and a plurality of cameras that are connected to the capture control apparatus in a communication-enabled manner, wherein the capture control apparatus comprises: one or more processors that execute a program stored in a memory and thereby function as: a control unit configured to control capture directions and angles of view of two or more sub cameras, among the plurality of cameras including a main camera and the sub cameras, based on roles set on the sub cameras and on a subject of interest and an angle of view of the main camera; and a determination unit configured to determine whether the main camera satisfies a predetermined condition, wherein in a case where it has been determined that the main camera satisfies the condition, the control unit selects at least one of the sub cameras, and changes content of control for the selected sub camera so as to track and capture the subject of interest of the main camera under a setting different from a setting of the main camera.

According to another aspect of the present invention, there is provided an image capture system, comprising: a capture control apparatus; and a plurality of cameras that are connected to the capture control apparatus in a communication-enabled manner, wherein the capture control apparatus comprises: one or more processors that execute a program stored in a memory and thereby function as: a control unit configured to control a capture direction and an angle of view of each of the plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state.

According to a further aspect of the present invention, there is provided a non-transitory computer-readable medium storing a program for causing a computer to function as a capture control apparatus that comprises: a control unit configured to control capture directions and angles of view of two or more sub cameras, among a plurality of cameras including a main camera and the sub cameras, based on roles set on the sub cameras and on a subject of interest and an angle of view of the main camera; and a determination unit configured to determine whether the main camera satisfies a predetermined condition, wherein in a case where it has been determined that the main camera satisfies the condition, the control unit selects at least one of the sub cameras, and changes content of control for the selected sub camera so as to track and capture the subject of interest of the main camera under a setting different from a setting of the main camera.

According to another aspect of the present invention, there is provided a non-transitory computer-readable medium storing a program for causing a computer to function as a capture control apparatus that comprises: a control unit configured to control a capture direction and an angle of view of each of a plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state.

Further features of the present invention will become apparent from the following description of exemplary embodiments (with reference to the attached drawings).

BRIEF DESCRIPTION OF THE DRAWINGS

FIG. 3 is a diagram showing examples of roles that can be set on a sub camera according to an embodiment.

FIGS. 4B-1 and 4B-2 are flowcharts related to the operations of the capture control apparatus 100 according to the first embodiment.

FIGS. 4D-1 and 4D-2 are flowcharts related to the operations of the capture control apparatus 100 according to the first embodiment.

DESCRIPTION OF THE EMBODIMENTS

Figure 1:
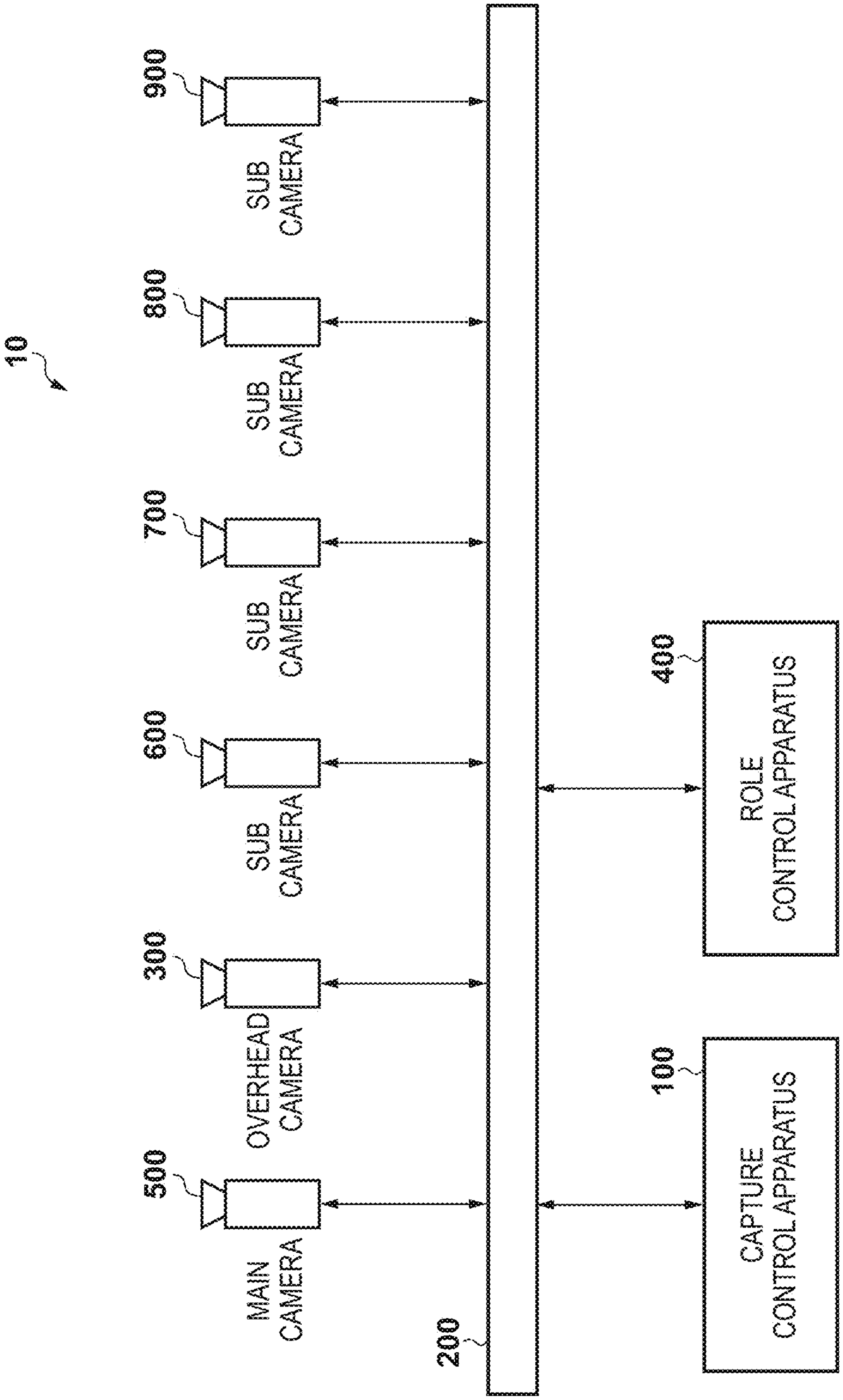
FIG. 1 is a schematic diagram of an image capture system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (Overview of Multi-Camera Image Capture System)

FIG. 1 is a schematic diagram showing an exemplary configuration of a multi-camera image capture system 10 (hereinafter simply referred to as an image capture system) according to the present embodiment. The image capture system 10 includes a plurality of cameras 300, 500, 600, 700, 800, and 900, a capture control apparatus 100, and a role control apparatus 400. The plurality of cameras 300, 500, 600, 700, 800, and 900, the capture control apparatus 100, and the role control apparatus 400 are connected in such a manner that they can perform communication via a communication network 200.

The communication network 200 conforms with a known wired or wireless communication standard, such as the IEEE 802.3 series and the IEEE 802.11 series. Furthermore, each of the plurality of cameras 300, 500, 600, 700, 800, and 900, the capture control apparatus 100, and the role control apparatus 400 include a communication interface that conforms with the standard of the communication network 200.

The camera 300 captures an entirety of a predetermined captured area. The captured area is set as, for example, an area in which subjects to be captured can exist in a studio. Therefore, all of the subjects inside the captured area are captured in a video of the camera 300.

The purpose of the camera 300 is to capture images for detecting subjects to be captured that exist inside the captured area. Therefore, the capture direction and the angle of view of the camera 300 are determined in accordance with the position and the captured area of the camera 300, and are basically fixed during image capture. Also, in order to obtain a captured image of the captured area that has achieved deep focus, the focusing distance may also be basically fixed. Furthermore, it is desirable that the camera 300 captures the entirety of the captured area without an object outside the captured area hiding the captured area. For this reason, here, the camera 300 is placed at a position where an overhead view of the entirety of the captured area is attained. Hereinafter, the camera 300 will be referred to as an overhead camera for distinction from other cameras 400 and 500 whose capture directions and angles of view are not basically fixed during image capture. However, the position of placement of the camera 300 is not limited to a position where an overhead view of the captured area is attained. The operations of the overhead camera 300 can be controlled from the capture control apparatus 100.

The cameras 500, 600, 700, 800, and 900 (hereinafter referred to as cameras 500 to 900) are, for example, PTZ cameras, and the operations thereof, including the capture directions (pan and tilt angles) and angles of view (zooming), can be controlled from an external apparatus. Note that the overhead camera 300 may also be a PTZ camera. It is assumed here that a user of the image capture system controls the operations of the camera 500, and the capture control apparatus 100 controls the operations of other cameras 600 to 900. As the capture control apparatus 100 controls the operations of the cameras 600 to 900 based on the state of the camera 500, the camera 500 and the cameras 600 to 900 will be hereinafter referred to as a main camera and sub cameras, respectively.

In a second embodiment, which will be described later, the main camera 500 is not indispensable. In a case where the main camera 500 does not exist, the capture control apparatus 100 controls the capture direction and the angle of view of each of the sub cameras 600 to 900 in accordance with the content of control which is associated with a role set by the role control apparatus 400 and which is not dependent on the main camera.

The number of the sub cameras is two or more, although it is an arbitrary number and may be large than or smaller than four. Note that the user may directly operate the main camera 500. Also, the cameras 500 to 900 may be configured in such a manner that the capture directions (pan and tilt angles) thereof can be controlled by attaching camera bodies to camera platforms. Furthermore, the cameras 500 to 900 may be configured in such a manner that exchangeable lenses capable of zooming are mounted on the camera bodies.

It is assumed here that an operator is present for the role control apparatus 400 in the present embodiment. Furthermore, an operator (user) may be present also for the capture control apparatus 100, but this operator is not indispensable. The operator of the role control apparatus 400 may be a user of the capture control apparatus 100. A photographer is not necessary for the overhead camera 300 and the sub camera 400 because image capture thereof is controlled by the capture control apparatus 100. It is assumed that an operator or a photographer is present for the main camera 500. Due to the foregoing configuration in which some apparatuses do not require an operator or a photographer, labor can be saved.

Although the illustration of FIG. 1 indicates that all signals are communicated via the communication network 200, for example, video signals and control signals may be communicated using different methods. For example, each of the plurality of cameras 300 and 500 to 900 may supply video signals directly to the capture control apparatus 100 via a cable. The cameras 300 and 500 to 900 and the capture control apparatus 100 include communication circuits corresponding to the standard of video signals. The standard of video signals is, for example, the serial digital interface (SDI) standard, the high-definition multimedia interface (HDMI)® standard, or the like, but is not limited thereto.

The capture control apparatus 100 detects subjects from video signals received from the overhead camera 300. The capture control apparatus 100 determines the capture direction and the angle of view of the sub camera based on the result of detection of the subjects, the state of the main camera 500, and the role set for the sub camera. The capture control apparatus 100 transmits a control command including the determined capture direction and angle of view to the sub cameras 600 to 900. Changing the role setting can change the method of determination on the capture direction and the angle of view of the sub cameras 600 to 900, thereby increasing the degree of freedom in controlling the operations of the sub cameras 600 to 900.

A role control apparatus 400 sets roles and priorities for each of the sub-cameras 600 to 900. As described below, each role is associated with a different control content and has a name representing the control content. Although it is assumed that the priority for each of the sub cameras 600 to 900 is set in advance by taking into account the captured scene, the role to be set for the sub camera, and the capturing position of the sub camera, the priority can be changed by the user at any time. The priority order may also be changed automatically according to the capturing situation and other factors.

In a case where the image capture system 10 is used for applications such as live distribution, a switcher is further connected to the network 200 to select and output one of the videos being captured by the main camera 500 and sub cameras 600 to 900.

The switcher is a selection device that receives video signals from each of the main camera 500 and sub cameras 600 to 900, selects a video from one camera designated by the user, and outputs it as the main video.

The switcher also transmits a control signal (tally information) for tally display on the camera that is capturing the main video, through the network 200. By acquiring the tally information through the network 200, the capture control apparatus 100 can know which of the videos from the main camera 500 and sub cameras 600 to 900 is being selected as the main image.

The tally information is, for example, information in which each of the main camera 500 and sub cameras 600 to 900 is associated with one of "distributing", "previewing", and "standing by". The "distributing" and "previewing" are each associated with one camera, while the "standing by" is associated with the remaining cameras. The "distributing" is associated with the camera that is capturing the main video. The "previewing" is associated with the camera that is capturing a video to be selected as the main video next. Any tally information can be used provided that at least can identify which camera is associated with the "distributing".

As described below, the CPU of the camera to which the "distributing" is associated in the tally information can perform a tally display, for example, turning on a red tally lamp. Note that the tally lamp will not be turned on for the cameras associated with the "standing by" in the tally information. The CPU of the camera associated with "previewing" in the tally information can also perform a tally display turning on a tally lamp of a different color (e.g. green) than when the camera is associated with "distributing", for example.

(Exemplary Functional Configuration of Each Apparatus)

Figure 2:
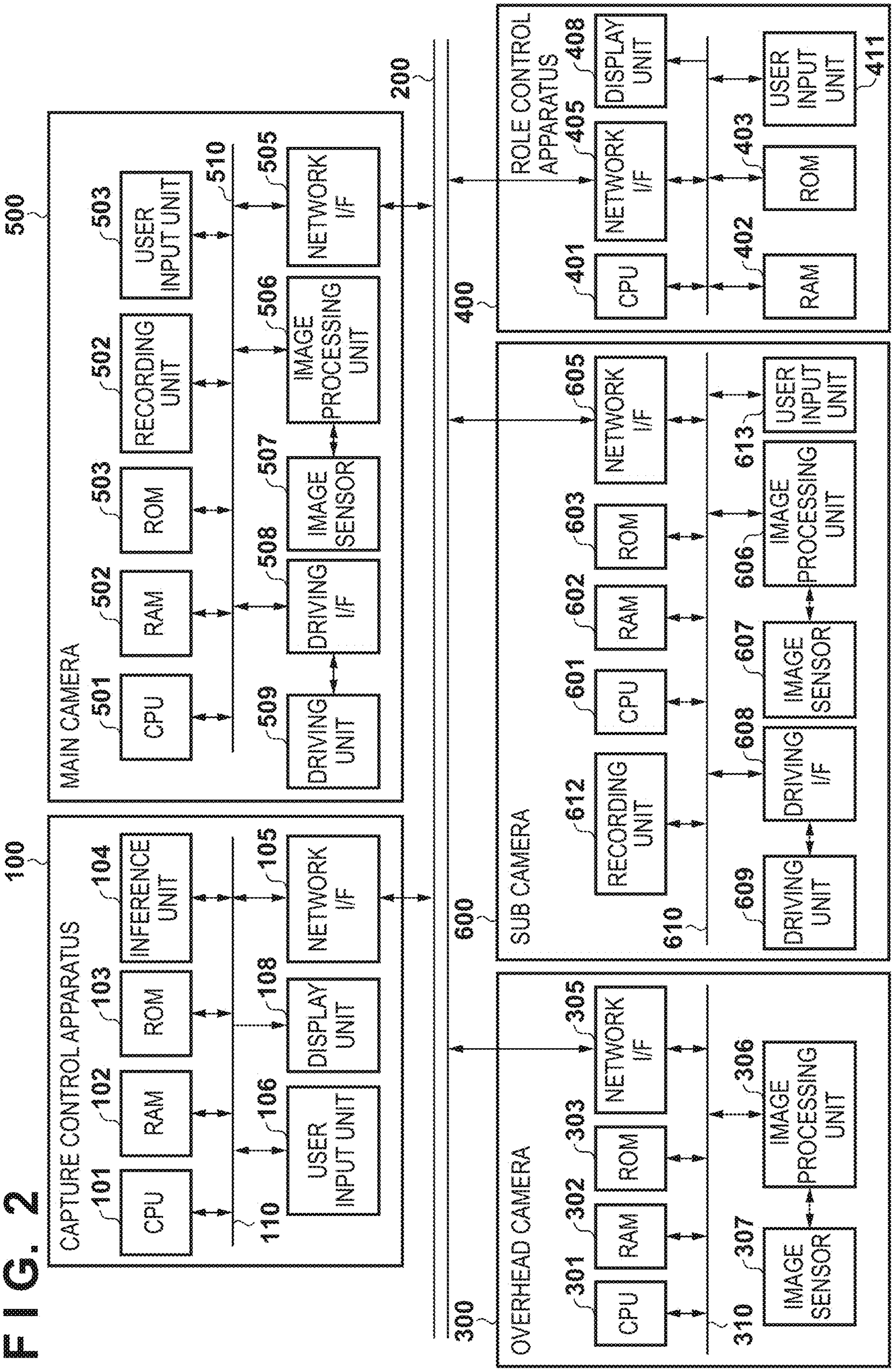
FIG. 2 is a block diagram showing an exemplary functional configuration of each apparatus in the image capture system according to an embodiment.

FIG. 2 is a block diagram showing an exemplary functional configuration of each device that composes a multi-camera image capture system shown in FIG. 1. Note that the constituents represented as functional blocks in the figure can be realized by an integrated circuit, such as an ASIC and an FPGA, a discrete circuit, or a combination of a memory and a processor that executes a program stored in the memory. Also, one functional block may be realized by a plurality of integrated circuit packages, or a plurality of functional blocks may be realized by one integrated circuit package. Furthermore, the same functional block may be implemented as different constituents depending on the operating environment, required capabilities, and so on.

(Capture Control Apparatus 100)

First, an exemplary functional configuration of the capture control apparatus 100 will be described. The capture control apparatus 100 may be, for example, a general-purpose computer device, such as a personal computer and a workstation. The capture control apparatus 100 is configured in such a manner that a CPU 101, a RAM 102, a ROM 103, an inference unit 104, a network interface (I/F) 105, a user input unit 106, and a display unit 108 are connected to one another via an internal bus 110.

The CPU 101 is a microprocessor capable of executing programmed instructions. The CPU 101 realizes the functions of the capture control apparatus 100, which will be described later, by reading a program stored in the ROM 103 into the RAM 102 and executing the program, for example. The CPU 101 can realize the functions of the capture control apparatus 100 by, for example, executing a capture control application that operates on base software (OS).

The RAM 102 is used to load the program executed by the CPU 101, and to temporarily store data that is processed by the CPU 101, data that is currently processed, and so forth. Also, a part of the RAM 102 may be used as a video memory for the display unit 108.

The ROM 103 is a nonvolatile rewritable memory, and stores the program (OS and application) executed by the CPU 101, user data, and so forth.

The inference unit 104 executes processing for detecting subject regions using a machine learning model with respect to a video of the overhead camera 300. The inference unit 104 can be implemented using a hardware circuit that can execute computation of the machine learning model at high speed, such as a graphics processing unit (GPU) and a neural network processing unit (NPU), for example. Alternatively, the inference unit 104 may be implemented using a reconfigurable logic circuit, such as a field-programmable gate array (FPGA). The CPU 101 may realize the functions of the inference unit 104 by executing the program.

The machine learning model may be a convolutional neural network (CNN) that has been trained in accordance with the type of subjects to be detected. It is assumed here that the inference unit 104 detects human body regions or human face regions as subject regions from an input image. Also, it is assumed that the inference unit 104 outputs, for each detected subject region, the position and the size of a rectangular region in which the subject region is inscribed, and a detection reliability degree. Note that processing for detecting different types of subject regions may be executed with respect to the same input image using a plurality of types of machine learning models. Note that the inference unit 104 may execute processing for detecting subject regions using a known method that does not use a machine learning model. The inference unit 104 can detect subject regions using, for example, a method that uses local feature amounts, such as SIFT and SURF, a method that uses pattern matching, or the like.

The network I/F 105 is an interface for connecting the capture control apparatus 100 to the communication network 200. The capture control apparatus 100 (CPU 101) can communicate with external apparatuses in the communication network 200, such as the overhead camera 300, the sub cameras 600 to 900, the main camera 500, and the role control apparatus 400, via the network I/F 105. Note that the capture control apparatus 100 may communicate with external apparatuses via another non-illustrated communication interface (a USB, Bluetooth®, or the like).

In order to communicate with each apparatus (the overhead camera 300, the sub cameras 600 to 900, the main camera 500, and the role control apparatus 400) in the communication network 200, the CPU 101 obtains a network address of each apparatus at an arbitrary timing, and stores the same into the RAM 102. Furthermore, the CPU 101 also obtains information of each apparatus (the type, model name, and the like of the apparatus) at an arbitrary timing (e.g., at the time of first communication), and stores the same into the RAM 102. It is assumed that, as described above, the CPU 101 is aware of at least identification information and the types of apparatuses with respect to the overhead camera 300, the sub cameras 600 to 900, the main camera 500, and the role control apparatus 400. Note that the user may be allowed to give any name to each individual apparatus.

The user input unit 106 is an input device (not shown), such as a mouse, a keyboard, and a touch panel. The capture control apparatus 100 accepts a user instruction via the user input unit 106.

The display unit 108 is a display apparatus, such as a liquid crystal display (LCD). The display unit 108 displays a GUI screen provided by the OS, the capture control application, or the like.

(Overhead Camera 300)

Next, an exemplary functional configuration of the overhead camera 300 will be described.

A CPU 301 is a microprocessor capable of executing programmed instructions. The CPU 301 controls the operations of each functional block and realizes the functions of the overhead camera 300, which will be described later, by reading a program stored in a ROM 303 into a RAM 302 and executing the program, for example.

The RAM 302 is used to load the program executed by the CPU 301, and to temporarily store data that is processed by the CPU 301, data that is currently processed, and so forth. Furthermore, the RAM 302 may be used as a buffer for video signals obtained through image capture.

The ROM 308 is a nonvolatile rewritable memory. The ROM 308 stores the program executed by the CPU 301, setting values of the overhead camera 300, user data, and so forth. Note that the ROM 308 can also be used as a recording destination of video signals. The ROM 308 may include a built-in memory and an attachable/removable memory card.

An image sensor 307 includes an image capture optical system and an image sensor. The image sensor may be a known CCD or CMOS color image sensor that includes, for example, color filters based on the primary-color Bayer arrangement. The image sensor includes a pixel array in which a plurality of pixels are two-dimensionally arrayed, and peripheral circuits for reading out signals from each pixel. Each pixel accumulates charges corresponding to the amount of incident light by way of photoelectric conversion. Signals with a voltage corresponding to the amount of charges accumulated in an exposure period are read out from each pixel; as a result, a group of pixel signals (analog image signals) representing a subject image formed on an image plane is obtained.

An image processing unit 306 applies predetermined signal processing and image processing to the analog image signals output from the image sensor 307, thereby generating signals and image data that suit an intended use, and obtaining and/or generating various types of information.

The processing applied by the image processing unit 306 can include, for example, preprocessing, color interpolation processing, correction processing, detection processing, data editing processing, evaluation value calculation processing, special effects processing, and so forth.

The preprocessing can include A/D conversion, signal amplification, reference level adjustment, defective pixel correction, and so forth.

The color interpolation processing is processing which is executed in a case where the image sensor 307 includes color filters, and in which the values of color components that are not included in the individual pieces of pixel data that compose image data are interpolated. The color interpolation processing is also called demosaicing processing.

The correction processing can include such processing as white balance adjustment, tone correction, correction of image deterioration caused by optical aberration of the image capture optical system (image recovery), correction of the influence of vignetting of the image capture optical system, and color correction.

The data editing processing can include such processing as cutout of a region (cropping), composition, scaling, encoding and decoding, and generation of header information (generation of a data file). The data editing processing also includes generation of video signals to be output to the outside, and video data to be recorded into the ROM 308.

The evaluation value calculation processing can include such processing as generation of signals and evaluation values used in automatic focus detection (AF), and generation of evaluation values used in automatic exposure control (AE). The CPU 301 executes AF and AE.

The special effects processing can include such processing as addition of blur effects, alteration of shades of colors, relighting, and so forth.

Note that these are examples of processing that can be applied by the image processing unit 306, and are not intended to limit processing applied by the image processing unit 306.

The image processing unit 306 outputs information and data that have been obtained or generated to the CPU 301, the RAM 302, and the like in accordance with an intended use.

Note that the types and settings of processing applied by the image processing unit 306 can be controlled by transmitting commands from the capture control apparatus 100 to the overhead camera 300.

The network I/F 305 is an interface for connecting the overhead camera 300 to the communication network 200. The overhead camera 300 (CPU 301) can communicate with external apparatuses in the communication network 200, such as the capture control apparatus 100, the sub camera 600, the main camera 500, and the role control apparatus 400, via the network I/F 305. Note that the overhead camera 300 may communicate with external apparatuses via another non-illustrated communication interface (a USB, Bluetooth, or the like).

(Sub Camera 600)

Next, an exemplary functional configuration of the sub camera 600 will be described. It is assumed that the functional blocks of the sub camera 600 and the overhead camera 300 with the same name have the same functions, and a description thereof is omitted. Also, it is assumed that the sub cameras 700, 800, and 900 have the same functional configuration as the sub camera 600, and individual descriptions thereof are omitted.

As described above, the sub camera 600 is a PTZ camera, and the capture direction and the angle of view thereof can be controlled from outside. For this reason, the sub camera 600 includes a driving unit 609 capable of performing pan and tilt operations and a zoom operation, and a driving I/F 608. The driving I/F 608 is a communication interface between the driving unit 609 and a CPU 601.

The driving unit 609 includes a pan/tilt mechanism by which the sub camera 600 is supported so that it can be panned and tilted, a zoom mechanism that changes the angle of view of the image capture optical system, a motor that drives these mechanisms, and the like. Enlargement and reduction of images performed by an image processing unit 606 may be used in the zoom mechanism. The driving unit 609 drives the motor in accordance with instructions received from the CPU 601 via the driving I/F 608, and adjusts the optical axis direction and the angle of view of the image capture optical system.

A recording unit 612 is, for example, a nonvolatile memory, and image data generated by the image processing unit 606 can be recorded therein. The recording unit 612 may be embedded, or may be attachable/removable.

A user input unit 613 is a collective term for input devices that are intended for the user to input instructions and data to the sub camera 600. The user input unit 613 can include buttons, keys, dials, and a touch panel (not shown). The CPU 601 executes an operation corresponding to a user input that has been made via the user input unit 613.

(Main Camera 500)

Next, an exemplary functional configuration of the main camera 500 will be described. It is assumed that the functional blocks of the main camera 500 and the sub camera 600 with the same name have the same functions, and a description thereof is omitted. The main camera 500 is operated by a user. It is assumed here that the user remotely operates the main camera 500 by transmitting commands via the communication network 200. However, for example, in a case where the main camera 500 is not a PTZ camera, the user may directly operate the main camera 500.

The capture control apparatus 100 (CPU 101) can obtain information of the capture directions and the angles of view of the sub cameras 600 to 900 and the main camera 500 from the sub cameras 600 to 900 and the main camera 500 via a network I/F 505. Note that the capture directions may be the pan and tilt angles of the driving units 609 and 509 based on a predetermined reference direction of 0°. The reference direction may be a direction directly facing the captured area.

(Role Control Apparatus 400)

Next, an exemplary functional configuration of the role control apparatus 400 will be described.

A CPU 401 is a microprocessor capable of executing programmed instructions. The CPU 401 controls the operations of each functional block and realizes the functions of the role control apparatus 400 by reading a role setting program stored in a ROM 403 into a RAM 402 and executing the role setting program, for example.

The RAM 402 is used to load the program executed by the CPU 401, and to temporarily store data that is processed by the CPU 401, data that is currently processed, and so forth. Also, a part of the RAM 402 may be used as a video memory for a display unit 408.

The ROM 403 is a nonvolatile rewritable memory, and stores the program executed by the CPU 401, setting values of the role control apparatus 400, user data, and so forth.

A user input unit 411 is an input device, such as a button, a dial, a joystick, and a touch panel, for example. The role control apparatus 400 accepts a user instruction related to role settings on the sub cameras 600 to 900 via the user input unit 411.

A network I/F 405 is an interface for connecting the role control apparatus 400 to the communication network 200. The role control apparatus 400 (CPU 401) can communicate with external apparatuses in the communication network 200, such as the overhead camera 300, the main camera 500, the sub cameras 600 to 900, and the capture control apparatus 100, via the network I/F 405. Note that the role control apparatus 400 may communicate with external apparatuses via another non-illustrated communication interface (a USB, Bluetooth, or the like).

The display unit 408 is a display apparatus, such as a liquid crystal display (LCD). The display unit 408 displays a GUI screen provided by an OS, a role setting application, or the like.

The role control apparatus 400 stores role setting information into the ROM 403, for example. The role setting information is information in which identification information of the sub cameras 600 to 900 and information indicating a role that has been set are associated with each other. The CPU 401 displays a role setting screen on the display unit 408 by executing the role setting application. The role setting screen displays, for example, identification information (a network address, a name set by the user, and the like) of the sub cameras 600 to 900 and the name of the role that is currently set in association with each other. An initial value of the role that is currently set may be a default role that has been set in advance. The user can change the current role displayed in association with a desired sub cameras 600 to 900 by operating the user input unit 411.

Upon detection of a user operation that indicates the end of a setting operation, such as an operation on an OK button included in the role setting screen, the CPU 401 updates the role setting information stored in the ROM 403 in accordance with the content of the role setting screen.

Upon receiving a role obtainment command via the network I/F 405, the CPU 401 reads out the role setting information stored in the ROM 403, and transmits the role setting information to the transmission source of the role obtainment command.

Note that although FIG. 1 and FIG. 2 show the role control apparatus 400 as an independent apparatus, for example, the capture control application executed on the capture control apparatus 100 may provide functions similar to the functions of the role control apparatus 400. Furthermore, a role may be set directly on the sub cameras 600 to 900, and the capture control apparatus 100 may obtain the role assigned to the sub cameras 600 to 900 from the sub cameras 600 to 900.

The role that can be set on the sub cameras 600 to 900 is preset information regarding how to use information obtained from the main camera 500 in controlling the operations of the sub cameras 600 to 900. It is assumed here that information obtained from the main camera 500 is used in controlling a tracking target subject and a zoom operation of the sub cameras 600 to 900 as one example.

FIG. 3 shows examples of the types of roles that can be set on the sub cameras 600 to 900, and the contents of control associated with the roles. The content of control for each role can be stored in the ROM 403 of the role control apparatus 400 and the ROM 103 of the capture control apparatus 100 in a table format shown in FIG. 3, for example. It is assumed here that one of “main follow”, “main counter”, “assist follow”, and “assist counter” can be set as a role (ROLE). The role can be set for each sub camera.

With respect to a sub camera whose role (ROLE) is “main follow”, the capture control apparatus 100 (CPU 101) sets the same tracking target subject as the main camera 500, and also performs in-phase zoom control on the sub camera when a zoom operation has been performed on the main camera 500. Here, in-phase means that the zoom direction (telephoto direction or wide-angle direction) is the same, that is to say, the direction of change in the angle of view is the same. On the other hand, antiphase means that the zoom direction (telephoto direction or wide-angle direction) is the opposite direction, that is to say, the direction of change in the angle of view is the opposite direction. Note that the angle of view may not be the same as that of the main camera 500 even if the zoom direction is in-phase, and the degree of change in zooming (the speed of change, the rate of change, or the like) may not be the same as that of the main camera 500 whether the zoom direction is in-phase or antiphase.

With respect to a sub camera whose role (ROLE) is "main counter", the capture control apparatus 100 (CPU 101) sets the same tracking target subject as the main camera 500, and also performs antiphase zoom control on the sub cameras 600 to 900 when a zoom operation has been performed on the main camera 500. Therefore, in a case where a zoom-in operation has been performed on the main camera 500, the capture control apparatus 100 (CPU 101) controls the sub camera of this role to zoom out. Note that to zoom in means to switch to zooming in the telephoto direction (the direction toward the telephoto end), whereas to zoom out means to switch to zooming in the wide-angle direction (the direction toward the wide-angle end). In a case where zoom control is performed by the image processing unit, to zoom in means to reduce a region to be cut out from an image and increase the enlargement factor of the cut-out region compared to that before changing the region. On the other hand, to zoom out means to increase a region to be cut out from an image and reduce the enlargement factor of the cut-out region compared to that before changing the region.

With respect to a sub camera whose role (ROLE) is "assist follow L" or "assist follow R", the capture control apparatus 100 (CPU 101) sets a tracking target subject different from that of the main camera 500, and also performs in-phase zoom control on the sub camera when a zoom operation has been performed on the main camera 500.

With respect to a sub camera whose role (ROLE) is "assist counter L" or "assist counter R", the capture control apparatus 100 (CPU 101) sets a tracking target subject different from that of the main camera 500. Also, when a zoom operation has been performed on the main camera 500, the capture control apparatus 100 performs antiphase zoom control on the sub camera.

Here, with respect to a sub camera whose role (ROLE) is "assist follow L" or "assist counter L", a subject located on the left side (leftmost) among the subjects other than a subject of interest of the main camera 500 in an image is set as a tracking target subject of the sub camera. Also, with respect to a sub camera whose role (ROLE) is "assist follow R" or "assist counter R", a subject located on the right side (rightmost) among the subjects other than a subject of interest of the main camera 500 in an image is set as a tracking target subject of the sub camera.

Note that a tracking target subject of a sub camera may be set in accordance with other conditions. For example, a subject that is located on the upper side (topmost) or the lower side (lowermost) among the subjects other than a subject of interest of the main camera 500 in an image may be set as a tracking target subject of the sub camera. Alternatively, a subject that is located nearest to the front or the back among the subjects other than a subject of interest of the main camera 500 may be set as a tracking target subject of the sub camera.

With respect to a sub camera whose role (ROLE) is "exposure shift" or "diaphragm counter", the capture control apparatus 100 (CPU 101) sets the same tracking target subject as the main camera 500. Also, when a zoom operation has been performed on the main camera 500, the capture control apparatus 100 performs in-phase zoom control on the sub camera. Furthermore, the capture control apparatus 100 determines parameters that determine capture conditions based on a capture state of the main camera 500. The details will be described later.

With respect to a sub camera whose role (ROLE) is "wide-angle", the capture control apparatus 100 (CPU 101) sets the same tracking target subject as the main camera 500. Also, when a zoom operation has been performed on the main camera 500, the capture control apparatus 100 performs in-phase zoom control on the sub camera. Furthermore, the capture control apparatus 100 determines parameters that determine the angle of view and capture conditions of the sub camera based on a capture state of the main camera 500. The details will be described later.

Although the above has described setting of a tracking target subject and zoom control as the content of control associated with a role, only one of them may be executed, and another control item may be added.

In the role setting information, which is stored into the ROM 403 by the role control apparatus 400, information indicating the role (ROLE) (e.g., the name of the type described above, or the number assigned to the type) is associated with identification information of the sub cameras 600 to 900. The CPU 101 of the capture control apparatus 100 obtains the role setting information from the role control apparatus 400, and executes control on the operations of the sub cameras 600 to 900 in accordance with the type of the role (ROLE) set on the sub cameras 600 to 900.

Note that in a case where the role setting on the sub cameras 600 to 900 has been changed, the role control apparatus 400 may notify an external apparatus (e.g., the capture control apparatus 100) of the change. In this way, the change in the role setting can be immediately reflected in control on the operations of the sub cameras 600 to 900.

Figure 6:
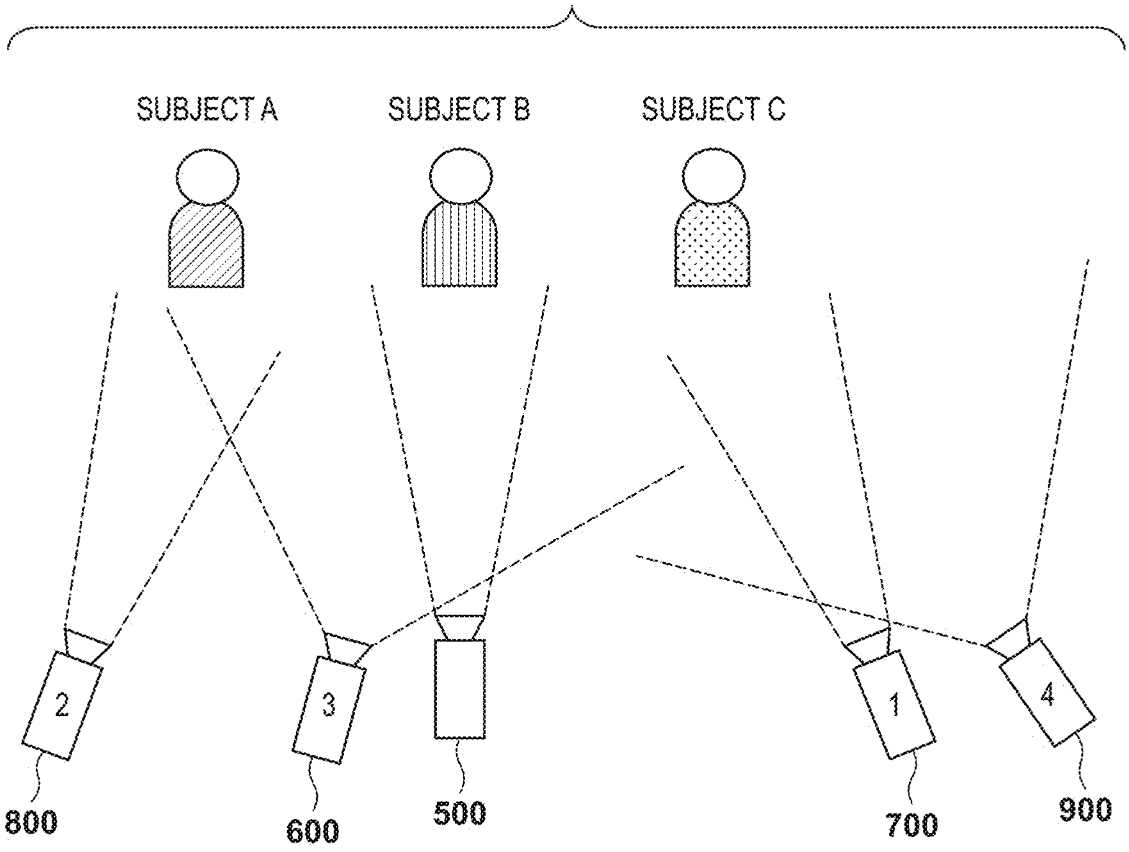
FIG. 6 is a diagram showing an exemplary state of image capture that uses the image capture system according to an embodiment.

FIG. 6 is a schematic diagram showing examples of a scene captured by the image capture system 10, and the arrangement, capture direction, and angle of view of each camera. The direction of each camera represents a capture direction on a horizontal plane, and dash lines schematically indicate capturing angles of view. Furthermore, the numerals 1 to 4 assigned to the sub cameras 600 to 900 indicate the priority order that has been set; the smaller the numerical value, the higher the priority order.

Three human subjects (subject A to subject C) are present in the captured scene. Also, the main camera 500 is capturing only the subject B among the subjects A to C. Therefore, a subject of interest of the main camera 500 is the subject B.

The role "main counter" is set on the sub camera 600. Therefore, the capture control apparatus 100 controls the capture direction of the sub camera 600 so as to track the subject of interest of the main camera 500 (the subject B). Also, in a case where the angle of view of the main camera 500 has been changed to the telephoto side, the capture control apparatus 100 changes the angle of view of the sub camera 600 to the wide-angle side, whereas in a case where the angle of view of the main camera 500 has been changed to the wide-angle side, the capture control apparatus 100 changes the angle of view of the sub camera 600 to the telephoto side.

The role "assist follow R" is set on the sub camera 700. Therefore, the capture control apparatus 100 controls the capture direction of the sub camera 600 to track the subject C, which is located on the right side when viewed from the camera, among the subjects A and C other than the subject of interest of the main camera 500 (the subject B). Also, in a case where the angle of view of the main camera 500 has been changed to the telephoto side, the capture control apparatus 100 changes the angle of view of the sub camera 600 to the telephoto side as well, whereas in a case where the angle of view of the main camera 500 has been changed to the wide-angle side, the capture control apparatus 100 changes the angle of view of the sub camera 600 to the wide-angle side as well.

The role "assist follow L" is set on the sub camera 800. Therefore, the capture control apparatus 100 controls the capture direction of the sub camera 600 to track the subject A, which is located on the left side when viewed from the camera, among the subjects A and C other than the subject of interest of the main camera 500 (the subject B). Also, in a case where the angle of view of the main camera 500 has been changed to the telephoto side, the capture control apparatus 100 changes the angle of view of the sub camera 600 to the telephoto side as well, whereas in a case where the angle of view of the main camera 500 has been changed to the wide-angle side, the capture control apparatus 100 changes the angle of view of the sub camera 600 to the wide-angle side as well.

The role "assist counter R" is set on the sub camera 900. Therefore, the capture control apparatus 100 controls the capture direction of the sub camera 600 to track the subject C, which is located on the right side when viewed from the camera, among the subjects A and C other than the subject of interest of the main camera 500 (the subject B). Also, in a case where the angle of view of the main camera 500 has been changed to the telephoto side, the capture control apparatus 100 changes the angle of view of the sub camera 600 to the wide-angle side, whereas in a case where the angle of view of the main camera 500 has been changed to the wide-angle side, the capture control apparatus 100 changes the angle of view of the sub camera 600 to the telephoto side.

In the present embodiment, the capture control apparatus 100 can control a sub camera so that the sub camera substitutes for the main camera 500. Therefore, even in a case where the main camera 500 has not been able to obtain an intended video, or in a case where it is considered that there is a high possibility that an intended video can no longer be obtained in the near future, a video that is similar to or the same as a video that is supposed to be captured by the main camera 500 can be continuously obtained.

Using the flowcharts shown in FIG. 4A to FIG. 4D-2, the following describes the operations of the capture control apparatus 100 according to the present embodiment. The operations of the capture control apparatus 100 described below are realized by the CPU 101 controlling each unit of the capture control apparatus 100 through the execution of the program that has been stored in the ROM 103 or has been obtained via the network I/F 105.

Figure 4A:
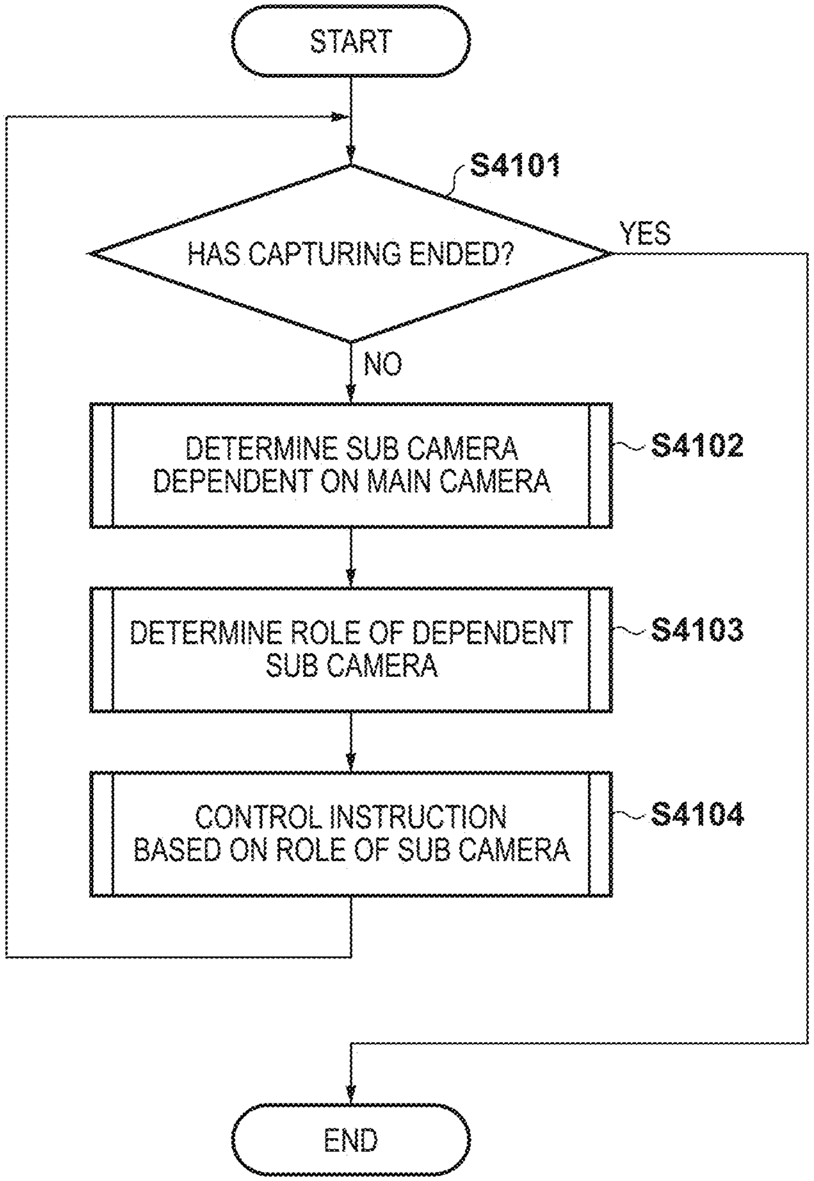
FIG. 4A is a flowchart related to the operations of a capture control apparatus 100 according to a first embodiment.

FIG. 4A is a flowchart showing the overall operations of the capture control apparatus 100 according to the present embodiment.

In step S4101, the CPU 101 determines whether image capture has ended; the following operations are not executed if it has been determined that image capture has ended, and step S4102 is executed if it has not been determined that image capture has ended. The CPU 101 determines that image capture has ended upon, for example, receiving a notification indicating the end of image capture from the main camera 500 via the network I/F 105. Furthermore, the CPU 101 determines that image capture has ended also in a case where it has been determined that the power of the main camera 500 is OFF. The CPU 101 determines that the power of the main camera 500 is OFF in a case where, for example, a notification from the main camera 500 has not been received for a certain time period or longer via the network I/F 105.

In step S4102, the CPU 101 determines (selects) a sub camera to be dependent on the main camera 500 from among the sub cameras 600 to 900. The details of step S4102 will be described later using FIG. 4B. A sub camera to be dependent on the main camera 500 is a sub camera to operate as a backup of the main camera 500.

In step S4103, with respect to the sub camera to be dependent on the main camera 500, the CPU 101 determines an appropriate role for backing up the main camera 500. The details of step S4103 will be described later using FIG. 4C.

In step S4104, the CPU 101 controls the sub cameras 600 to 900 based on the roles thereof. After executing step S4104, the CPU 101 executes S4101 again.

(Decision on Sub Camera to be Dependent on Main Camera)

Next, the details of operations in step S4102 of FIG. 4A will be described using the flowchart shown in FIGS. 4B-1 and 4B-2.

In step S4201, the CPU 101 determines whether a condition for temporarily canceling dependency on the main camera 500 is satisfied. It is assumed that the condition is, for example, the condition that a notification about an operation performed on a user input unit 512 has been received from the main camera 500, the condition that a cancel command has been received from the role control apparatus 400, or the like, and is stored in the ROM 103 in advance. The CPU 101 executes step S4202 if it has been determined that the condition for temporarily cancelling dependency on the main camera 500 is satisfied, and executes step S4203 if it has not been thus determined.

In step S4202, the CPU 101 turns ON a temporary cancellation flag set in, for example, a specific address of the RAM 102 (e.g., sets the temporary cancellation flag at the value 1). Thereafter, the CPU 101 executes step S4203.

In step S4203, the CPU 101 refers to the temporary cancellation flag inside the RAM 102, and determines whether dependency on the main camera is currently cancelled temporarily. If the temporary cancellation flag is ON, the CPU 101 determines that dependency is currently cancelled temporarily and executes step S4204, whereas if the temporary cancellation flag is OFF, the CPU 101 determines that dependency is not currently cancelled temporarily and executes step S4206.

Figures 1, 4B:
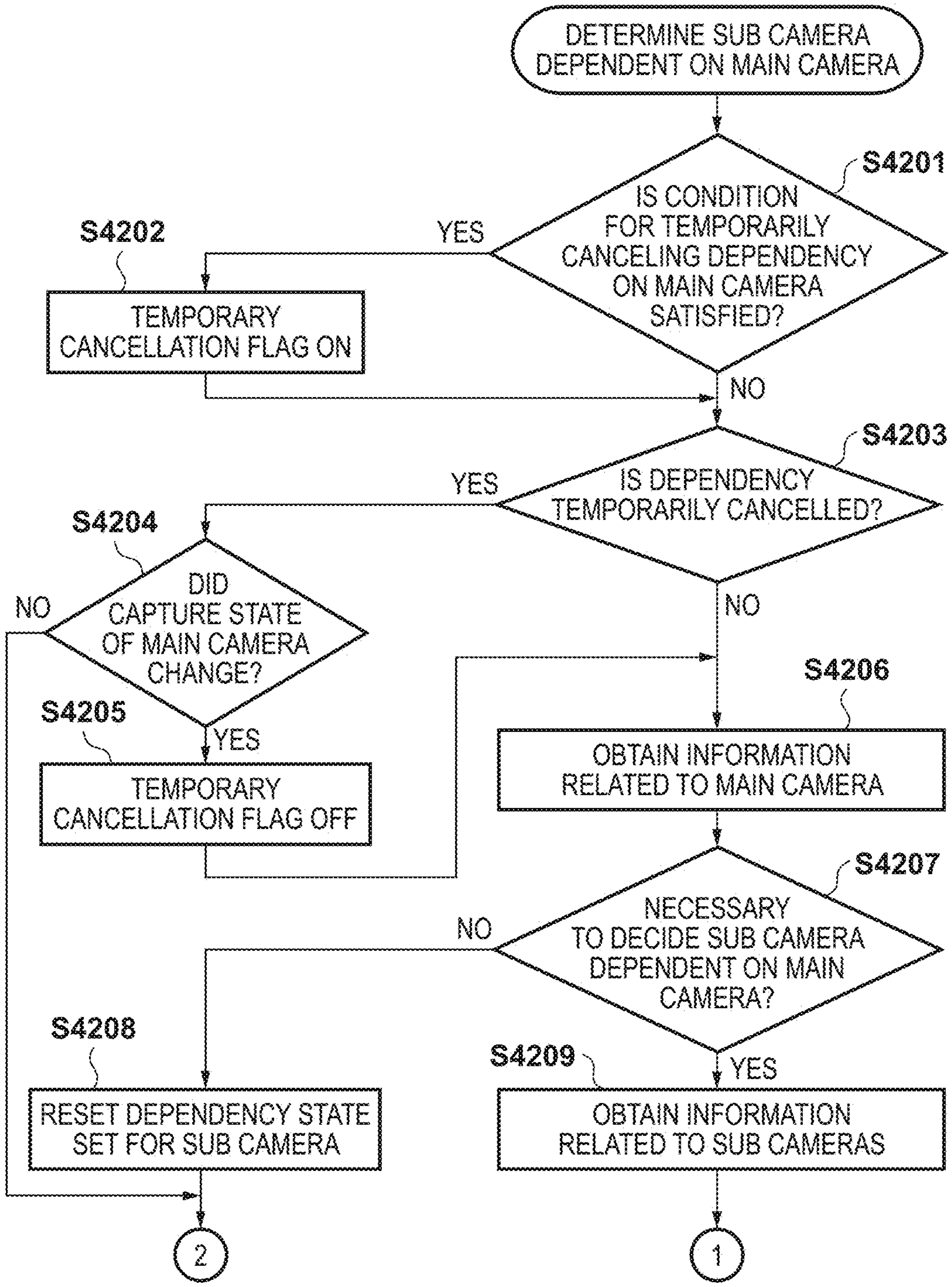
Figures 2, 4B:
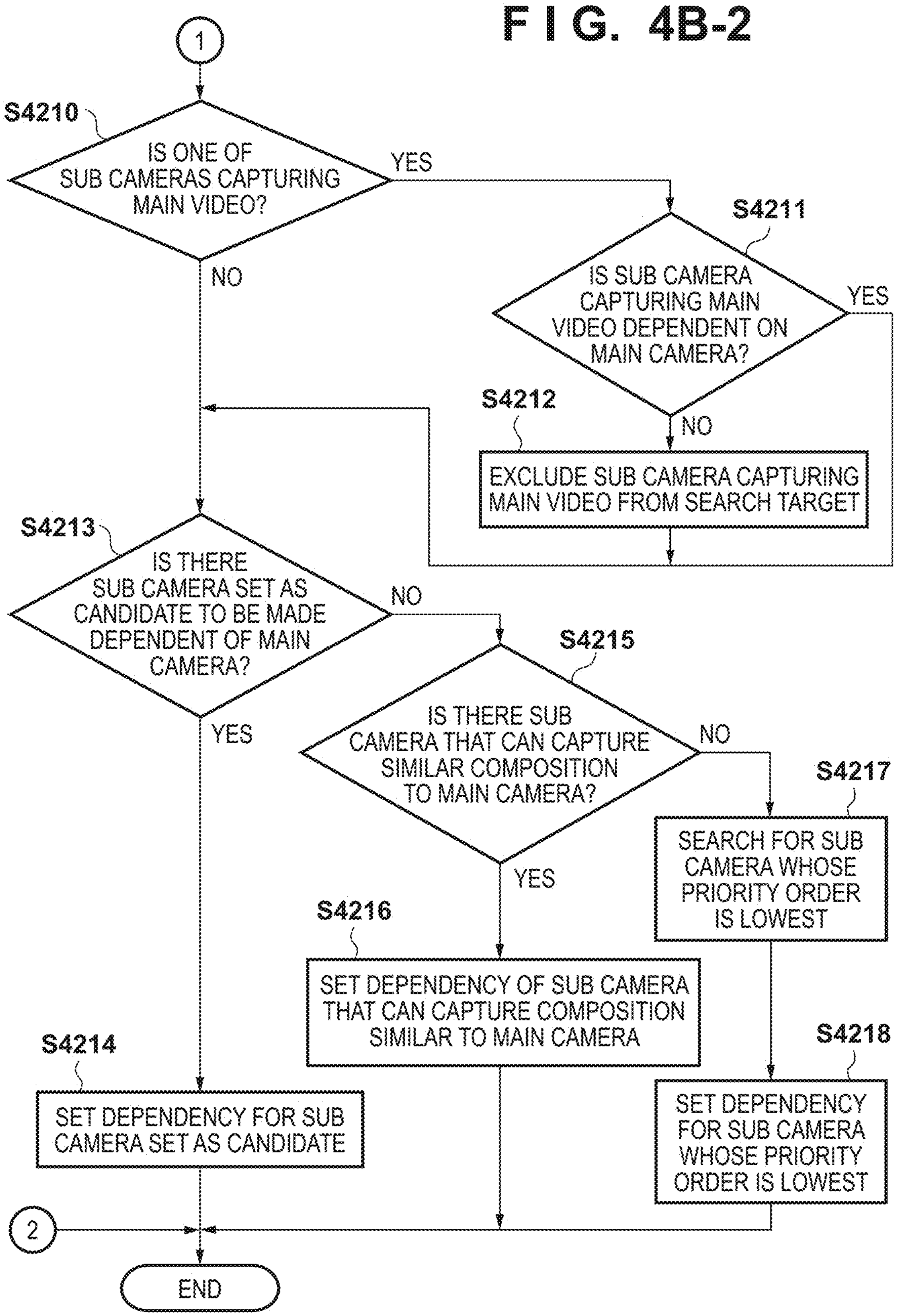

In step S4204, the CPU 101 determines whether a capture state of the main camera 500 has changed; if it has been determined that the capture state has changed, step S4205 is executed, whereas if it has not been thus determined, processing of the flowchart of FIG. 4B is ended. The CPU 101 determines that the capture state of the main camera 500 has changed in a case where, for example, the main camera 500 has notified it of a change in settings of the main body or the capture direction (the direction of the optical axis of the image capture optical system), a change in camera data that is not in coordination with settings, such as vibration information, or the like. It is assumed that the condition for determination used in step S4204 is stored in the ROM 103 in advance.

In step S4205, the CPU 101 turns OFF the temporary cancellation flag inside the RAM 102 (e.g., sets the temporary cancellation flag at the value 0). Thereafter, the CPU 101 executes step S4206.

In step S4206, the CPU 101 obtains the capture state of the main camera 500, and stores the same into the RAM 102. The capture state includes a video (frame images) captured by the main camera 500, the result of subject detection processing for the video, a capture direction (e.g., pan and tilt angles of the driving unit 509), an angle of view, an exposure condition, a white balance coefficient, AE and AF evaluation values, and so forth. The capture conditions may be obtained from the main camera 500; the capture control apparatus 100 may obtain at least a part of information based on the video received from the main camera 500.

In step S4207, the CPU 101 determines whether it is necessary to determine a sub camera to be dependent on the main camera 500; if it has been determined that the decision is necessary, step S4209 is executed, whereas if it has not been thus determined, step S4208 is executed.

For example, the CPU 101 can make the determination based on a condition based on one or more of the following.

Luminance information detected from the video of the main camera 500

The sizes and positions of subject regions detected from the video of the main camera 500 (or bounding rectangular regions of the subject regions)

The condition for exposure (one or more of sensitivity, an ND filter value, a shutter speed, and an f-number), the focusing distance, and the focal length of the image capture optical system of the main camera 500

Movement of the main camera 500

More specifically, in a case where one or more of predetermined conditions, such as the following, have been satisfied, the CPU 101 can determine that it is necessary to determine a sub camera to be dependent on the main camera 500.

(1) A case where the size of a region with a blown-out highlight or with luminance close to a blown-out highlight (e.g., the number of pixels whose luminance values are equal to or larger than an upper limit threshold) in the video (frames) continues to be equal to or larger than a threshold for a predetermined time period (2) A case where the size of a region with a blocked-up shadow or with luminance close to a blocked-up shadow (e.g., the number of pixels whose luminance values are equal to or smaller than a lower limit threshold) in the video (frames) continues to be equal to or larger than a threshold for a predetermined time period (3) A case where the moving speed of a subject (region) of interest of the main camera 500 exceeds a threshold (4) A case where it is determined that the possibility of the subject of interest disappearing from a frame is high based on the position and the moving direction and speed of the subject (region) of interest of the main camera 500

(5) A case where the size of the subject of interest of the main camera 500 exceeds an upper limit threshold or falls below a lower limit threshold, or a case where it is determined that the possibility of the size exceeding the upper limit threshold or falling below the lower limit threshold is high based on a temporal change in the size (6) A case where the depth of field of the subject of interest of the main camera 500 is smaller than a threshold (the depth of field can be calculated based on the distance to the subject of interest (=focusing distance) and the f-number)

(7) A case where the movement (e.g., angular velocity and/or acceleration) of the main camera 500 exceeds a threshold Note, the conditions that have been exemplarily described above are not indispensable, and other conditions may be used.

Regarding (1), the purpose of including the continuation for the predetermined time period in the condition is to exclude a temporary blown-out highlight, such as a flash used in stage lighting. Note that regarding (1) and (2), the percentage out of the number of pixels in the entire frame, or the percentage out of the number of pixels in the subject regions, may be used. In a case where one or more of (3) and (7) is satisfied, there is a high possibility that blurring of the subject of interest in the video is significant. Regarding (4), for example, in a case where the shortest distance from the position of the region of the subject of interest to one of the edges of a frame image is equal to or shorter than a threshold, the position of the subject of interest is excessively displaced from the center of the frame image. Furthermore, in a case where a value obtained by dividing the distance from the region of the subject of interest to an edge of the frame image in the moving direction by the moving speed of the region is equal to or smaller than a threshold, there is a high possibility that the subject of interest will disappear from the frame. Note that an example of the method of specifying the subject of interest of the main camera 500 will be described in a third embodiment. In a case where (6) is satisfied, the sharpness of the subject of interest easily becomes unstable.

As described above, in step S4207, the CPU 101 determines whether at least one of the following cases holds true, and if it has been thus determined, the CPU 101 determines that it is necessary to determine a sub camera to be dependent on the main camera 500.

A case where the image quality of the subject of interest captured by the main camera 500 is low, or is expected to become low A case where the subject of interest cannot be captured, or is expected to be no longer captured, at an appropriate position with an appropriate size inside a screen In step S4208, with respect to a sub camera that has been set to be dependent on the main camera 500 (dependency setting) among the sub cameras 600 to 900, the CPU 101 deletes the dependency setting. For example, the CPU 101 deletes information of the sub camera with the dependency setting stored in the RAM 102. Thereafter, the CPU 101 ends processing of the flowchart of FIG. 4B.

In step S4209, the CPU 101 obtains pieces of information that are respectively related to the sub cameras 600 to 900, and stores them into the RAM 102.

Information obtained here can include the following, for example.

Information of the image capture optical system (the range of the focal length, and the minimum and maximum f-numbers)

Information of the driving unit (the ranges in which pan and tilt can be performed, and the current angle of view)

The type of the set role and the priority order

The position of placement (e.g., three-dimensional coordinates in a coordinate system that has a predetermined origin)

The current capture direction (which may be the pan and tilt angles of the driving unit)

Information of the image sensor (the number of pixels, sensor size, color filter type, etc.)

Note that all of the above need not be indispensable, and other types of information may be included.

Pieces of information that have been obtained most recently and stored into the RAM 102 may be used, or pieces of information may be obtained from the sub cameras as-needed. The roles set on the sub cameras and the priority order may be obtained from the role control apparatus 400, or the roles and the priority order that have been obtained most recently and stored into the RAM 102 may be used. Regarding the position of placement of a sub camera, information that has been registered via the user input unit 106 at the time of placement of the sub camera can be stored in the ROM 103. The position of the sub camera that has been measured by an external apparatus using, for example, a beacon attached to the sub camera may be obtained.

In step S4210, the CPU 101 determines whether one of the sub cameras 600 to 900 is currently capturing a main video; if it has been determined that the main video is currently captured, step S4211 is executed, whereas if it has not been thus determined, step S4213 is executed. The CPU 101 can make the determination based on tally information obtained from the switcher via the network I/F 105.

In step S4211, the CPU 101 determines whether the sub camera that is currently capturing the main video and the sub camera with the dependency setting are the same; if it has been determined that they are the same, step S4213 is executed, whereas if it has not been thus determined, step S4212 is executed. The CPU 101 can make the determination with reference to information held in the RAM 102.

In step S4212, the CPU 101 excludes the sub camera that is capturing the main video (the sub camera with the dependency setting) from sub cameras to be searched for. The CPU 101 can, for example, associate information of the pertinent sub camera among the pieces of information of sub cameras stored in the RAM 102 with information indicating that the pertinent sub camera is not to be searched for.

In step S4213, the CPU 101 refers to the pieces of information of sub cameras held in the RAM 102, and determines whether the sub cameras to be searched for include a sub camera that has been set in advance as a candidate to be dependent on the main camera. The CPU 101 executes step S4214 if it has been determined that there is a sub camera that has already been set as the candidate, and executes step S4215 if it has not been thus determined. Note that whether to set the sub camera to act as the candidate in advance is optional. For example, in a case where the sub cameras 600 to 900 that are suitable to be dependent on the main camera 500 can be specified when placing the sub cameras 600 to 900, the sub camera to act as the candidate is set in advance. The setting can be configured via the user input I/F unit 106.

In step S4214, the CPU 101 configures a dependency setting on the sub camera that has already been set as the candidate. Specifically, the CPU 101 appends information indicating that the dependency setting has been configured to information of the pertinent sub camera among the pieces of information of sub cameras stored in the RAM 102. Thereafter, the CPU 101 ends the operations of FIG. 4B.

In step S4215, the CPU 101 determines whether there is a sub camera that can perform image capture with a composition similar to that of the main camera 500; if it has been determined that such a sub camera exists, step S4216 is executed, whereas if it has not been thus determined, step S4217 is executed.

Here, the sub camera that can perform image capture with a composition similar to that of the main camera 500 is a sub camera that can:

- capture an area that includes all of the subjects captured by the main camera 500, and
- capture these subjects in such a manner that the difference between the size of the captured subjects and the size of the subjects in the video of the main camera 500 is equal to or smaller than a threshold.

The CPU 101 can determine the sub camera that can perform image capture with a composition similar to that of the main camera 500 in consideration of, for example, the position of placement of the camera, the range of the focal length of the image capture optical system, and the movable range of the driving unit.

Alternatively, a sub camera that satisfies the following simpler conditions may be determined as the sub camera that can perform image capture with a composition similar to that of the main camera 500.

- The position of placement is closest to the main camera 500, and the distance to the main camera 500 is equal to or shorter than a threshold
- The range of the focal length of the image capture optical system overlaps with the range of the focal length of the image capture optical system of the main camera 500 by at least a threshold percentage.

In step S4216, the CPU 101 configures a dependency setting on the sub camera that can perform image capture with a composition similar to that of the main camera 500, which has been determined in step S4215. Thereafter, the CPU 101 ends processing of FIG. 4B. Note that the number of sub cameras with the dependency setting is at least one, and may be two or more.

In step S4217, the CPU 101 searches for a sub camera with the lowest priority order among the sub cameras to be searched for.

In step S4218, the CPU 101 configures a dependency setting on the sub camera that has been searched for in step S4217. Thereafter, the CPU 101 ends processing of FIG. 4B.

Note that in steps S4216 and S4218, the dependency setting may be configured after gaining agreement from the user. This is because there is a possibility that automatic dependency setting is against the user's intention. The CPU 101 configures the dependency setting in a case where the user's agreement has been gained, and does not configure the dependency setting in a case where the user's agreement has not been gained. Furthermore, in gaining agreement, the user may be allowed to change (designate) a sub camera with a dependency setting. In a case where the user has issued a change instruction, the CPU 101 configures a dependency setting on a sub camera designated by the user.

(Setting of Role on Sub Camera Dependent on Main Camera)

Next, the details of operations in step S4103 of FIG. 4A will be described using the flowchart shown in FIG. 4C.

In step S4301, the CPU 101 determines whether there is a sub camera with a dependency setting with reference to the pieces of information of sub cameras stored in the RAM 102. The CPU 101 executes step S4302 if it has been determined that there is a sub camera with a dependency setting, and ends the operations of FIG. 4C if it has not been thus determined.

In step S4302, the CPU 101 determines whether the size of a subject of interest of the main camera 500 is equal to or smaller than a predetermined upper limit value; if it has been determined that the size is equal to or smaller than the upper limit value, step S4304 is executed, whereas if it has not been thus determined, step S4303 is executed. Specifically, the CPU 101 determines a region of the subject of interest from a subject region detected from the video captured by the main camera 500. Then, the CPU 101 determines whether the size of the region of the subject of interest (e.g., the size of a face region or a bounding rectangular region of the face region in the case of a human subject) is equal to or smaller than the upper limit value. The upper limit value may be the number of pixels, or may be a percentage out of the entire image.

Figure 4C:
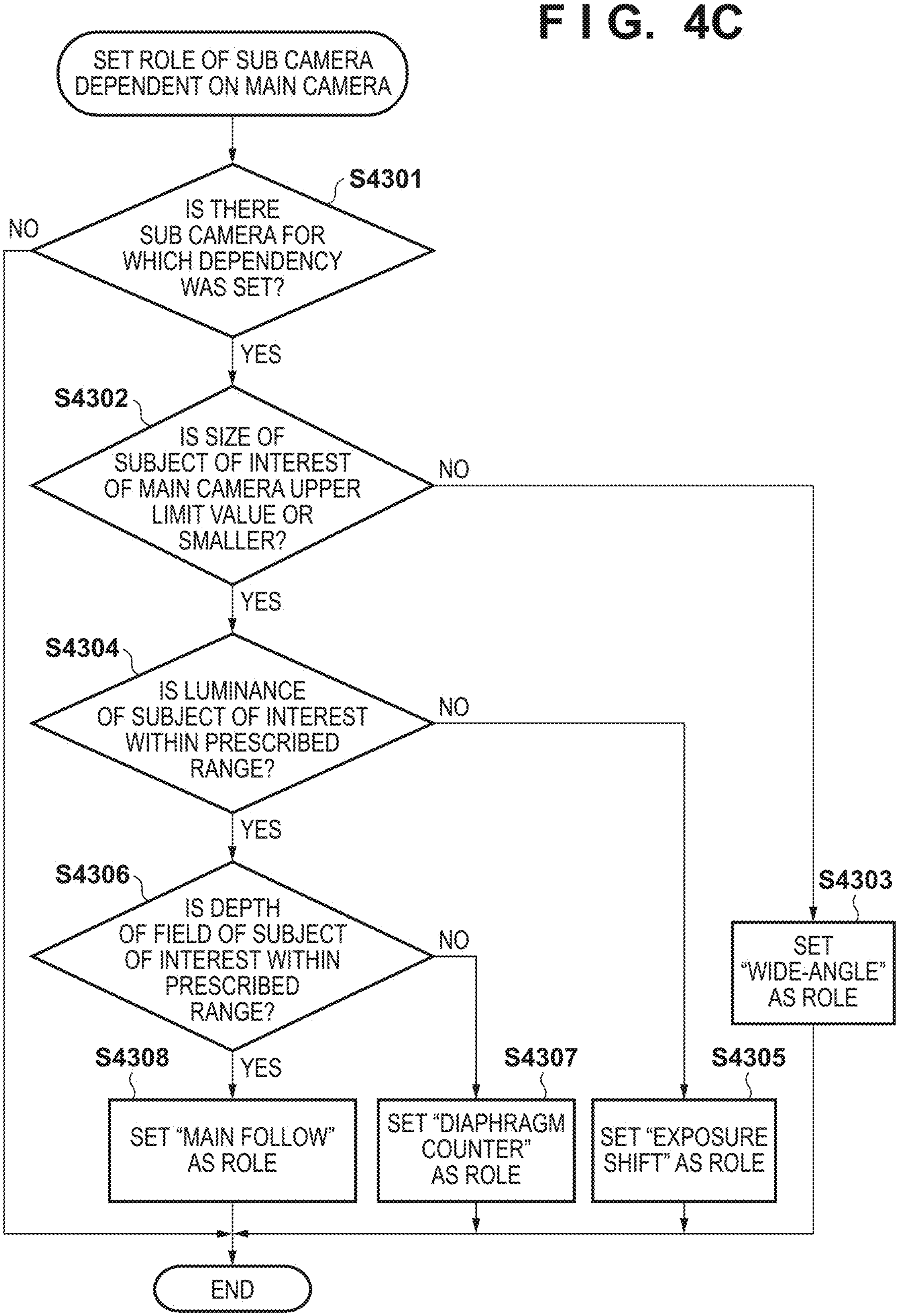
FIG. 4C is a flowchart related to the operations of the capture control apparatus 100 according to the first embodiment.

In step S4303, the CPU 101 sets "wide-angle" as the role of the sub camera with the dependency setting, and ends the operations shown in FIG. 4C.

In step S4304, the CPU 101 determines whether the luminance value of the region of the subject of interest of the main camera 500 is within a prescribed range; if it has been determined that the luminance value is within the prescribed range, step S4306 is executed, whereas if it has not been thus determined, step S4305 is executed. Specifically, the CPU 101 determines whether a luminance evaluation value of the region of the subject of interest of the main camera 500 is within a prescribed range that has been determined in advance. The luminance evaluation value may be an average luminance value, or may be the largest luminance value, for example. Furthermore, the determination may be made not only with respect to the subject of interest, but also with respect to a region of another subject of the same type. In this case, step S4305 is executed if there is at least one subject region whose luminance evaluation value is determined to be outside the prescribed range.

In step S4305, the CPU 101 sets "exposure shift" as the role of the sub camera with the dependency setting, and ends the operations shown in FIG. 4C.

In step S4306, the CPU 101 determines whether the depth of field of the region of the subject of interest of the main camera 500 is within a prescribed range; if it has been determined that the depth of field is within the prescribed range, step S4308 is executed, whereas if it has not been thus determined, step S4307 is executed. Specifically, the CPU 101 calculates the depth of field of the region of the subject of interest of the main camera 500 based on the subject distance (focusing distance), the focal length of the image capture optical system, and the f-number. Then, the CPU 101 determines whether the depth of field is within the prescribed range that has been determined in advance. Furthermore, the determination may be made not only with respect to the subject of interest, but also with respect to a region of another subject of the same type. In this case, step S4307 is executed if there is at least one subject region whose depth of field is determined to be outside the prescribed range.

In step S4307, the CPU 101 sets "diaphragm counter" as the role of the sub camera with the dependency setting, and ends the operations shown in FIG. 4C.

In step S4308, the CPU 101 sets "main follow" as the role of the sub camera with the dependency setting, and ends the operations shown in FIG. 4C.

(Control Instruction Based on Role of Sub Camera)

Next, the details of operations in step S4104 of FIG. 4A will be described using the flowchart shown in FIGS. 4D-1 and 4D-2.

In step S4401, the CPU 101 determines whether there is a sub camera with a dependency setting; if it has been determined that such a sub camera exists, step S4402 is executed, whereas if it has not been thus determined, step S4411 is executed. The CPU 101 can make the determination by referring to the pieces of information of sub cameras stored in the RAM 102.

In a case where there are a plurality of sub cameras with a dependency setting, the CPU 101 executes processing of step S4402 onward for each sub camera.

In step S4402, the CPU 101 receives role information of the sub camera with the dependency setting from the role control apparatus 400, and stores the same into the RAM 102. Note that it is not necessary to receive the role information at this timing. Role information that has been received in advance and stored into the RAM 102 may be referred to.

In step S4403, the CPU 101 specifies a subject of interest of the main camera 500. Note that in a case where the subject of interest has already been specified in preceding processing, the result of this specification may be used. In this case, the present step need not be executed. As will be described in the third embodiment, the subject of interest can be specified based on the video and the capture direction of the main camera 500.

In step S4404, the CPU 101 calculates a change instruction amount that causes the sub camera with the dependency setting to have the same settings and captured area as the main camera 500. Specifically, the CPU 101 obtains setting information from the main camera 500, and calculates the change instruction amount based on the difference between the obtained setting information and setting information of the sub camera. Furthermore, the CPU 101 calculates the change instruction amount for achieving pan and tilt movements and a zoom value with which the subjects included in the captured area of the main camera 500 are captured by the sub camera with sizes similar to the sizes thereof in the video of the main camera 500. The CPU 101 calculates the change instruction amount corresponding to the pan and tilt movements and the zoom value of the sub camera based on the positions and sizes of subject regions detected from the videos of the main camera 500 and the sub camera, and on the position, capture direction, and angle of view of the sub camera. The positions of subjects in the video are adjusted by changing a pan value and a tilt value, and the sizes of subject regions in the video are adjusted by changing the zoom value.

In step S4405, the CPU 101 determines whether the role that has been set on the sub camera with the dependency setting in step S4103 is "exposure shift". The CPU 101 executes step S4406 if it has been determined that the set role is "exposure shift", and executes step S4407 if it has not been thus determined.

In step S4406, based on information of the current exposure setting of the main camera 500 and the luminance of a subject region, the CPU 101 calculates an exposure shift amount (an amount by which the exposure setting is to be changed) to be issued to the sub camera as an instruction. Specifically, if it has been determined that the luminance of the subject of interest of the main camera 500 is high in step S4207, the CPU 101 calculates a shift amount that reduces the exposure amount relative to the exposure setting of the main camera 500 so as to achieve a predetermined, appropriate luminance. Also, if it has been determined that the luminance of the subject of interest of the main camera 500 is low in step S4207, the CPU 101 calculates a shift amount that increases the exposure amount relative to the exposure setting of the main camera 500 so as to achieve the predetermined, appropriate luminance. ½ steps, ⅓ steps, or the like can be determined in advance as the unit of the shift amount.

Note that the shift amount may be calculated using the automatic exposure control (AE) function of the sub camera, or a shift amount of a fixed value may be used. For example, in the case of a captured scene for which an appropriate correction amount can be measured in advance, the shift amount can be determined in advance. Even in a case where the main camera 500 cannot capture a video with an appropriate exposure, the sub camera with the dependency setting can capture a video with an appropriate exposure by using different exposure amounts between the sub camera with the dependency setting and the main camera 500.

Furthermore, in a case where there are a plurality of sub cameras with the dependency setting, the shift amount may vary with each sub camera. For example, the shift amounts of the respective sub cameras can be determined so that image capture is performed using an exposure amount larger than that of the main camera 500 and an exposure amount smaller than that of the main camera 500; in this way, an appropriate video can be obtained both in a case where the video of the main camera 500 is too bright and in a case where the video thereof is too dark.

In step S4407, the CPU 101 determines whether the role that has been set on the sub camera with the dependency setting in step S4103 is "diaphragm counter". The CPU 101 executes step S4408 if it has been determined that the set role is "diaphragm counter", and executes step S4409 if it has not been thus determined.

In step S4408, based on the f-number included in the current exposure setting of the main camera 500, the CPU 101 calculates an amount of change in the f-number to be issued to the sub camera as an instruction. Specifically, in a case where the depth of field of the subject of interest is too shallow (narrower than a reference range), the CPU 101 calculates the amount of change so as to achieve the f-number larger than the current f-number of the main camera 500. Also, in a case where the depth of field of the subject of interest is too deep (wider than the reference range), the CPU 101 calculates the amount of change so as to achieve the f-number smaller than the current f-number of the main camera 500. The CPU 101 also calculates the amount(s) of change in the shutter speed and/or capture sensitivity so that the exposure amount does not change before and after the f-number is changed. The CPU 101 stores the calculated amounts of changes into the RAM 102.

In step S4409, the CPU 101 determines whether the role that has been set on the sub camera with the dependency setting in step S4103 is "wide-angle". The CPU 101 executes step S4410 if it has been determined that the set role is "wide-angle", and executes step S4411 if it has not been thus determined.

In step S4410, the CPU 101 detects, from the video of the sub camera with the dependency setting, a region of a subject that is the same as a subject included in the video of the main camera 500. Then, the CPU 101 calculates a zoom amount of the sub camera so that the size of the detected subject region becomes smaller than the size in the video of the main camera 500. Specifically, the CPU 101 calculates a zoom amount that causes the subject to be captured with a size smaller than the size of the subject region captured by the main camera 500 by a predetermined percentage (e.g., 10 percent, 20 percent, or the like). The CPU 101 stores the calculated zoom amount into the RAM 102.

In step S4411, the CPU 101 reflects the change instruction amount calculated in step S4404 and the value calculated in step S4406, S4408, or S4410 in the current setting information of the sub camera with the dependency setting, thereby generating new setting information. Then, the CPU 101 transmits a setting change command including the new setting information to the sub camera with the dependency setting via the network I/F 105. Note, it is assumed that any role set on the sub camera with the dependency setting uses the subject of interest of the main camera 500 as a tracking target subject, as indicated by pieces of role information shown in FIG. 3. Therefore, the pan and tilt values for changing the capture direction, which are necessary for automatic tracking, are also reflected in the new setting information. Control on automatic tracking of the sub camera will be described in detail in the third embodiment.

Furthermore, the capture direction of the sub camera with the dependency setting may be controlled so that the position of the tracking target subject in an image becomes the same or close to the position of the subject of interest in the video of the main camera 500. Alternatively, the capture direction of the sub camera with the dependency setting may be controlled so that the position of the tracking target subject in the image becomes displaced, by a specific amount, from the position of the subject of interest in the video of the main camera 500. The specific amount may be a value based on the distance between the position of the region of the subject of interest in the video of the main camera 500 and the image center. Alternatively, the specific amount may be a value designated via the user input unit 411 of the role control apparatus 400. It is assumed that the position is basically displaced in the horizontal direction; however, the direction of displacement may be allowed to be designated. By thus controlling the position of the tracking target subject of the sub camera with the dependency setting, it becomes possible to intentionally capture a video in which the tracking target subject is located on the left side or the right side, and to capture a video that shows the tracking target subject at a position similar to the position thereof in the video of the main camera 500. This makes it possible to obtain a video that can be used both as a video acting as a substitute for the video of the main camera 500, and as a video that is different in composition from the video of the main camera 500.

In step S4412, the CPU 101 obtains pieces of role information of the respective sub cameras other than the sub camera with the dependency setting. The CPU 101 may refer to pieces of role information stored in the RAM 102, or may obtain pieces of role information from the role control apparatus 400.

In step S4413, the CPU 101 detects the position of the tracking target subject corresponding to the role from a video of one sub camera other than the sub camera with the dependency setting. As will be described in detail in the third embodiment, the CPU 101 detects subjects inside the captured scene and the positions thereof from the video of the overhead camera 300. Then, the CPU 101 specifies the tracking target subject of the target sub camera from among the detected subjects, thereby specifying the position of the tracking target subject. In step S4414, the CPU 101 calculates the amounts of changes in the pan and tilt values (capture direction) that are intended for the target sub camera to track the tracking target subject corresponding to the role. Also, in a case where the angle of view of the main camera 500 has changed, the CPU 101 calculates an amount of change in the zoom value corresponding to the role of the target sub camera. The details will be described in the third embodiment.

In step S4415, the CPU 101 transmits, to the target sub camera, a control command including the pan, tilt, and zoom values obtained by reflecting the calculated amounts of changes in the current values.

Figures 1, 4D:
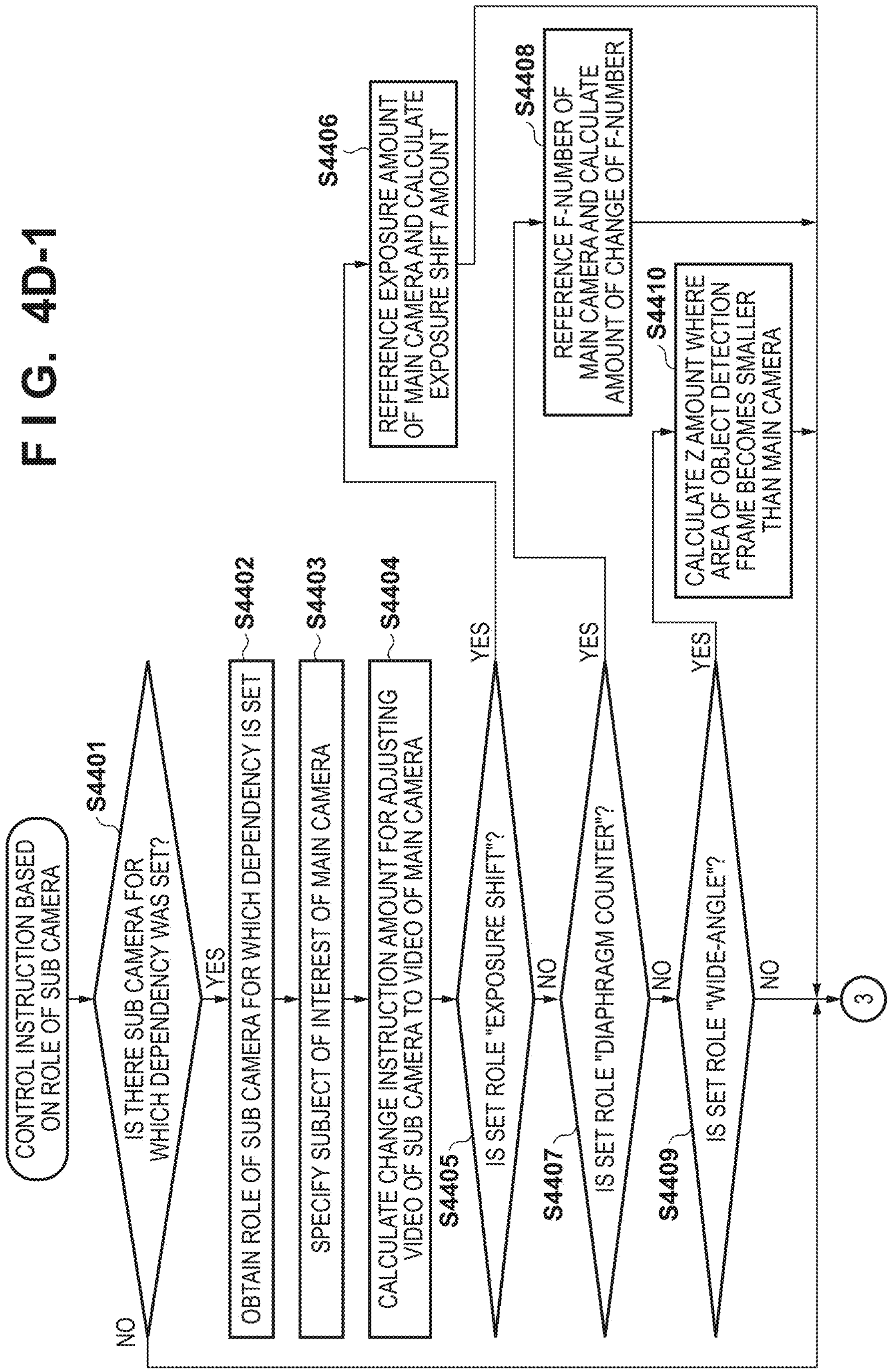
Figures 2, 4D:
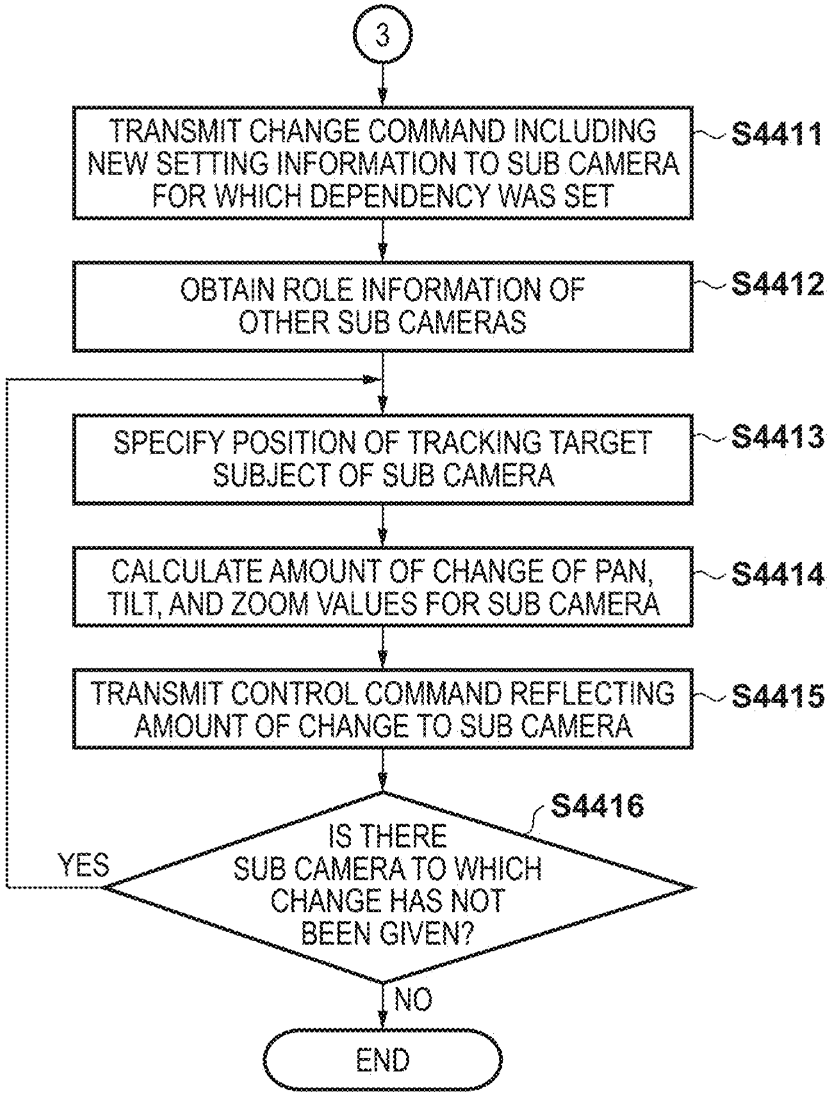

In step S4416, the CPU 101 determines whether there is a sub camera to which a change instruction has not been issued; if it has been determined that such a sub camera exists, step S4413 is executed again, whereas if it has not been thus determined, the operations of FIGS. 4D-1 and 4D-2 are ended.

According to the present embodiment, in the multi-camera image capture system, it is possible to cause the method of controlling the tracking target subject, capture direction, angle of view, and the like of a sub camera that performs automatic image capture in coordination with a main camera to vary in accordance with a set role. Therefore, a wide variety of videos can be obtained from sub cameras. Furthermore, in a case where it has been determined that a capture environment has changed to the extent that the quality of a video of the main camera has become low or has the possibility of becoming low, a video that maintains constant quality can be continuously captured by setting, on a sub camera, a role for backing up the main camera. This is useful especially in capturing a scene that cannot be captured again, such as a scene of a wedding, for example.

Note that the roles that can be set on a sub camera that backs up the main camera are not limited to the above-described examples. It is possible to make another capture parameter that influences the image quality (e.g., white balance) different, similarly to a case where different exposure amounts are used. For example, in a case where the white balance of the main camera has been manually set, a role that performs image capture using auto white balance is set on a sub camera that is to perform backup image capture. In this way, even in a case where chromatic aberration has occurred in the video of the main camera, a video obtained through backup image capture performed by the sub camera can be used.

Furthermore, it is possible to cause a sub camera that backs up the main camera to perform image capture under the same settings as the main camera. In this way, the two cameras can perform image capture in similar ways.

Furthermore, when automatically determining a sub camera that backs up the main camera, whether the sub camera is capturing a video that is currently distributed and the priority order set on the sub camera are taken into consideration. This can prevent an unintended sub camera from being determined as a sub camera that backs up the main camera.

Furthermore, in a case where there is a pre-set setting indicating candidates for a sub camera that backs up the main camera, a sub camera that backs up the main camera is determined in accordance with the pre-set setting. Accordingly, a user who does not wish for automatic decision can designate sub cameras that act as candidates in advance.

Furthermore, in a case where the main camera no longer satisfies a predetermined condition, control can be performed to cancel a dependency setting on a sub camera; this can prevent the role of the sub camera from being changed in a situation where dependency is unnecessary. As a result, the time period in which the sub camera performs image capture under the role that was originally set thereon can be extended.

Although the capture control apparatus 100 and the main camera 500 have been described as independent apparatuses according to the present embodiment, the functions of the capture control apparatus 100 can be embedded in the main camera 500. In this case, the video of the overhead camera 300 is supplied to the main camera 500. This configuration can reduce the number of devices necessary to realize the multi-camera image capture system.

Second Embodiment

Next, a second embodiment of the present invention will be described. As the present embodiment can be implemented in the image capture system described in the first embodiment, a description related to configurations is omitted. Furthermore, it is assumed that the roles that can be set on sub cameras are also similar to those of the first embodiment. However, in the present embodiment, the main camera 500 may not exist. Therefore, in a case where the main camera 500 does not exist, a tracking target subject corresponding to a role and the content of control on the angle of view are determined independently for each sub camera.

In a multi-camera image capture system that performs automatic image capture using a plurality of cameras, there is possibly a case where a capture environment changes to the extent that a certain camera becomes no longer capable of capturing an intended video for some reason. In a case where there is a camera that can no longer capture an intended video, the present embodiment suppresses the influence of absence of the video that is supposed to be captured by this camera.

Using the flowcharts shown in FIG. 5A to FIG. 5D, the following describes the operations of the capture control apparatus 100 according to the present embodiment. The operations of the capture control apparatus 100 described below are realized by the CPU 101 controlling each unit of the capture control apparatus 100 through the execution of the program that has been stored in the ROM 103 or has been obtained via the network I/F 105.

Figure 5A:
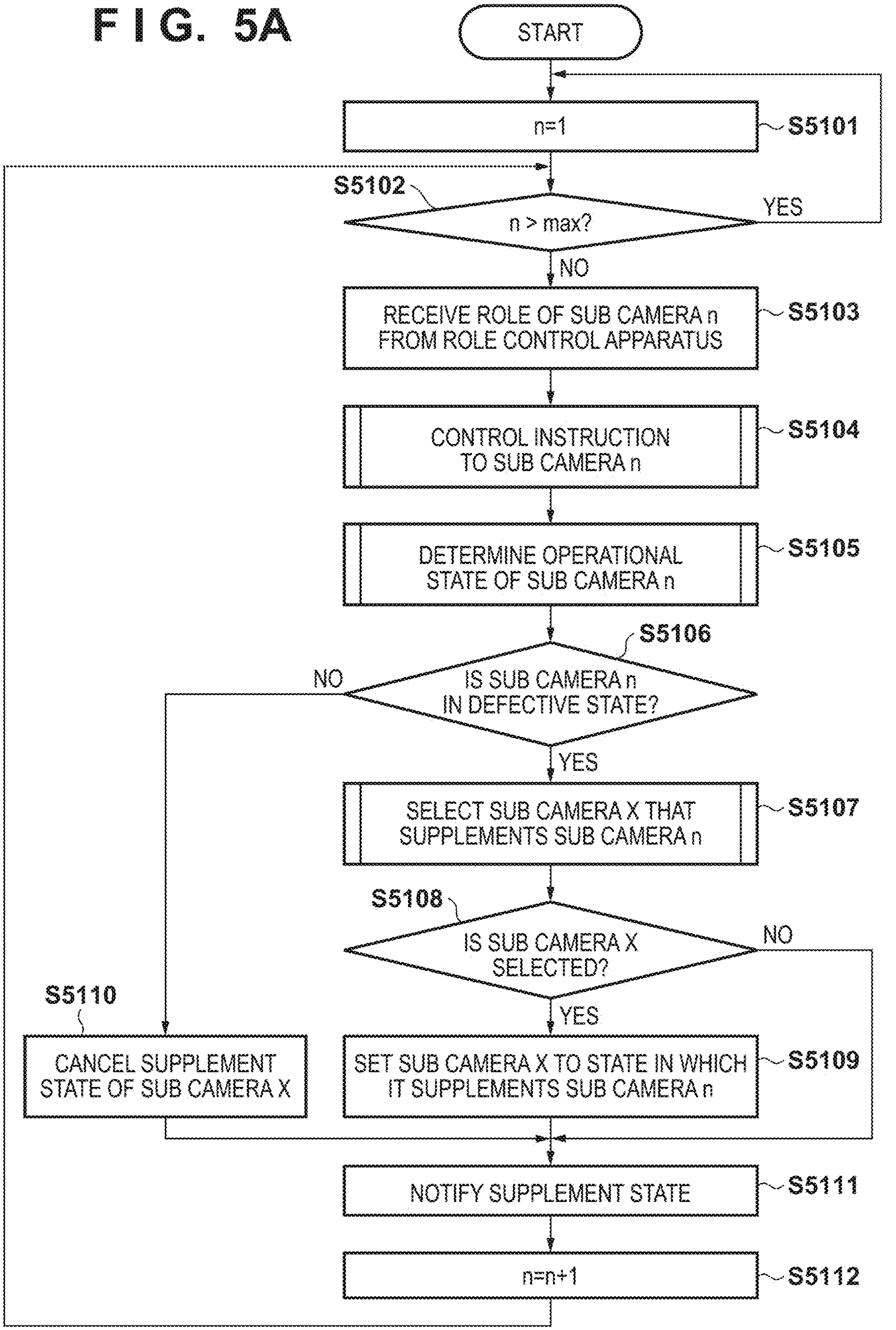
FIG. 5A is a flowchart showing the operations of the capture control apparatus 100 according to a second embodiment.

FIG. 5A is a flowchart showing the overall operations of the capture control apparatus 100 according to the present embodiment.

In step S5101, the CPU 101 resets the value of a variable n for counting sub cameras to 1.

In step S5102, the CPU 101 determines whether the variable n has exceeded the total number max of sub cameras; if it has been determined that the variable n has exceeded the total number max, step S5101 is executed, whereas if it has not been thus determined, step S5103 is executed. In the example shown in FIG. 6, as there are four sub cameras, max=4.

In step S5103, the CPU 101 obtains a role of a sub camera n (1≤n≤max) from the role control apparatus 400. Note that it is not necessary to obtain a role for each sub camera; pieces of role information of all sub cameras may be obtained from the role control apparatus 400 and stored into the RAM 102, and the RAM 102 may be referred to thereafter. The sub camera n corresponds to one of the sub cameras 600 to 900.

In step S5104, the CPU 101 issues a control instruction to the sub camera n. The details will be described later using FIG. 5B.

In step S5105, the CPU 101 determines an operational state of the sub camera n. The details will be described later using FIG. 5C.

In step S5106, the CPU 101 reads out, from the RAM 102, the operational state of the sub camera n that has been determined in step S5105, and determines whether the sub camera n is in a defective state. The defective state is a state where an operation associated with the role obtained in step S5103 has not been performed. The CPU 101 executes step S5107 if it has been determined that the sub camera n is in the defective state, and step S5111 if it has not been thus determined.

In step S5107, the CPU 101 selects a sub camera X that supplements the sub camera n in the defective state. The details will be described later using FIG. 5D. The sub camera X corresponds to one of the sub cameras 600 to 900 excluding the sub camera n.

In step S5108, the CPU 101 determines whether the sub camera X has been selected in step S5107; if it has been determined that the selection has been made, step S5109 is executed, whereas if it has not been thus determined, step S5111 is executed.

In step S5109, the CPU 101 sets a state where the sub camera X supplements the sub camera n. Specifically, the CPU 101 stores a value indicating the state where the sub camera X supplements the sub camera n into a sub camera state management area provided inside the RAM 102.

In step S5110, the CPU 101 cancels the setting if there is a sub camera X that supplements the sub camera n. Specifically, the CPU 101 deletes the value indicating the state where the sub camera X supplements the sub camera n from the sub camera state management area inside the RAM 102.

In step S5111, the CPU 101 notifies the main camera 500 and the role control apparatus 400 of a supplement state via the network I/F 105. The supplement state mentioned here is information including the operational state of the sub camera n (whether it is in the defective state), and information of the sub camera X that supplements the sub camera n in a case where the sub camera n is in the defective state. In this way, the main camera 500 and the role control apparatus 400 can present a display for notifying a user of the supplement state, or cancel the display.

In step S5112, the CPU 101 increments the variable n for counting sub cameras. Thereafter, the CPU 101 executes step S5102.

(Control Instruction to Sub Camera)

Figure 5B:
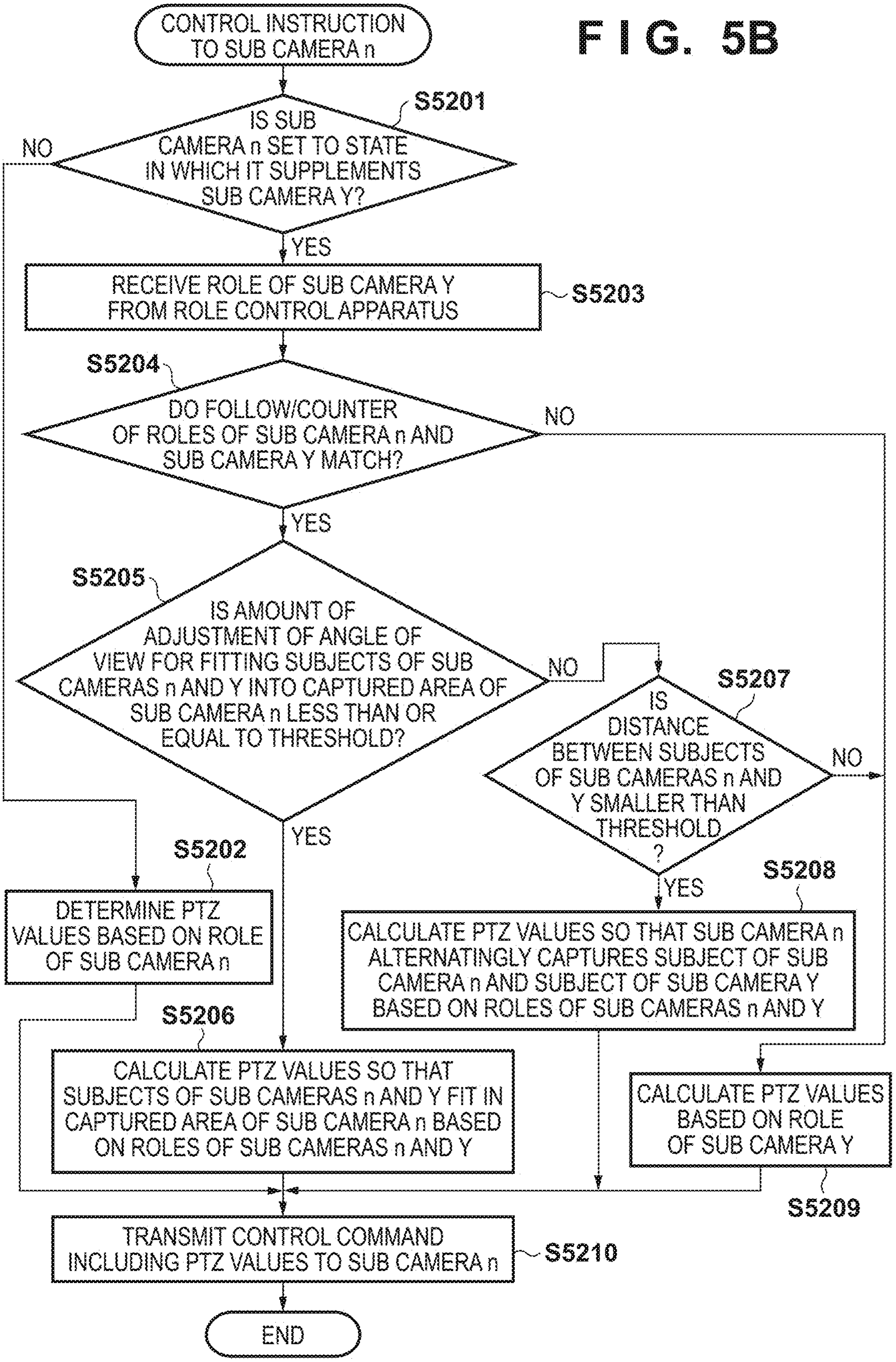
FIG. 5B is a flowchart showing the operations of the capture control apparatus 100 according to the second embodiment.

Next, the details of operations in step S5104 of FIG. 5A will be described using the flowchart shown in FIG. 5B.

In step S5201, the CPU 101 determines whether the sub camera n has been set to be in a state where it supplements another sub camera Y in step S5109; if it has been determined that this setting has been configured, step S5203 is executed, whereas if it has not been thus determined, step S5202 is executed. The sub camera Y corresponds to one of the sub cameras 600 to 900 excluding the sub camera n.

In step S5202, the CPU 101 calculates the pan, tilt, and zoom values of the sub camera n based on the role of the sub camera n obtained in step S5103. The pan, tilt, and zoom values can be calculated using, for example, a method described in the third embodiment. Thereafter, the CPU 101 executes step S5210.

In step S5203, the CPU 101 obtains the role of the sub camera Y in a manner similar to step S5103.

In step S5204, the CPU 101 determines whether the directions of angle-of-view control (follow or counter) match among the contents of control associated with the original role of the sub camera n and the role of the sub camera Y. In a case where the main camera 500 does not exist, the CPU 101 determines whether the angles of view of the sub camera n and the sub camera Y are similar to each other. The CPU 101 determines that the angles of view are similar to each other if, for example, the difference between the angles of view is equal to or smaller than a threshold. The CPU 101 executes step S5205 if it has been determined that the directions of angle-of-view control match or the angles of view are similar to each other, and step S5209 if it has not been thus determined.

In step S5205, the CPU 101 determines whether the amount of adjustment of the angle of view necessary for including the subjects of both of the sub cameras n and Y in the captured area of the sub camera n is equal to or smaller than a threshold. The amount of adjustment and the threshold may each be, for example, a value based on a zoom value as a unit. The CPU 101 can make the determination based on position information of subjects detected from the videos of the overhead camera 300 and the sub camera Y, and on the current capturing angle of view of the sub camera n. The CPU 101 executes step S5206 if it has been determined that the necessary amount of adjustment of the angle of view is equal to or smaller than the threshold, and step S5207 if it has not been thus determined.

In step S5206, based on the roles of both of the sub cameras n and Y, the CPU 101 calculates the pan, tilt, and zoom values of the sub camera n so as to include the subjects of both sub cameras in the captured area. The CPU 101 calculates, from the videos of the sub cameras n and Y, the positions of the mass centers of the subjects that have been respectively captured by the sub cameras n and Y. Then, the CPU 101 calculates the pan and tilt values of the sub camera n so as to track the positions of the mass centers. Thereafter, the CPU 101 executes step S5210.

In step S5207, the CPU 101 determines, for example, whether the distance between the subject of the sub camera n and the subject of the sub camera Y in the video of the overhead camera 300 is shorter than a threshold; if it has been determined that the distance is shorter than the threshold, step S5208 is executed, whereas if it has not been thus determined, step S5209 is executed. The distance may be the distance between the positions of the mass centers, for example.

In step S5208, based on the roles of both of the sub cameras n and Y, the CPU 101 calculates the pan and tilt values of the sub camera n so as to capture both subjects alternatingly. Thereafter, the CPU 101 executes step S5210.

In step S5209, the CPU 101 calculates the pan, tilt, and zoom values of the sub camera n based on the role of the sub camera Y obtained in step S5203 in a manner similar to step S5202.

In step S5210, the CPU 101 transmits a control command including the calculated pan, tilt, and zoom values to the sub camera n via the network I/F 105. This concludes the operations related to a control instruction to the sub camera n.

(Determination of Operational State of Sub Camera n)

Figure 5C:
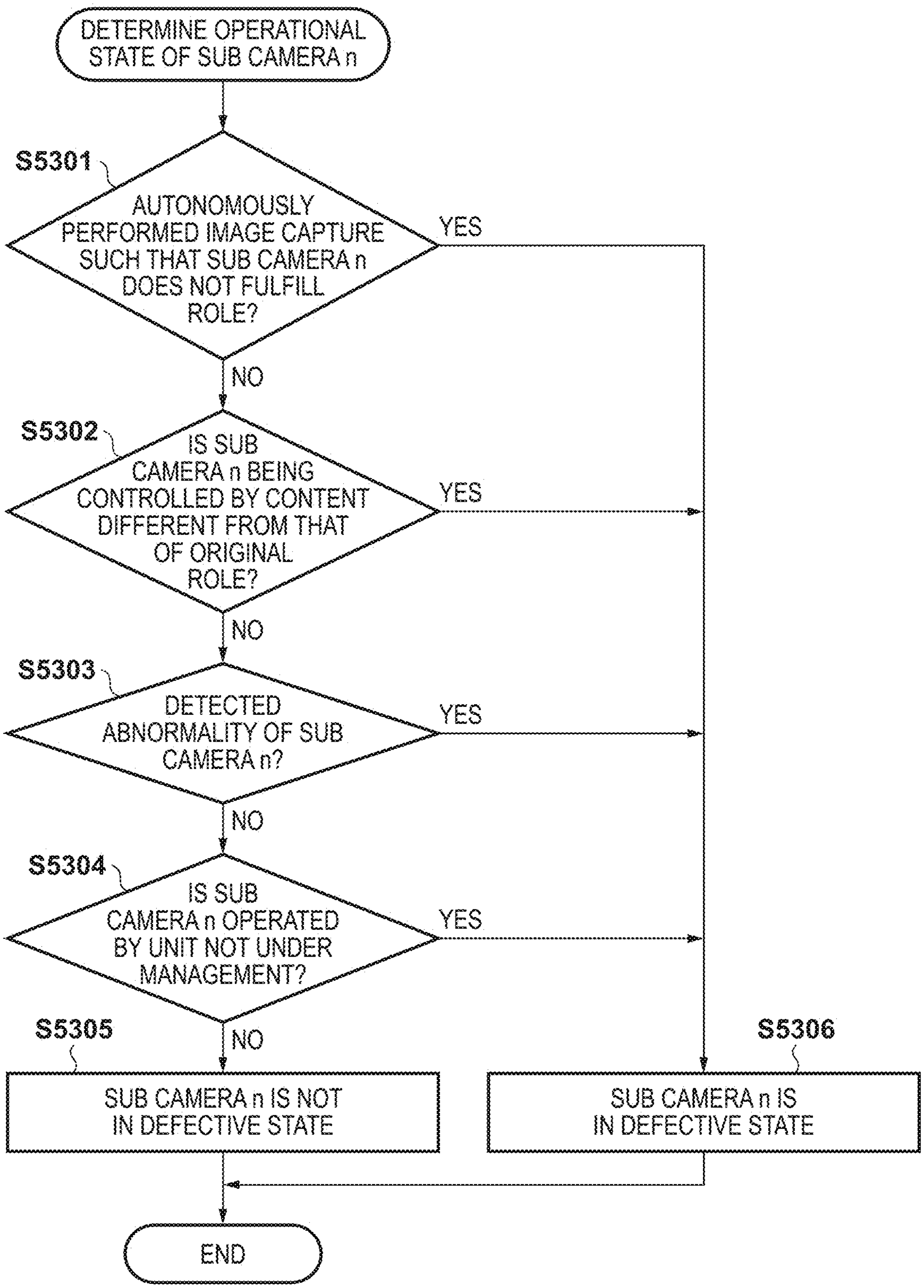
FIG. 5C is a flowchart showing the operations of the capture control apparatus 100 according to the second embodiment.

Next, the details of operations in step S5105 of FIG. 5A will be described using the flowchart shown in FIG. 5C.

In step S5301, the CPU 101 determines whether the sub camera n has autonomously executed image capture differently from the role obtained in step S5103. This execution corresponds to, for example, a case where the sub camera n has determined a tracking target subject by itself and captured a subject of interest differently from its role using a technique disclosed in Japanese Patent Laid-Open No. 2020-182075. The CPU 101 executes step S5306 if it has been determined that the sub camera n has performed image capture that does not fulfill its role, and step S5302 if it has not been thus determined.

In step S5302, the CPU 101 determines whether the sub camera n is controlled in accordance with content different from the content of control associated with the role obtained in step S5103. This control corresponds to the following cases, for example.

- A case where a dependency setting has been configured on the sub camera n as described in the first embodiment
- A case where the capture control apparatus 100 controls the sub camera n while regarding a subject included in the videos captured by the overhead camera 300 and a sub camera other than the sub camera n as a tracking target subject
- A case where the capture control apparatus 100 controls the sub camera n as a sub camera that supplements another camera in a defective state These are merely examples, and other cases may be included. The CPU 101 executes step S5306 if it has been determined that the sub camera n is controlled in accordance with a control different from its original role, and step S5303 if it has not been thus determined.

In step S5303, the CPU 101 determines whether an abnormal state of the sub camera n has been detected; if it has been determined that the abnormal state has been detected, step S5306 is executed, whereas if it has not been thus determined, step S5304 is executed. The abnormal state means a state where image capture based on a role has been obstructed, and corresponds to, for example, the failure of each unit of the sub camera n, loss of power, disruption of communication, shortage in the recording capacity, and the like.

The abnormal state of the sub camera n can be detected by receiving, on the capture control apparatus 100, a notification indicating an abnormality detected by a self-checking function possessed by the sub camera n itself. Also, the CPU 101 may detect an abnormality in the sub camera n based on the videos captured by the overhead camera 300 and sub cameras (including the sub camera n). This corresponds to, for example, a case where the video cannot be received from the sub camera n, a case where a subject region cannot be detected from the video of the sub camera n, a case where the sub camera n cannot capture a tracking target subject at an appropriate position, and the like. This can also correspond to a case where communication cannot be performed with the sub camera n, a case where a notification that is supposed to be received from the sub camera n cannot be received for a certain time period, and the like.

In step S5304, the CPU 101 determines whether the sub camera n has been operated by a unit that is not under management by the capture control apparatus 100; if it has been determined that the sub camera n has been operated by the unit that is not under management, step S5306 is executed, whereas if it has not been thus determined, step S5305 is executed. This corresponds to, for example, a case where an operation performed on the sub camera n via the user input unit 613 has been detected.

In step S5305, the CPU 101 determines that the sub camera n is not in the defective state. The CPU 101 reflects the determination result in sub camera information stored in the RAM 102, and ends the operations shown in FIG. 5C.

In step S5306, the CPU 101 determines that the sub camera n is in the defective state. The CPU 101 reflects the determination result in sub camera information stored in the RAM 102, and ends the operations shown in FIG. 5C.

(Selection of Sub Camera X that Supplements Sub Camera n)

Finally, the details of operations in step S5107 of FIG. 5A will be described using the flowchart shown in FIG. 5D.

In step S5401, the CPU 101 obtains the role and the priority order of every sub camera from the role control apparatus 400, and stores them into the RAM 102. Note that if these pieces of information have already been stored in the RAM 102, they need not be obtained again.

In step S5402, the CPU 101 obtains pieces of information related to all of the sub cameras, and stores them into the RAM 102. Information obtained here can include the following, for example.

- Information of the image capture optical system (the range of the focal length, and the minimum and maximum f-numbers)
- Information of the driving unit (the ranges in which pan and tilt can be performed, and the current angle of view)
- The position of placement (e.g., three-dimensional coordinates in a coordinate system that has a predetermined origin)
- The current capture direction (which may be the pan and tilt angles of the driving unit)
- Information of the image sensor (the number of pixels, sensor size, color filter type, etc.)

Note that all of the above need not be indispensable, and other types of information may be included.

Pieces of information that have been obtained most recently and stored into the RAM 102 may be used, or pieces of information may be obtained from the sub cameras on an as-needed basis.

In step S5403, the CPU 101 determines whether there is a sub camera A that is similar to the sub camera n in position and capability. The sub camera A is selected from among the sub cameras 600 to 900 excluding the sub camera n. For example, the CPU 101 can regard a sub camera whose position of placement is at a distance shorter than a threshold, and whose pan and tilt driving range and zoom range each have an overlap at a predetermined percentage or more, as the sub camera A. Note that the conditions of the sub camera A are not limited to these. The CPU 101 executes step S5404 if it has been determined that the sub camera A exists, and step S5405 if it has not been thus determined.

In step S5404, the CPU 101 compares the priority order of the sub camera n with the priority order of the sub camera A. Then, the CPU 101 executes step S5411 if the priority order of the sub camera n is higher (the numerical value of this priority order is smaller), and executes step S5405 otherwise.

In step S5405, the CPU 101 determines whether there are a plurality of other sub cameras on which the same role has been set as the sub camera n; step S5406 is executed if it has been determined that a plurality of such sub cameras exist, and step S5408 is executed if it has not been thus determined.

In step S5406, the CPU 101 determines a sub camera with the lowest priority order among the plurality of other sub cameras on which the same role has been set as the sub camera n as the sub camera A.

In step S5407, the CPU 101 compares the priority order of the sub camera n with the priority order of the sub camera A in a manner similar to step S5404. The CPU 101 executes step S5411 if the priority order of the sub camera n is higher, and step S5408 otherwise.

In step S5408, the CPU 101 determines a sub camera with the lowest priority order among all sub cameras as the sub camera A.

In step S5409, the CPU 101 determines whether the sub camera n and the sub camera A are the same; if it has been determined that they are the same, step S5410 is executed, whereas if it has not been thus determined, step S5411 is executed.

Figure 5D:
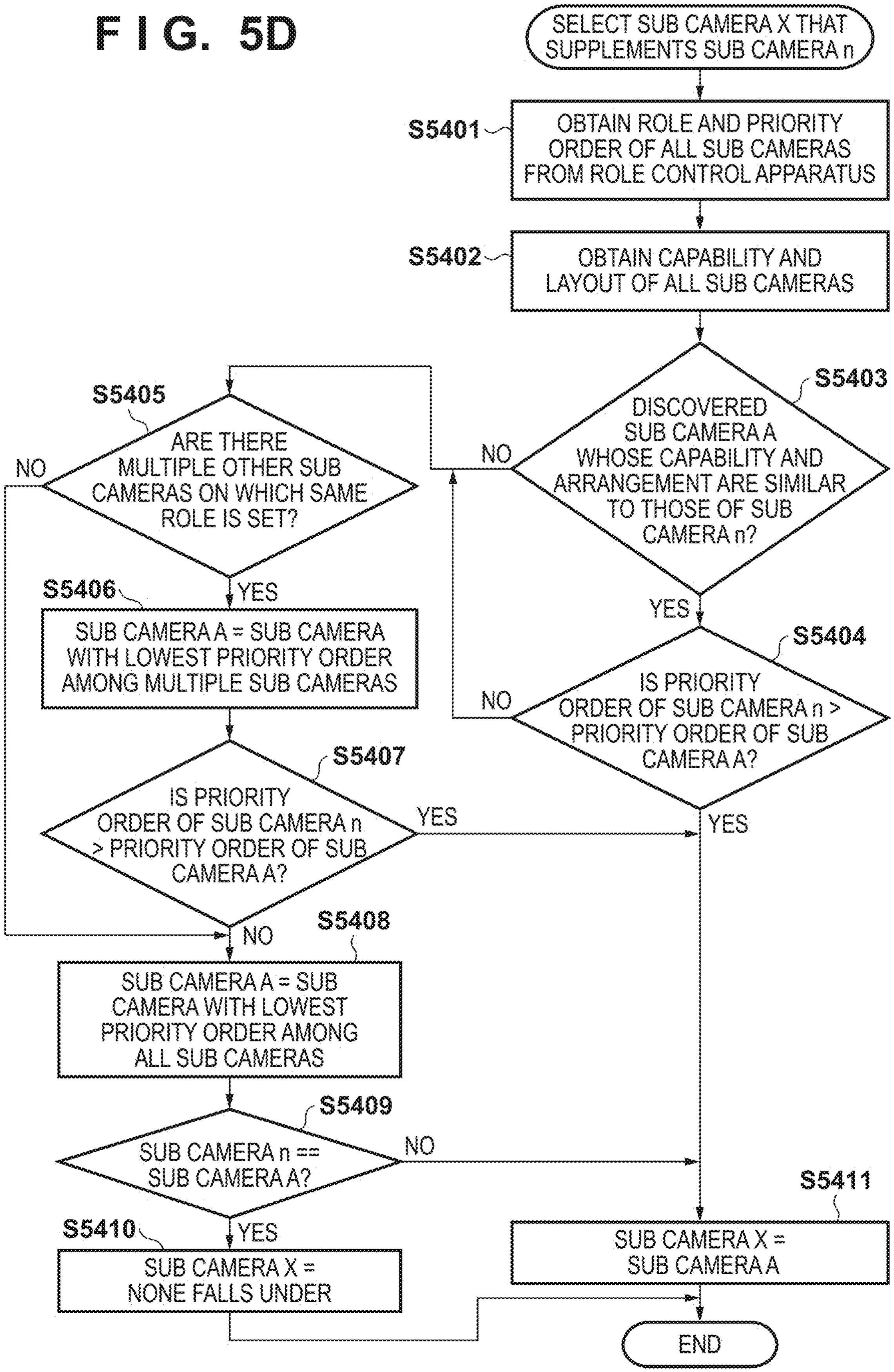
FIG. 5D is a flowchart showing the operations of the capture control apparatus 100 according to the second embodiment.

In step S5410, the CPU 101 determines that there is no sub camera that falls under the sub camera X, and ends the operations shown in FIG. 5D.

In step S5411, the CPU 101 determines the sub camera A as the sub camera X, and ends the operations shown in FIG. 5D.

The following describes exemplary transitions of roles of sub cameras according to the second embodiment using FIG. 7A to FIG. 7D, which are schematic diagrams similar to FIG. 6.

Figure 7A:
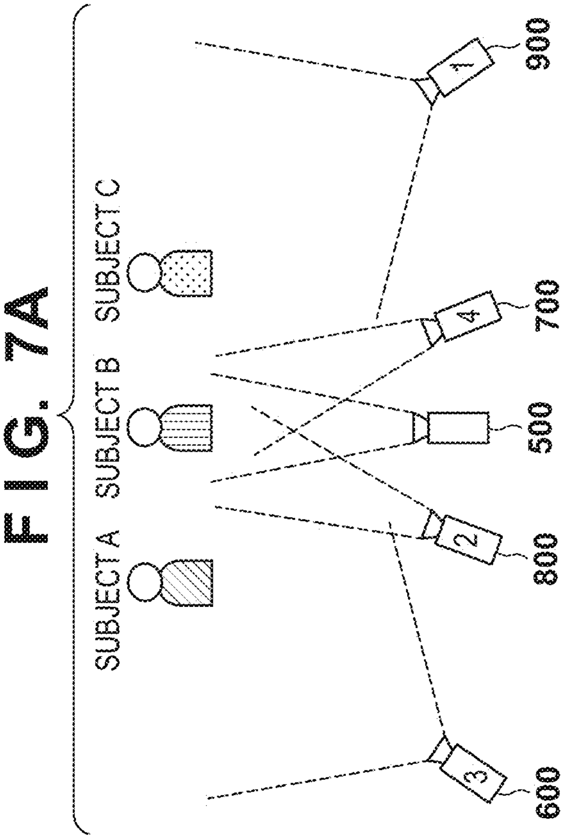
FIGS. 7A to 7D are diagrams showing exemplary transitions of roles of sub cameras according to the second embodiment.

In FIG. 7A, the role control apparatus 400 has set the role “assist counter L” on the sub camera 600, the role “main follow” on the sub cameras 700 and 800, and the role “assist counter R” on the sub camera 900. Also, the capture control apparatus 100 executes operational control corresponding to the set role with respect to each of the sub cameras 600 to 900.

Figure 7B:
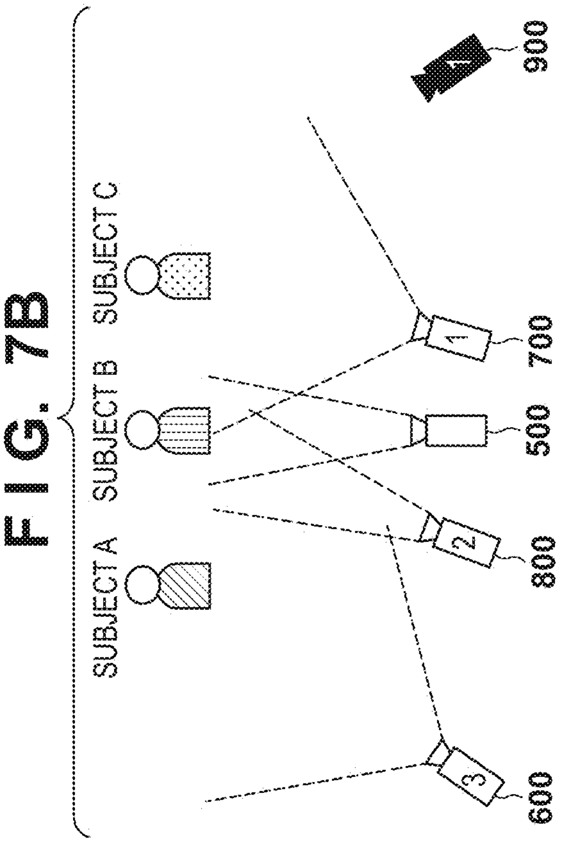

Here, assume that the sub camera 900 has been placed in the defective state for some reason. In this case, among the sub cameras 700 and 800 on which the same role has been set, the sub camera 700 with a lower priority order is selected as the sub camera X that substitutes for the sub camera 900. As a result, the role of the sub camera 700 is switched to "assist counter R", and the capture control apparatus 100 performs control corresponding to this role (FIG. 7B). The roles of the sub camera 600 and the sub camera 800 are not changed.

Figure 7C:
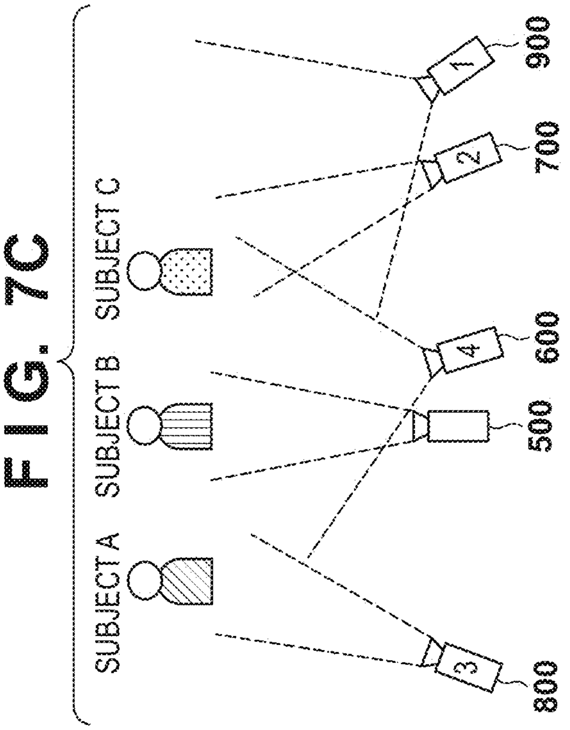

Another example will now be described. In FIG. 7C, the roles of "main counter", "assist follow R", "assist follow L", and "assist counter R" have been set on the sub cameras 600, 700, 800, and 900, respectively. Also, the capture control apparatus 100 executes operational control corresponding to the set role with respect to each of the sub cameras 600 to 900.

Figure 7D:
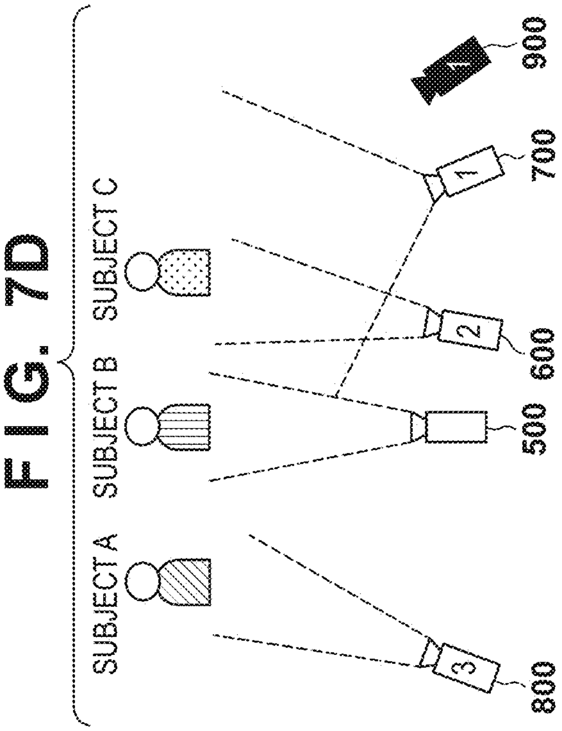

Here, assume that the sub camera 900 has been placed in the defective state for some reason. In this case, the sub camera 700 which is similar to the sub camera 900 in capability and position and which has a lower priority order than the sub camera 900 is selected as the sub camera X that substitutes for the sub camera 900. As a result, the role of the sub camera 700 is switched to "assist counter R", and the capture control apparatus 100 performs control corresponding to this role. Furthermore, the sub camera 700 is placed in the defective state as it no longer serves its original role; consequently, the sub camera 600 that has the lowest priority order among the remaining sub cameras is selected as the sub camera X that substitutes for the sub camera 700. As a result, the role of the sub camera 600 is switched to "assist follow R", and the capture control apparatus 100 performs control corresponding to this role (FIG. 7D).

According to the present embodiment, in a case where a sub camera with a high priority order can no longer perform intended image capture among a plurality of sub cameras included in a multi-camera image capture system, another sub camera executes the image capture as a substitute. Therefore, a video similar to a video that is supposed to be captured by a sub camera with a high priority order can be continuously obtained, and highly reliable multi-camera image capture can be realized. Substitute image capture of a sub camera used in substitute image capture of another sub camera can also be executed by still another sub camera.

Furthermore, it is also possible to control the operations so that the role that has been set on a sub camera that performs substitute image capture can be maintained even after the substitute image capture has started, without simply setting the role that has been set on a sub camera in a defective state on the sub camera that performs substitute image capture.

The photographer of the main camera 500 and the operator of the role control apparatus 400 can be notified of a defective state of a sub camera. This can assist prompt actions, such as an exchange of a sub camera in a defective state.

Although the capture control apparatus 100 and the main camera 500 have been described as independent apparatuses according to the present embodiment, the functions of the capture control apparatus 100 can be embedded in the main camera 500. In this case, the video of the overhead camera 300 is supplied to the main camera 500. This configuration can reduce the number of devices necessary to realize the multi-camera image capture system.

Third Embodiment

Next, a third embodiment of the present invention will be described. As the present embodiment can be implemented in the image capture system described in relation to FIG. 1 and FIG. 2, a description related to configurations is omitted. It is assumed in the present embodiment that four types of roles shown in FIG. 9 can be set on the sub cameras 600 to 900. Each role and the content of control related thereto are the same as the role of the same name in FIG. 3. Note that "assist follow" and "assist counter" in FIG. 9 correspond to "assist follow L" and "assist counter L" in FIG. 3, respectively.

<Description of Operations of Each Apparatus>

Subsequently, the operations of each apparatus in the multi-camera image capture system will be described. It is assumed here that the capture control apparatus 100 performs automatic control on a capture operation of the sub cameras 600 to 900 based on a video of the overhead camera 300, information obtained from the main camera 500, and a role set on the sub cameras 600 to 900.

Figure 8:
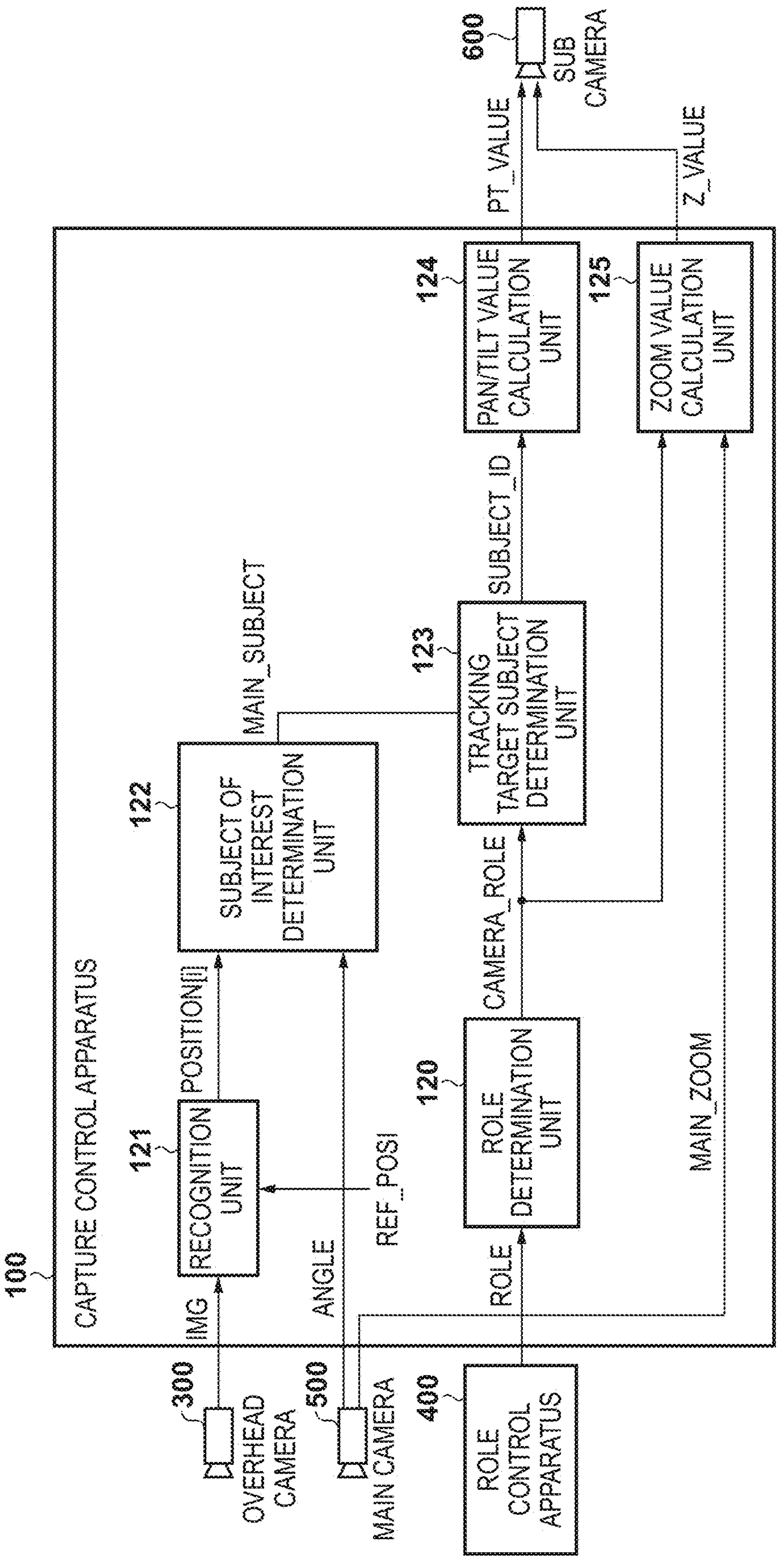
FIG. 8 is a diagram showing the capture control apparatus 100 according to an embodiment, with a focus on main operations and flows of signals.

FIG. 8 is a diagram showing a processing sequence that is performed when the capture control apparatus 100 controls the operations of the sub cameras 600 to 900, with a focus on main operations and flows of signals. The functional blocks shown inside the capture control apparatus 100 schematically indicate the main operations, and are equivalent to the main functions provided by the capture control application. Each functional block of FIG. 8 is realized by a combination of the CPU 101, which executes the capture control application, and one or more of the functional blocks of the capture control apparatus 100 shown in FIG. 2.

Figures 9, 10:
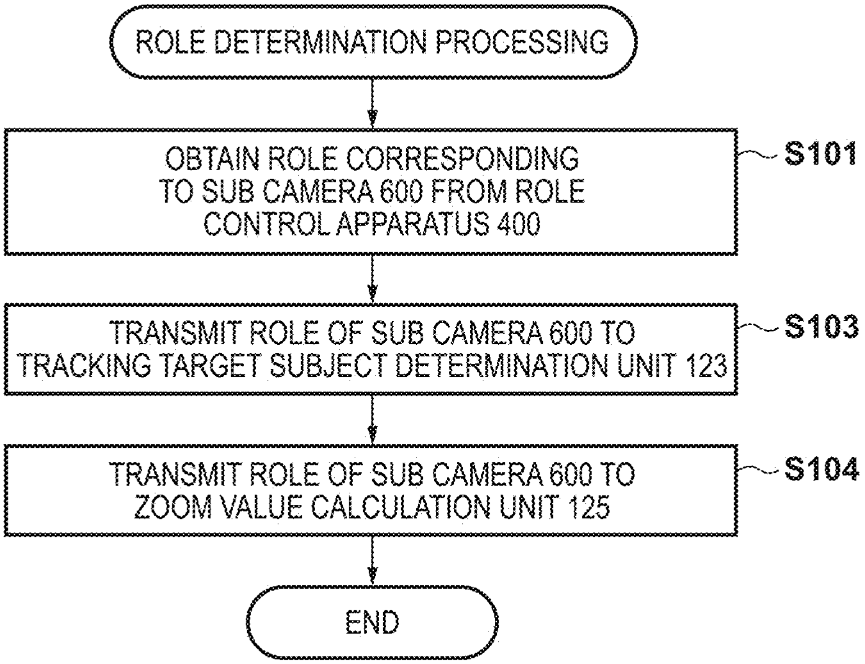
FIG. 9 is a diagram showing examples of roles and contents of control that can be set on a sub camera according to a third embodiment.
FIG. 10 is a flowchart related to role determining processing according to the third embodiment.

FIG. 10 is a flowchart showing the operations of the CPU 101 as a role determination unit 120. Also, FIG. 11A to FIG. 11D are flowcharts related to the operations of the capture control apparatus 100, the overhead camera 300, the main camera 500, and the sub camera 600, respectively. Since the sub cameras 700, 800, and 900 operate in the same manner as the sub camera 600, only the operation of the sub camera 600 is described below. Therefore, the descriptions of the sub camera 600 in the following also applies to the sub camera 700, 800, and 900.

In the following descriptions, it is assumed that the capture control apparatus 100 is aware of the three-dimensional coordinate value of the viewpoint position of the overhead camera 300 and the capture direction (the optical axis direction) thereof. Furthermore, it is assumed that known position information, such as the three-dimensional coordinate values of the viewpoint positions of the sub camera 600 and the main camera 500, and the coordinate values of markers placed in the captured area, is stored in advance as predetermined position information REF_POSI in the ROM 103. Note, it is assumed that the coordinate system of a position is determined in advance in accordance with the type of the position.

(Operations of Role Determination Unit 120)

First, the operations of the CPU 101 as the role determination unit 120 of FIG. 8 will be described with reference to the flowchart shown in FIG. 10. The operations described below are realized by the CPU 101 executing the capture control application.

Note that although the timing to start the operations shown in the flowchart of FIG. 10 is not limited in particular, the operations are executed at least before the start of control on the capture operation of the sub cameras 600 to 900. Furthermore, it is assumed that the operations are also executed upon receiving a notification indicating that the role setting on the sub cameras 600 to 900 has been changed from the role control apparatus 400 via the network I/F 105.

In step S101, the CPU 101 as the role determination unit 120 obtains a role (ROLE) corresponding to the sub cameras 600 to 900 (role setting information) from the role control apparatus 400. The CPU 101 can obtain the above-described role setting information from the role control apparatus 400 by, for example, transmitting a role obtainment command to the role control apparatus 400 via the network I/F 105. The CPU 101 stores the obtained role setting information into the RAM 102.

In step S103, the CPU 101 refers to the role setting information stored in the RAM 102 based on identification information of the sub cameras 600 to 900, and obtains the content of operational control on the sub cameras 600 to 900. Then, the CPU 101 as the role determination unit 120 transmits the obtained content of operational control (CAMERA_ROLE) to a tracking target subject determination unit 123. In practice, the CPU 101 stores the content of operational control into a specific region of the RAM 102, and refers to the same when it functions as the tracking target subject determination unit 123.

In step S104, the CPU 101 as the role determination unit 120 transmits the obtained content of operational control (CAMERA_ROLE) to a zoom value calculation unit 125. In practice, the CPU 101 stores the content of operational control into a specific region of the RAM 102, and refers to the same when it functions as the zoom value calculation unit 125.

(Operations of Capture Control Apparatus 100)

Next, the operations of the capture control apparatus 100 to control image capture performed by the sub cameras 600 to 900 will be described with reference to FIG. 8 and FIG. 11A. The operations described below are equivalent to the operations of the CPU 101 as a recognition unit 121, a subject of interest determination unit 122, a tracking target subject determination unit 123, a pan/tilt value calculation unit 124, and a zoom value calculation unit 125 of FIG. 8. Note that the operations described below are realized by the CPU 101 executing the capture control application.

In step S201, the CPU 101 transmits a capture instruction command to the overhead camera 300 via the network I/F 105 using a predetermined protocol. In response to this command, the overhead camera 300 starts to supply video signals (moving image data) IMG to a video input unit 107. The CPU 101 starts to store the video signals received by the video input unit 107 into the RAM 102, and then executes step S202.

In step S202, the CPU 101 obtains information ANGLE indicating a capture direction from the main camera 500. Specifically, the CPU 101 transmits a capture direction obtainment command to the main camera 500 via the network I/F 105 using a predetermined protocol. In response to the capture direction obtainment command, a CPU 501 of the main camera 500 transmits information ANGLE indicating the current capture direction of the main camera 500 to the capture control apparatus 100. The information ANGLE may be, for example, the pan and tilt angles of the driving unit 509. The CPU 101 stores the obtained information ANGLE into the RAM 102.

In step S203, the recognition unit 121 executes the following processing.

(1) Apply processing for detecting subject regions to an input frame image, and store the detection results.

(2) For each of the detected subject regions, apply coordinate transformation to position information (image coordinates).

(3) For each of the detected subject regions, apply identification processing and specify identification information (in the case of a new subject, add information for identification processing).

(4) For each of the detected subject regions, store identification information ID[n] and position information POSITION[n] in association with each other.

The recognition unit 121 is realized mainly by the CPU 101 and the inference unit 104. The CPU 101 reads out, from the RAM 102, one frame of the video received from the overhead camera 300, and inputs the frame to the inference unit 104.

The following describes the operations of the recognition unit 121 in order.

(1) First, the inference unit 104 inputs the frame image to the machine learning model, and detects subject regions. The inference unit 104 stores the positions and the sizes of the respective subject regions that have been detected and the detection reliability degrees thereof, which have been output by the machine learning model as detection results, into the RAM 102. A position and a size of a subject region may be any information that allows a position and a size of a rectangular region in which the subject region is inscribed to be specified. Here, the central coordinates of the lower edge of the rectangular region, and the width and the height of the rectangular region, are used as the position and the size of the subject region.

Also, the inference unit 104 stores the detection results for the first frame image into the RAM 102 in association with identification information pieces ID[n] of subjects. Here, n is a subject number, and is an integer that takes a value from one to the total number of detected subject regions. Furthermore, the inference unit 104 stores the subject regions detected from the first frame image as templates for identifying the individual subjects into the RAM 102 in association with the identification information pieces ID[n] of the subjects. In a case where template matching is not used in identification of subjects, the templates may not be stored.

Figure 12A:
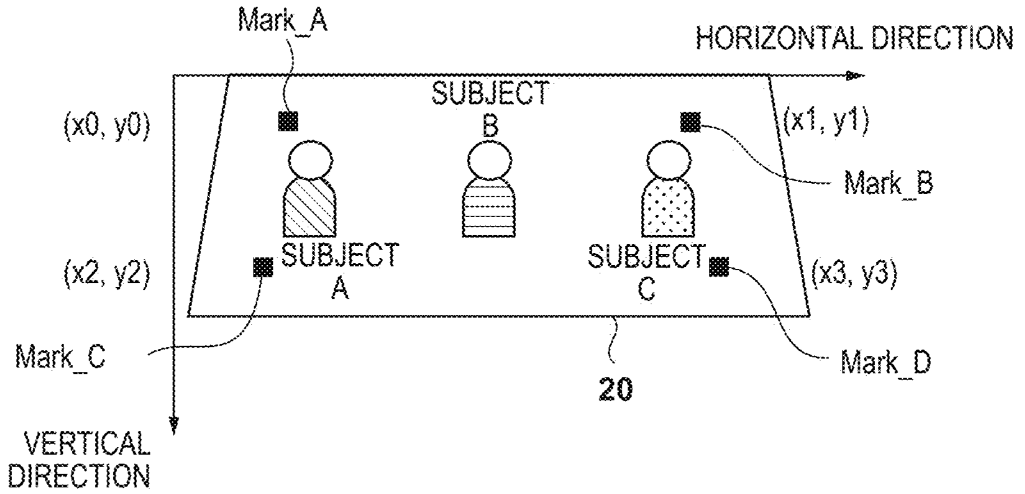
FIGS. 12A and 12B are diagrams illustrating a coordinate transformation according to an embodiment.
Figure 13A:
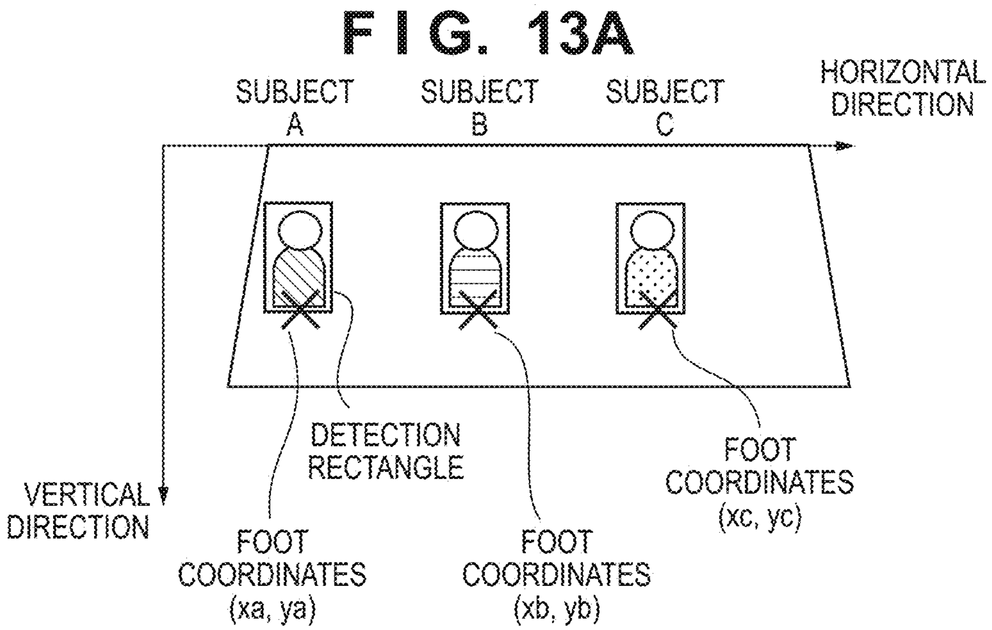
FIGS. 13A and 13B are diagrams related to subject detection and a coordinate transformation according to an embodiment.

FIG. 13A shows examples of the results of subject detection processing that has been executed by the inference unit 104 with respect to a video of the overhead camera 300 shown in FIG. 12A. Here, the regions of human subjects A to C, who are present inside a captured area 20, are detected, and the coordinates of the centers of the lower edges of rectangular regions in which the subject regions are inscribed (foot coordinates) are output as positions.

Figure 12B:
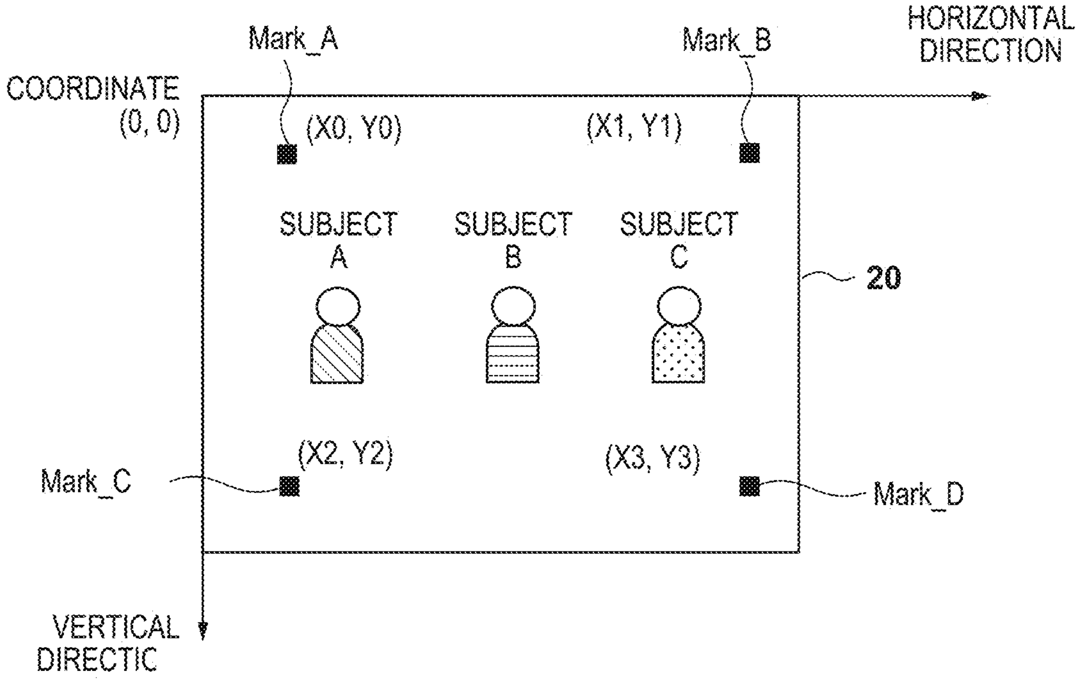

Note, for example, in a case where markers (Marks) are placed at known positions inside the captured area 20 as shown in FIG. 12B for the purpose of later-described coordinate transformation, the CPU 101 detects images of the markers included in the frame image (FIG. 12A), and stores the positions thereof into the RAM 102. The inference unit 104 may be configured to execute the detection of marker images as well. The detection of marker images can be carried out using any known method, such as pattern matching that uses marker templates. Marker images may be detected using a pre-stored machine learning model intended for marker detection.

(2) Next, the coordinate transformation executed by the inference unit 104 will be described. FIG. 12A schematically shows a video of the overhead camera 300, and FIG. 12B schematically shows a state where the captured area 20 is viewed from directly above the center thereof. The inference unit 104 transforms the coordinates of the positions of the subject regions in a coordinate system of the overhead camera into the values of a coordinate system (planar coordinate system) of a case where the captured area 20 is viewed from directly above the center thereof.

Here, the reason why the coordinates are transformed into the values of the planar coordinate system is because the coordinate transformation is convenient for calculation of a pan value for causing the sub cameras 600 to 900 to capture a specific subject (an angle of movement on a horizontal plane). Note that the present description is provided on the premise that the sub cameras 600 to 900 is placed so that the driving unit 409 performs a pan operation on a horizontal plane parallel to the floor of the captured area 20.

The coordinate transformation can be executed using a variety of methods; here, markers are placed at a plurality of known positions on the floor of the captured area 20, and the coordinates of the overhead camera coordinate system are transformed into the coordinates of the planar coordinate system based on the marker positions inside the video obtained from the overhead camera 300. Note that the coordinate transformation may be performed with use of, for example, the viewpoint position and the capture direction of the overhead camera 300, without using markers.

The coordinate transformation can be executed using a homography transformation matrix H in accordance with the following formula 1.

$$\begin{pmatrix} X \\ Y \\ W \end{pmatrix} = H \begin{pmatrix} x \\ y \\ 1 \end{pmatrix} \quad \text{(formula 1)}$$

In formula 1, x and y on the right side are the horizontal coordinate and the vertical coordinate in the overhead camera coordinate system, whereas X and Y on the left side are the horizontal coordinate and the vertical coordinate in the planar coordinate system.

The homography transformation matrix can be calculated by solving simultaneous equations by assigning the coordinates of the four markers detected from the video and the (known) coordinates of the four markers placed in the captured area 20 in formula 1. In a case where the positional relationship between the captured area 20 and the overhead camera 300 is fixed, the homography transformation matrix H can be calculated in advance at the time of test image capture and stored into the ROM 103, for example.

Figure 13B:
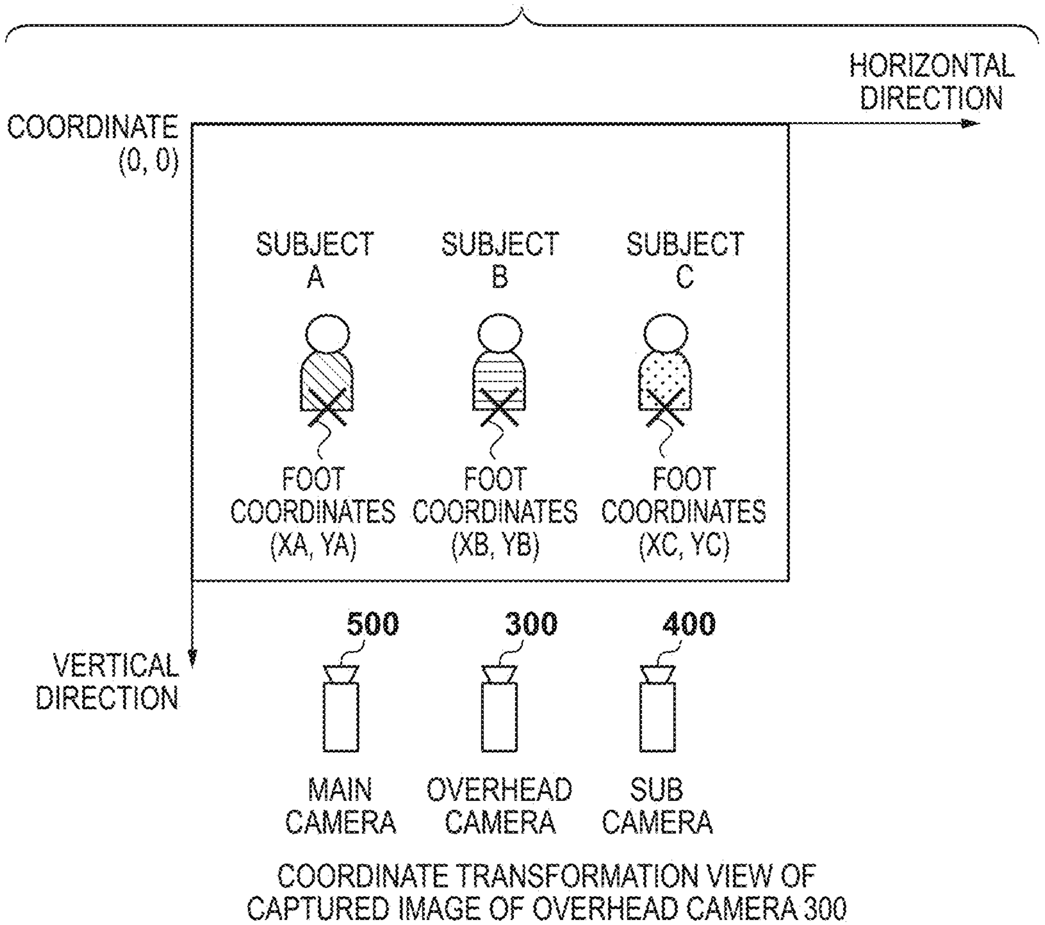

The CPU 101 sequentially reads out the positions of the subject regions from the RAM 102, and transforms the coordinates thereof into the values of the planar coordinate system. FIG. 13B schematically shows a state where the foot coordinates (x, y) of each subject region detected from the video of the overhead camera 300 shown in FIG. 13A have been transformed into the coordinate values (X, Y) of the planar coordinate system with use of formula 1 and the homography transformation matrix H stored in the ROM 103. The CPU 101 stores the foot coordinates obtained through the coordinate transformation as POSITION[n] into the RAM 102.

(3) Next, a description is given of an operation of the inference unit 104 to specify the identification information pieces ID[n] of the subjects. It is assumed here that the subjects are identified using template matching. Subject identification is carried out with respect to the results of subject detection processing that has been executed for the second time onward. With respect to the results of processing that has been executed for the first time, it is sufficient to newly assign identification information pieces ID[n] to the subject regions.

The inference unit 104 specifies identification information pieces ID[n] of the detected subject regions by way of template matching that uses templates stored in the RAM 102. As a result, the subjects inside the captured area are identified. For example, for each of the detected subject regions, the inference unit 104 calculates evaluation values indicating correlations with the individual templates. Then, the inference unit 104 specifies identification information ID[n] corresponding to a template with which it has a correlation equal to or larger than a certain level and it has the highest correlation as identification information ID[n] of the subject region. For example, a known value, such as the sum of absolute differences between pixel values, can be used as an evaluation value.

Note, with respect to a subject region that does not have a correlation equal to or larger than the certain level with any template, the inference unit 104 assigns new identification information ID[n] and adds an image of the subject region as a template.

Also, the inference unit 104 may update existing templates using the subject regions that have been detected in the latest frame image, and may delete a template if a subject region that has a correlation equal to or larger than the certain level therewith does not exist for a certain period. Furthermore, the inference unit 104 may store templates corresponding to identification information pieces ID[n] that frequently appear into the ROM 103.

Note that the subjects may be identified using a method other than template matching. For example, the same identification information ID[n] may be specified for a subject region that is closest, in terms of at least one of the detected position and the size, to an immediately-preceding subject region. Also, a position in the current frame image may be predicted using a Kalman filter or the like based on positional transitions in the plurality of past detection results associated with the same identification information, and the same identification information ID may be specified for a subject region that is closest to the predicted position. Furthermore, these methods may be combined. When template matching is not used, the accuracy of identification of different subjects with similar appearances can be increased.

(4) The inference unit 104 stores the specified identification information pieces ID[n] and the positions (planar coordinate system) POSITION[n] of the corresponding subject regions into the RAM 102 in association with each other.

Note that among the processing of (1) to (4), processing other than the subject detection may be executed by the CPU 101 in place of the inference unit 104.

Here, the identification information pieces ID[n] and the positions POSITION[n] related to the subjects inside the captured area 20 are obtained using the video of the overhead camera 300. However, a video of the sub cameras 600 to 900 may be used. The CPU 101 executes the operations shown in the flowchart of FIG. 11A for each sub camera. The positions of subject regions are output as values of a coordinate system of each sub camera. In this way, the overhead camera 300 is not indispensable, but it is considered that the accuracy of subject detection is higher when the overhead camera 300 is used.

Figure 11A:
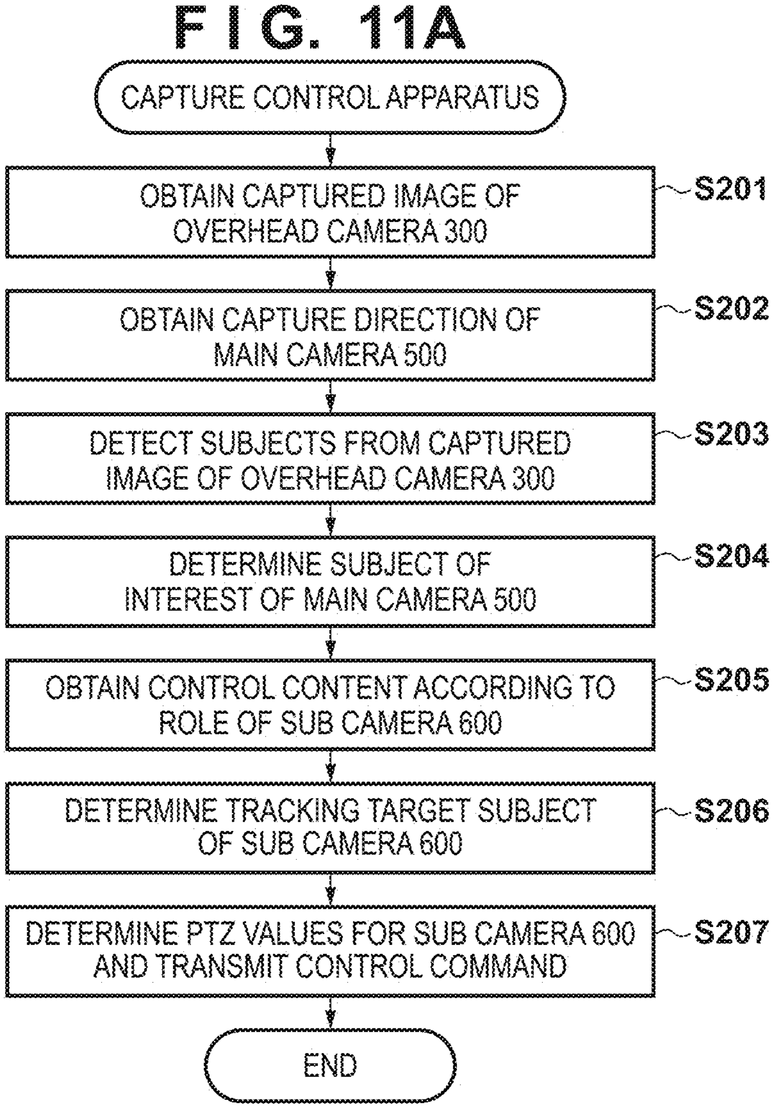
FIGS. 11A to 11D are flowcharts related to the operations of each apparatus in the image capture system according to the third embodiment.

Returning to the description of FIG. 11A, in step S204, the CPU 101 as the subject of interest determination unit 122 of FIG. 8 determines a subject of interest that acts as a tracking target subject of the main camera 500. The CPU 101 can determine the subject of interest of the main camera 500 among the subjects detected in step S203 based on the capture direction of the main camera 500 obtained in step S202. The CPU 101 stores the identification information ID[n] corresponding to the subject region that has been determined as the subject of interest of the main camera 500 as identification information MAIN_SUBJECT of the subject of interest into the RAM 102.

For example, the CPU 101 can determine a subject that is closest to the capture direction of the main camera 500 in the planar coordinate system as the subject of interest of the main camera 500. Note that in a case where there are a plurality of subjects that are at a distance equal to or smaller than a threshold from the capture direction of the main camera 500, the user may select the subject of interest from among such subjects.

In a case where the user selects the subject of interest, the CPU 101 causes the display unit 108 or an external display apparatus to display the frame image to which the subject detection processing has been applied in step S202, together with an indicator that indicates the capture direction and indicators that indicate subject regions that are candidates for the subject of interest. The indicators of the subject regions may be, for example, rectangular frames indicating the outer edges of the subject regions shown in FIG. 13A, or may be other indicators. Furthermore, the CPU 101 may cause the display unit 108 to also display, for example, a message for encouraging a selection of a subject of interest inside the image.

The user can select a subject region corresponding to a desired subject of interest by operating the user input unit 106 (input device). The selection method is not limited in particular, but may be an operation of designating a desired subject region by operating a mouse or a keyboard.

Upon detecting a user operation for designating a subject region, the CPU 101 stores the identification information ID[n] corresponding to the designated subject region as identification information MAIN_SUBJECT of the subject of interest into the RAM 102.

Next, in step S205, the CPU 101 as the tracking target subject determination unit 123 of FIG. 13 obtains content of control CAMERA_ROLE corresponding to the role set on the sub camera 600. Specifically, the CPU 101 reads out content of control CAMERA_ROLE that has been obtained in the role determination processing, which has been described using FIG. 10, and stored in the RAM 102. Note that the CPU 101 executes the processing of steps S205 to S207 for each sub camera.

In step S206, the CPU 101 as the tracking target subject determination unit 123 determines a subject to be tracked and captured by the sub camera 600 in accordance with the content of control CAMERA_ROLE. The CPU 101 determines a tracking target subject of the sub camera 600 in accordance with the provision related to the tracking target subject included in the content of control CAMERA_ROLE (FIG. 9).

In a case where the sub camera 600 is to have a tracking target subject that is the same as the subject of interest of the main camera 500, the CPU 101 sets the identification information MAIN_SUBJECT of the subject of interest that has been determined in step S203 as identification information SUBJECT_ID of the tracking target subject of the sub camera 600.

In a case where a subject located on the left side among the subjects other than the subject of interest of the main camera 500 is to be set as the tracking target subject of the sub camera 600, the CPU 101 detects, among the subject regions detected in step S203, a leftmost subject region among the subject regions other than the subject of interest. Then, the CPU 101 sets the identification information ID[n] corresponding to the detected subject region as identification information SUBJECT_ID of the tracking target subject of the sub camera 600.

The CPU 101 writes the identification information SUBJECT_ID of the determined tracking target subject to the RAM 102. In a case where the tracking target subject can differ among the sub cameras, the CPU 101 stores the identification information pieces SUBJECT_ID of the tracking target subjects in association with the identification information pieces of the sub cameras. Note that in a case where the tracking target subject has changed, the CPU 101 keeps holding information of the previous tracking target subject in the RAM 102 without deleting the same.

Figure 14A:
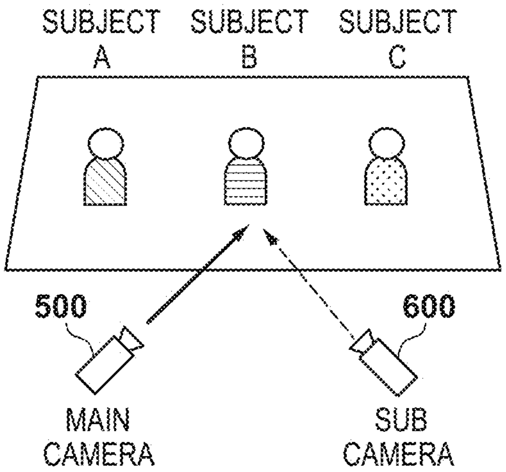
FIGS. 14A to 14C are schematic diagrams of control on the operations of a sub camera according to the third embodiment.
Figure 14B:
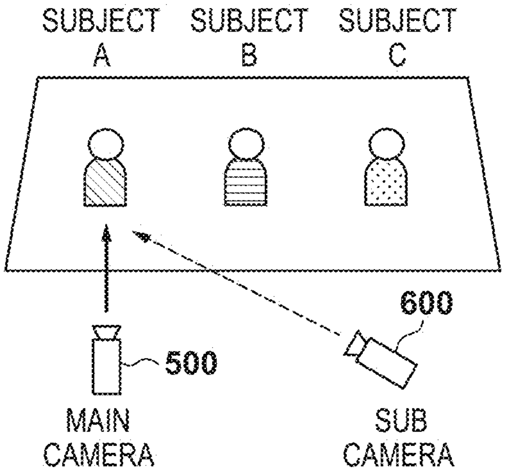
Figure 14C:
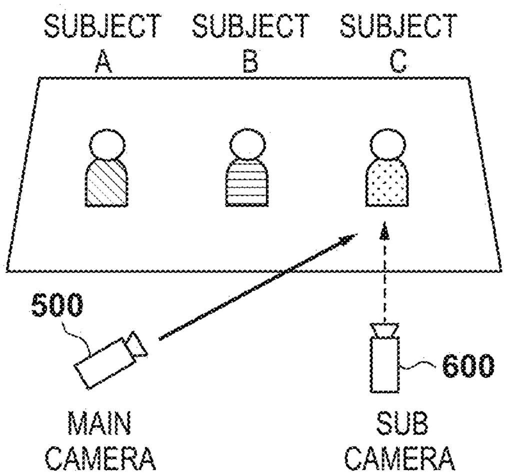

Using FIGS. 14A to 14C, the following describes the operations for a case where the role set on the sub camera 600 is "main follow". With regard to the sub camera 600 on which the role "main follow" is set, the capture control apparatus 100 performs control to track a subject of interest of the main camera 500.

Therefore, in a case where the subject of interest of the main camera 500 has been determined to be the subject B as shown in FIG. 14A, the CPU 101 determines the subject B as a tracking target subject of the sub camera 600. Thereafter, in a case where it has been determined that the subject of interest of the main camera 500 has been changed to the subject A as shown in FIG. 14B, the CPU 101 changes the tracking target subject of the sub camera 600 to the subject A. Similarly, in a case where it has been determined that the subject of interest of the main camera 500 has been changed to the subject C as shown in FIG. 14C, the CPU 101 changes the tracking target subject of the sub camera 600 to the subject C.

Figure 15A:
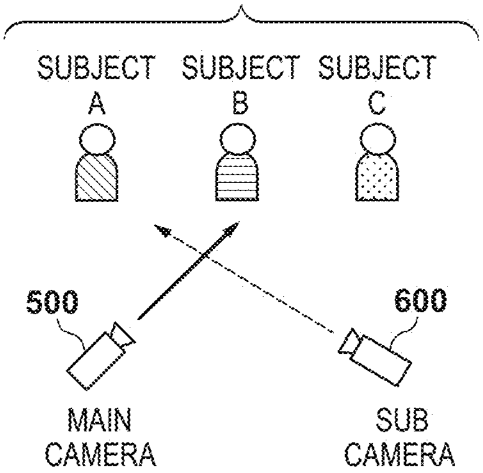
FIGS. 15A to 15C are schematic diagrams of another control on the operations of a sub camera according to the third embodiment.
Figure 15B:
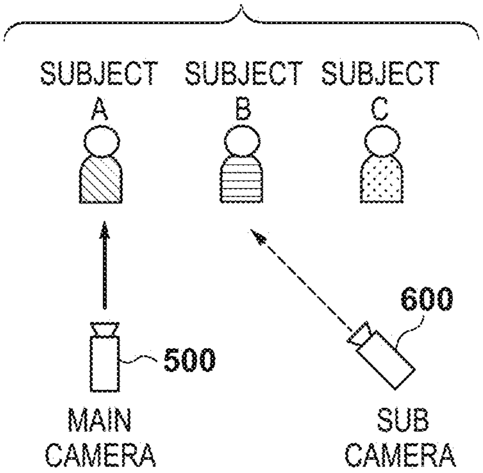
Figure 15C:
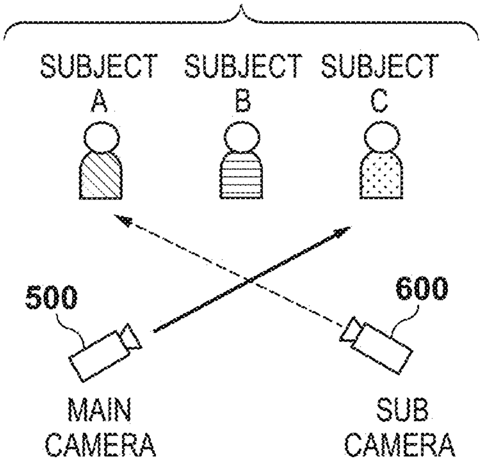

Using FIGS. 15A to 15C, the following describes the operations for a case where the role set on the sub camera 600 is "assist follow". With regard to the sub camera 600 on which the role "assist follow" is set, the capture control apparatus 100 performs control to track a subject located on the left side among subjects other than the subject of interest of the main camera 500.

Therefore, in a case where the subject of interest of the main camera 500 has been determined to be the subject B as shown in FIG. 15A, the CPU 101 determines the left-side subject A among the subjects A and C as a tracking target subject of the sub camera 600. Thereafter, in a case where it has been determined that the subject of interest of the main camera 500 has been changed to the subject A as shown in FIG. 15B, the CPU 101 changes the tracking target subject of the sub camera 600 to the left-side subject B among the subjects B and C. Furthermore, in a case where it has been determined that the subject of interest of the main camera 500 has been changed to the subject C as shown in FIG. 15C, the CPU 101 changes the tracking target subject of the sub camera 600 to the left-side subject A among the subjects A and B.

By dynamically changing the role set on the sub camera 600 with use of the role control apparatus 400, the tracking target subject of the sub camera 600 can be changed, and automatic image capture can be flexibly performed.

Returning to FIG. 11A, in step S207, the CPU 101 as the pan/tilt value calculation unit 124 calculates the amounts of changes in the pan angle and the tilt angle that are necessary for the sub camera 600 to track and capture the tracking target subject that has been determined in step S206. Also, the CPU 101 as the zoom value calculation unit 125 calculates a zoom value of the sub camera 600 corresponding to the change in the angle of view of the main camera 500. In the following, only regarding the sub camera 600 is described; however, the amounts of changes in the pan angle and the tilt angle, as well as the zoom value, are also calculated for the other sub cameras 700 to 900.

First, the operations of the CPU 101 as the pan/tilt value calculation unit 124 will be described. It is assumed here that the following information is stored in advance as predetermined position information REF_POSI in the ROM 103 for each sub camera.

Three-dimensional coordinates of the position of placement (a value in the planar coordinate system)

A capture direction corresponding to the initial values of the pan angle and the tilt angle of the driving unit Range in which the pan and tilt angles can be controlled The CPU 101 reads out position information POSITION_OH corresponding to identification information SUBJECT_ID of the tracking target subject of the sub camera 600 from the RAM 102. Then, the CPU 101 first determines the pan angle from the position information POSITION_OH and the position of placement of the sub camera 600.

Figure 16:
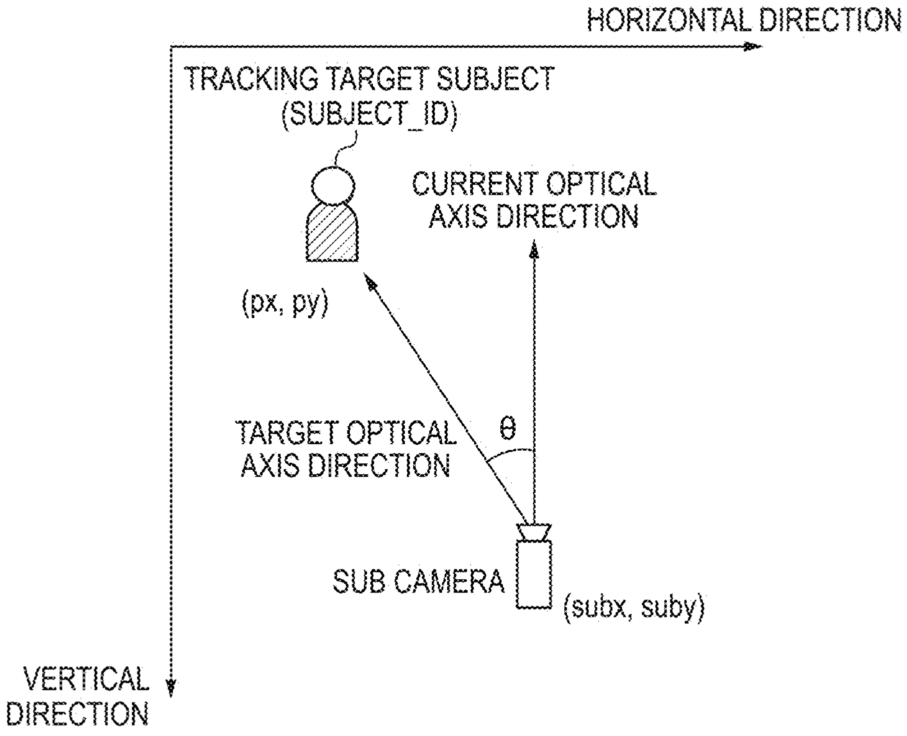
FIG. 16 is a diagram illustrating calculation of a pan value according to an embodiment.

FIG. 16 is a diagram showing an example of a positional relationship between the sub camera 600 and the tracking target subject in the planar coordinate system. It is assumed here that a pan angle θ for pointing the optical axis direction of the sub camera 600 at the subject position is determined. The CPU 101 calculates the pan angle θ using the following formula 2.

$$\theta = \tan^{-1}\frac{px - subx}{py - suby}(\text{rad}) \quad \text{(formula 2)}$$

In formula 2, px and py are the horizontal coordinate and the vertical coordinate of the position information POSITION_OH corresponding to the identification information SUBJECT_ID of the tracking target subject. Also, subx and suby are the horizontal coordinate and the vertical coordinate of the position of placement of the sub camera. It is assumed here that the current pan angle is the initial value 0°, and the optical axis direction is the vertical direction (Y-axis direction). In a case where the current optical axis direction is not the vertical direction, it is sufficient to reflect the angle difference between the current optical axis direction and the vertical direction in the angle obtained from formula 2. Furthermore, the pan direction is the counter-clockwise direction if subx>px, and the clockwise direction if subx<px.

Figure 17:
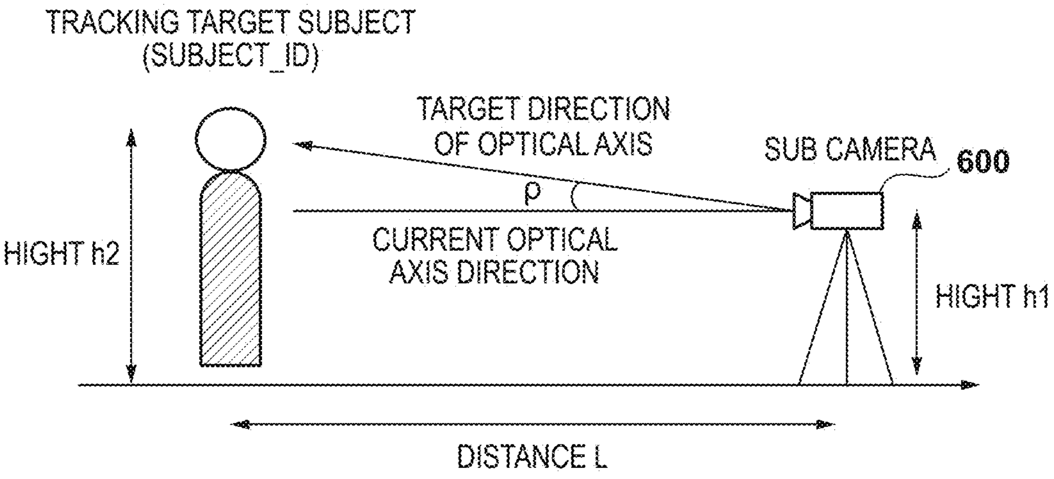
FIG. 17 is a diagram illustrating calculation of a tilt value according to an embodiment.

Next, the method of determination on the tilt angle will be described using FIG. 17. FIG. 17 shows a state where the sub camera and the tracking target subject are viewed from the side. It is assumed that the current optical axis of the sub camera 600 extends in the horizontal direction, the height thereof is h1, and the face of the tracking target subject at which the optical axis is to be pointed is at a height of h2. It is assumed that the angle difference in the height direction between the current optical axis direction and a target optical axis direction (the tilt angle) is ρ. The CPU 101 calculates the tilt angle ρ using the following formula 3 and formula 4.

$$L = \sqrt{(px - subx)^2 + (py - suby)^2} \quad \text{(formula 3)}$$

-continued $$\rho = \tan^{-1}\frac{h2 - h1}{L}(\text{rad}) \quad \text{(formula 4)}$$

The coordinate values used in formula 4 are the same as the coordinate values used in formula 2. It is assumed that h1 and h2 are input to the capture control application and stored into the RAM 102 in advance. In this case, identification numbers that are associated with h2 of the respective subjects are set to be the same as identification numbers assigned in the subject detection processing. Alternatively, a value that has been measured in real time using a non-illustrated sensor may be used as h2.

It is assumed here that the current tilt angle is the initial value 0°, and the optical axis direction is the horizontal direction (the heights are constant). In a case where the current optical axis direction is not the horizontal direction, it is sufficient to reflect the angle difference between the current optical axis direction and the horizontal direction in the angle obtained from formula 4. Furthermore, the tilt direction is a downward direction if h1>h2, and an upward direction if h1<h2.

The CPU 101 cyclically communicates with the sub camera 600 via the communication network 200, obtains the current optical axis direction (the pan angle and the tilt angle of the driving unit), and stores the same into the RAM 102. Note that the communication cycle can be, for example, equal to or smaller than the reciprocal of the frame rate. Alternatively, the CPU 101 may hold the value of the sum total of the pan angles and the tilt angles that have been controlled with respect to the sub camera 600 from the initial state in the RAM 102, and use this value as the current optical axis direction.

The CPU 101 calculates the amounts of changes in the pan angle and the tilt angle of the sub camera 600 in the foregoing manner, and stores them into the RAM 102. Note that for each of the other sub cameras 700 to 900, the CPU 101 also calculates the amounts of changes in the pan angle and the tilt angle.

The amounts of changes in the pan angle and the tilt angle may be an angular velocity for causing the sub camera 600 to turn to the direction of the tracking target subject. For example, the CPU 101 obtains the current pan angle and tilt angle from the sub camera 600 via the communication network 200. Then, the CPU 101 obtains a pan angular velocity proportional to the difference between the pan angle θ that has been read out from the RAM 102 and the current pan angle. Also, the CPU 101 obtains a tilt angular velocity proportional to the difference between the tilt angle ρ that has been read out from the RAM 102 and the current tilt angle. The CPU 101 stores the angular velocities calculated in the foregoing manner into the RAM 102.

Note that the amounts of changes in the pan angle and the tilt angle may be calculated using the video of the sub camera 600 instead of the video of the overhead camera 300. In this case, the CPU 101 may calculate the amount of change in the pan angle from the difference in the horizontal direction between the current optical axis direction and the direction of the tracking target subject in the coordinate system of the sub camera 600, and calculate the amount of change in the tilt angle from the difference in the vertical direction therebetween. Furthermore, in the image capture system, changing of the capture direction for tracking and capturing the tracking target subject may be performed only in one of the pan direction and the tilt direction; in such an image capture system, only the amount of change in one of the pan angle and the tilt angle may be calculated.

Next, the operations of the CPU 101 as the zoom value calculation unit 125 will be described. The CPU 101 as the zoom value calculation unit 125 cyclically obtains information MAIN_ZOOM indicating the angle of view of the main camera 500, and stores the same into the RAM 102. Then, in a case where the information MAIN_ZOOM has been changed, the CPU 101 calculates a zoom value Z_VALUE for the sub camera 600 in accordance with the content of control CAMERA_ROLE corresponding to the role set on the sub camera 600.

Note that the CPU 101 can determine a zoom operation of the main camera 500 and the phase thereof by, for example, detecting a change in the angle of view of the video of the main camera 500. For example, the change in the angle of view may be detected from the sizes of the subject regions, a temporal change in an interval therebetween, and the like.

Figure 18:
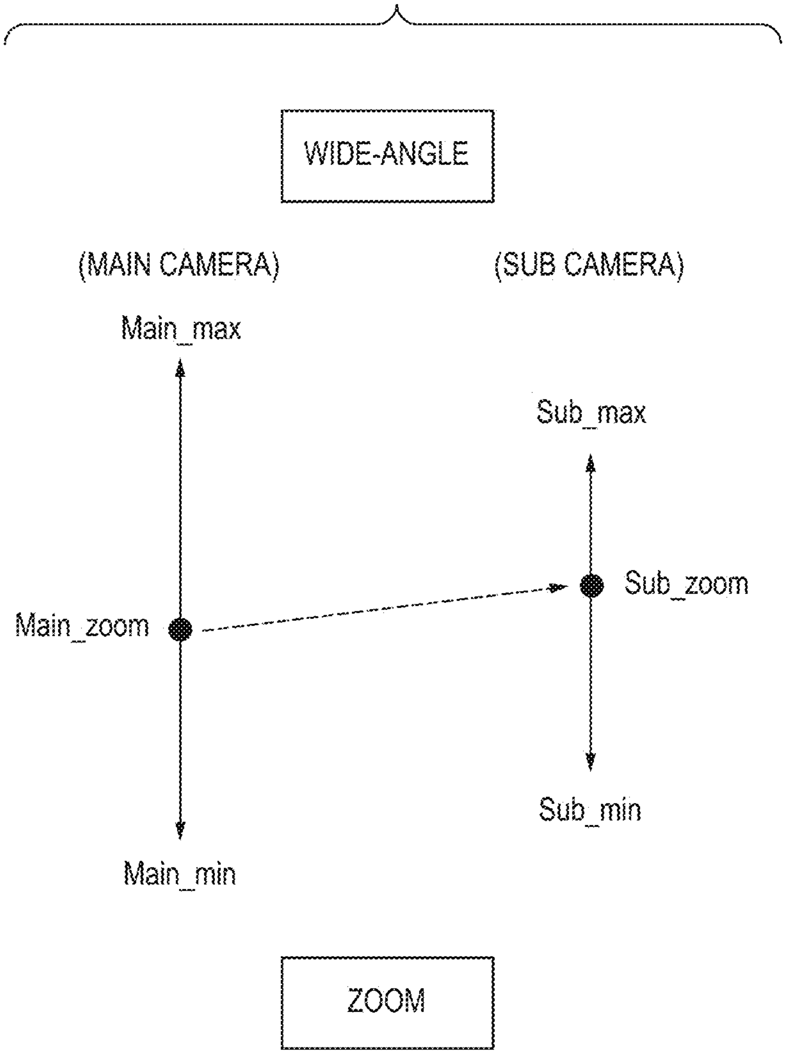
FIG. 18 is a diagram showing an example of mapping of zoom values of a main camera and a sub camera according to an embodiment.

FIG. 18 shows an example of mapping of zoom values of the main camera and the sub camera. It is assumed here that the main camera 500 and the sub cameras 600 to 900 optically change the angle of view (their image capture optical systems have a zoom function). However, a similar function may be realized by way of digital zooming that uses the image processing units 506 and 606.

Note that a zoom value is a parameter that has a value corresponding to the angle of view; in the present embodiment, the zoom value decreases as the angle of view decreases (narrows), and the zoom value on the telephoto side is smaller than the zoom value on the wide-angle side. It is assumed that the sub cameras 600 to 900 and the main camera 500 can control their image capture optical systems to have an angle of view corresponding to a zoom value by transmitting thereto a command designating the zoom value. That is to say, a zoom value is information related to the angle of view, and is information indicating a zoom state. A zoom value may be, for example, a focal length (mm) of the image capture optical system corresponding to a full-size 35-mm image sensor; in this case, the zoom value on the telephoto side is larger than the zoom value on the wide-angle side.

In FIG. 18, the zoom value MAIN_ZOOM of the main camera 500 is in a range of main_min to main_max. Meanwhile, the sub cameras 600 to 900 has a zoom range of sub_min to sub_max. Main_min and sub_min are respectively zoom values corresponding to the telephoto ends of the main camera 500 and the sub cameras 600 to 900, whereas main_max and sub_max are respectively zoom values corresponding to the wide-angle ends of the main camera 500 and the sub cameras 600 to 900. FIG. 18 shows an example in which the range of the zoom value of the main camera 500 is wider than the range of the zoom value of the sub cameras 600 to 900, both on the telephoto end and on the wide-angle end.

In a case where the zoom value SUB_ZOOM of the sub camera 600 is controlled in phase with the zoom value MAIN_ZOOM of the main camera 500, the CPU 101 calculates SUB_ZOOM corresponding to the current MAIN_ZOOM using the following formula 5.

$$\text{SUB\_ZOOM} = \frac{\text{MAIN\_ZOOM} - \text{main\_min}}{\text{main\_max} - \text{main\_min}} \times (\text{sub\_max} - \text{sub\_min}) \quad \text{(formula 5)}$$

On the other hand, in a case where the zoom value SUB_ZOOM of the sub camera 600 is controlled to be antiphase relative to the zoom value MAIN_ZOOM of the main camera 500, SUB_ZOOM corresponding to the current MAIN_ZOOM is calculated using the following formula 6. Specifically, the CPU 101 calculates SUB_ZOOM corresponding to the current MAIN_ZOOM by assigning SUB_ZOOM calculated from formula 5 in the right side of the following formula 6.

$$\text{SUB\_ZOOM} = \text{sub\_max} - (\text{SUB\_ZOOM} - \text{sub\_min}) \quad \text{(formula 6)}$$

In a case where the main camera 500 performs digital zooming and controls the angle of view by way of cropping, the CPU 101 can determine on the zoom value SUB_ZOOM of the sub camera 600 in accordance with the size of the range cropped by the main camera 500. Specifically, the CPU 101 sets the zoom value SUB_ZOOM so that it decreases (achieves a higher magnification factor) as the size of the range to be cropped by the main camera 500 decreases, and sets the zoom value SUB_ZOOM so that it increases (achieves a lower magnification factor) as the size increases.

Furthermore, the content of zoom control associated with a role of the sub cameras 600 to 900 is not limited to control that is in-phase or antiphase relative to the main camera 500. For example, a zoom operation that is independent of a change in the angle of view of the main camera 500 may be associated with a role. For example, an auto-zoom operation that maintains the tracking target subject at a constant size may be associated with a role. Furthermore, the angle of view of the sub cameras 600 to 900 may be fixed at a specific angle of view. Various zoom controls can be performed with respect to the sub cameras 600 to 900 by adding roles associated with the foregoing zoom controls to the contents of control corresponding to the respective roles shown in FIG. 9, or by changing the contents of zoom control corresponding to the roles shown in FIG. 9.

Returning to FIG. 11, in step S207, the CPU 101 reads out the amounts of changes in the pan and tilt angles and the zoom value, which have been calculated in step S206, from the RAM 102. Then, the CPU 101 generates a control command PT_VALUE for instructing the sub camera 600 to make changes equivalent to these amounts of changes to the pan angle and the tilt angle. Also, the CPU 101 generates a control command Z_VALUE for instructing the sub camera 600 to make a change equivalent to the zoom value to the angle of view. It is assumed that the format of the control commands has been determined in advance. The CPU 101 stores the generated control commands PT_VALUE and Z_VALUE into the RAM 102. Note that step S207 may be skipped in a case where the control commands need not be generated, such as a case where the tracking target subject is stationary and a case where the angle of view of the main camera 500 has not changed.

Then, the CPU 101 reads out the control commands PT_VALUE and Z_VALUE from the RAM 102, and transmits them to the communication network 200 via the network I/F 105. The sub camera 600 receives the control commands PT_VALUE and Z_VALUE via the network I/F 605.

The CPU 101 executes the processing from step S201 with respect to the next frame image in the video of the overhead camera 300. Note that the processing shown in FIG. 11A need not necessary be executed on a per-frame basis.

(Operations of Overhead Camera 300)

Figure 11B:
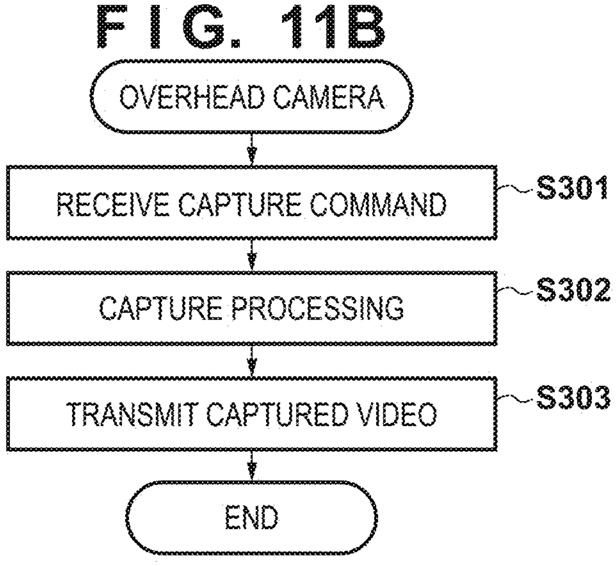

Next, the operations of the overhead camera 300 will be described with reference to FIG. 11B. The operations described below are realized by the CPU 301 executing the program.

When the power of the overhead camera 300 has been turned on, the CPU 301 initializes each functional block, and then a capture standby state begins. In the capture standby state, the CPU 301 may start moving image capture processing for live-view display, and output image data for display generated by the image processing unit 306 to the capture control apparatus 100 via the network I/F 305.

In the capture standby state, the CPU 301 waits for reception of a control command via the network I/F 305. Upon receiving a control command, the CPU 301 executes operations corresponding to the control command. The following describes operations for a case where a capture command has been received as the control command from the capture control apparatus 100.

In step S301, the CPU 301 receives a capture command from the capture control apparatus 100 via the network I/F 305.

Note that in the capture command, such capture parameters as the frame rate and the resolution may be designated. Furthermore, the capture command may include settings related to processing applied by the image processing unit 306.

In step S302, in response to the reception of the capture command, the CPU 301 starts processing for capturing moving images to be supplied to the capture control apparatus 100. In this moving image capture processing, moving images that have higher image quality than those of the moving image capture processing for live-view display are captured. For example, the captured moving images are higher in at least one of the moving image resolution and the capture frame rate than moving images for live-view display. The image processing unit 306 applies processing to the images based on settings for the moving images to be supplied to the capture control apparatus 100. The image processing unit 306 sequentially stores the generated pieces of moving image data into the RAM 302.

In step S303, the CPU 101 reads out the pieces of moving image data from the RAM 302, and transmits them to the capture control apparatus 100 via the network I/F 305. From then on, processing from the image capture to the supply of pieces of moving image data is continued until a control command for stopping the image capture is received.

(Operations of Main Camera 500)

Figure 11C:
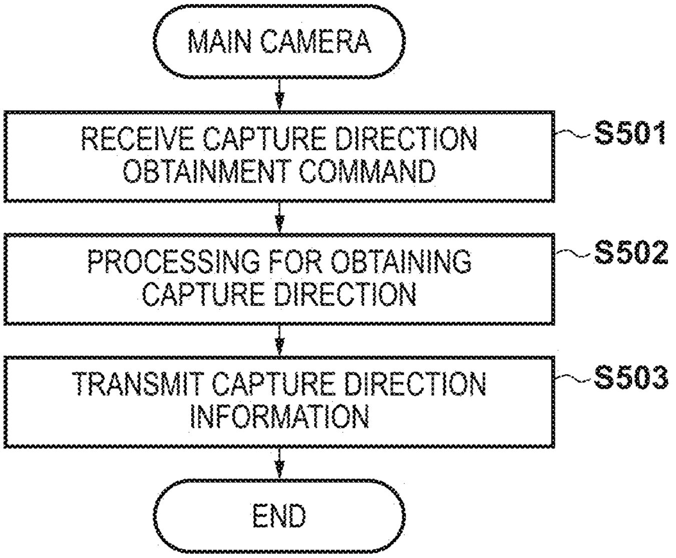

Next, the operations of the main camera 500 will be described with reference to FIG. 11C. The operations described below are realized by the CPU 501 executing the program.

When the power of the main camera 500 has been turned on, the CPU 501 initializes each functional block, and then starts processing for capturing moving images to the supplied to the capture control apparatus 100. The image processing unit 506 applies, to analog image signals obtained from an image sensor 507, processing based on settings for the moving images to be supplied to the capture control apparatus 100. The image processing unit 506 sequentially stores the generated pieces of moving image data into the RAM 502. The CPU 501 reads out the pieces of moving image data from the RAM 502, and supplies them to the capture control apparatus 100 via the network I/F 505.

While supplying the pieces of moving image data to the capture control apparatus 100, the CPU 501 waits for reception of a control command via the network I/F 305. Upon receiving a control command, the CPU 501 executes operations corresponding to the control command. The following describes operations for a case where a capture direction obtainment command has been received. Note that in a case where a pan/tilt control command PT_VALUE or a zoom control command Z_VALUE has been received, the CPU 501 drives the driving unit 509 in accordance with the command.

In step S501, the CPU 501 receives a capture direction obtainment command via the network I/F 505. The CPU 501 stores the received capture direction obtainment command into the RAM 502.

In step S502, in response to the reception of the capture direction obtainment command, the CPU 501 obtains the current pan angle and tilt angle from the driving unit 509 via the driving I/F 508, and stores them into the RAM 502.

In step S503, the CPU 501 reads out the current pan angle and tilt angle from the RAM 502, and transmits them as information ANGLE of the capture direction to the capture control apparatus 100 via the network I/F 305.

(Operations of Sub Camera 600)

Figure 11D:
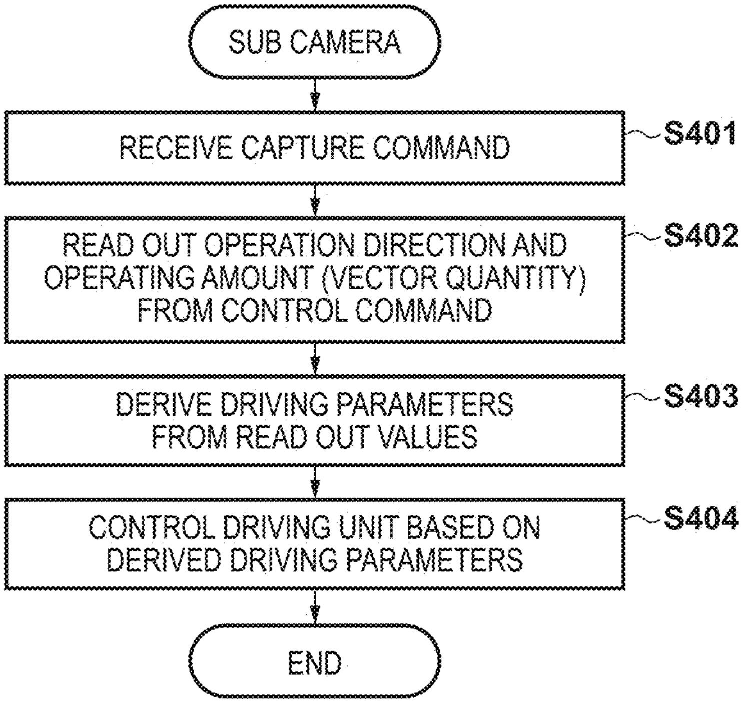

Next, the operations of the sub camera 600 will be described with reference to FIG. 11D. The operations described below are realized by the CPU 601 executing the program. Note that the described operations are also performed by each of the sub cameras 700 to 900.

When the power of the sub camera 600 has been turned on, the CPU 601 initializes each functional block, and then starts processing for capturing moving images to the supplied to the capture control apparatus 100. The image processing unit 606 applies, to analog image signals obtained from an image sensor 607, processing based on settings for the moving images to be supplied to the capture control apparatus 100. The image processing unit 606 sequentially stores the generated pieces of moving image data into the RAM 602. The CPU 601 reads out the pieces of moving image data from the RAM 602, and supplies them to the capture control apparatus 100 via the network I/F 605.

While supplying the pieces of moving image data to the capture control apparatus 100, the CPU 601 waits for reception of a control command via the network I/F 605. Upon receiving a control command, the CPU 601 executes operations corresponding to the control command. The following describes operations for a case where a pan/tilt control command PT_VALUE and a zoom control command Z_VALUE have been received from the capture control apparatus 100.

In step S401, the CPU 601 receives at least one of the pan/tilt control command PT_VALUE and the zoom control command Z_VALUE from the capture control apparatus 100 via the network I/F 605. The CPU 601 stores the received control command into the RAM 602.

In step S402, the CPU 601 reads out an operation direction and a corresponding operation amount (vector quantity) from the control command stored in the RAM 602, and stores them into the RAM 602. Here, in the case of the pan/tilt control command PT_VALUE, the operation direction is the direction(s) of pan and/or tilt, and the operation amount is a target angle. Meanwhile, in the case of the zoom control command Z_VALUE, the operation amount is a zoom value, and it is not necessary to read out and store the operation direction because the operation direction can be specified from the zoom value.

In step S403, the CPU 601 generates driving parameters for the driving unit 609 based on the operation direction and the operation amount that have been read out in step S402. The CPU 601 may obtain, for example, driving parameters corresponding to the combination of the operation direction and the operation amount with use of a table that has been held in the ROM 603 in advance. Note that in a case where the operation amount is provided in the form of a target value (a target angle or zoom value), the CPU 601 obtains driving parameters from the difference from the current value.

In step S404, the CPU 601 drives the driving unit 609 via the driving I/F 608 based on the driving parameters obtained in step S403. Accordingly, the driving unit 609 changes the capture direction of the sub cameras 600 to 900 to the operation direction and the angle designated by the pan/tilt control command PT_VALUE. Also, the driving unit 609 changes the angle of view of the image capture optical system to the zoom value designated by the zoom control command Z_VALUE.

Figure 19:
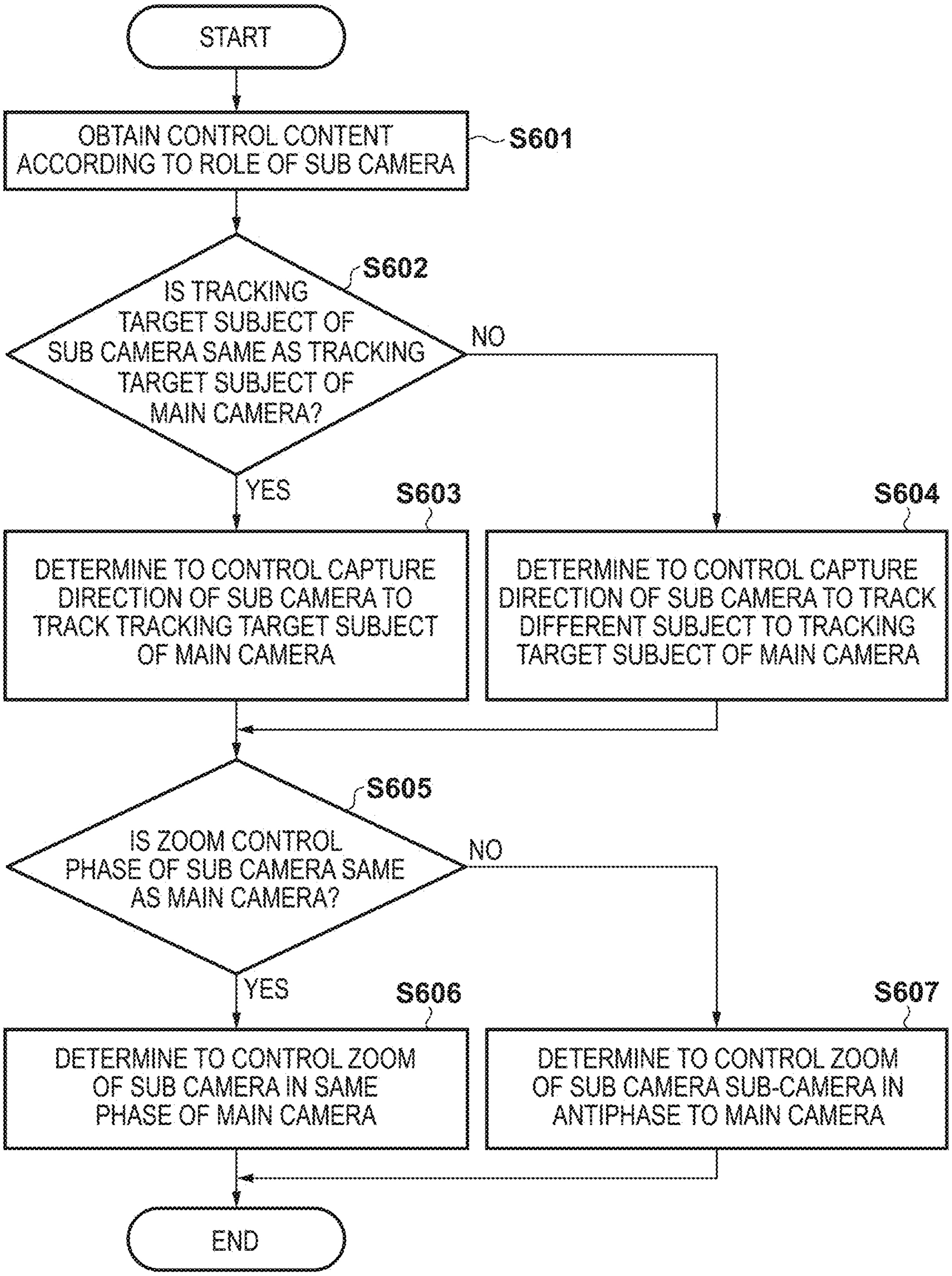
FIG. 19 is a flowchart related to processing for determining the content of control corresponding to a role of a sub camera according to the third embodiment.

Next, the operations of the capture control apparatus 100 to control the capture direction (pan and tilt) and the angle of view (zoom value) of the sub camera in accordance with a role set on the sub camera 600 will be described in more detail using a flowchart shown in FIG. 19. The operations shown in the flowchart of FIG. 19 are executed as a part of the operations of steps S205 to S207 in FIG. 11A. The capture control apparatus 100 also performs the same operations for the sub cameras 700 to 900.

In step S601, which is equivalent to step S205, the CPU 101 reads out the content of control CAMERA_ROLE that has been stored into the RAM 102 in step S103 of FIG. 10.

Steps S602 to S607 are executed in, for example, step S206.

In step S602, the CPU 101 determines whether the provision related to the tracking target subject of the sub camera 600, which is included in the content of control CAMERA_ROLE, indicates the tracking target subject (subject of interest) of the main camera 500. For example, in a case where the provision related to the tracking target subject of the sub camera 600 has a value indicating "same as main", the CPU 101 determines that the provision related to the tracking target subject of the sub camera 600 indicates the tracking target subject of the main camera 500, and executes step S603. On the other hand, in a case where the provision related to the tracking target subject of the sub camera 600 has a value indicating "different from main (left side)", the CPU 101 determines that the provision related to the tracking target subject of the sub camera 600 does not indicate the tracking target subject of the main camera 500, and executes step S604.

In step S603, the CPU 101 determines to control the capture direction of the sub cameras 600 to 900 so as to track the tracking target subject (subject of interest) of the main camera 500.

In step S604, the CPU 101 determines to control the capture direction of the sub camera 600 so as to track a subject located on the left side among subjects other than the subject of interest of the main camera 500.

In step S605, the CPU 101 determines whether the provision related to zoom control on the sub camera 600, which is included in the content of control CAMERA_ROLE, indicates control that is in phase with the main camera 500. For example, in a case where the provision related to zoom control on the sub camera 600 has a value indicating "in phase with main", the CPU 101 determines that the provision related to zoom control on the sub camera 600 indicates control that is in phase with the main camera 500, and executes step S606. On the other hand, in a case where the provision related to zoom control on the sub camera 600 has a value indicating "antiphase relative to main", the CPU 101 determines that the provision related to zoom control on the sub camera 600 does not indicate control that is in phase with the main camera 500, and executes step S607.

In step S606, the CPU 101 determines to control the zoom value (angle of view) of the sub camera 600 in phase with the change in the zoom value of the main camera 500.

In step S607, the CPU 101 determines to control the zoom value (angle of view) of the sub camera 600 so that the control is antiphase relative to the change in the zoom value of the main camera 500.

Figure 20:
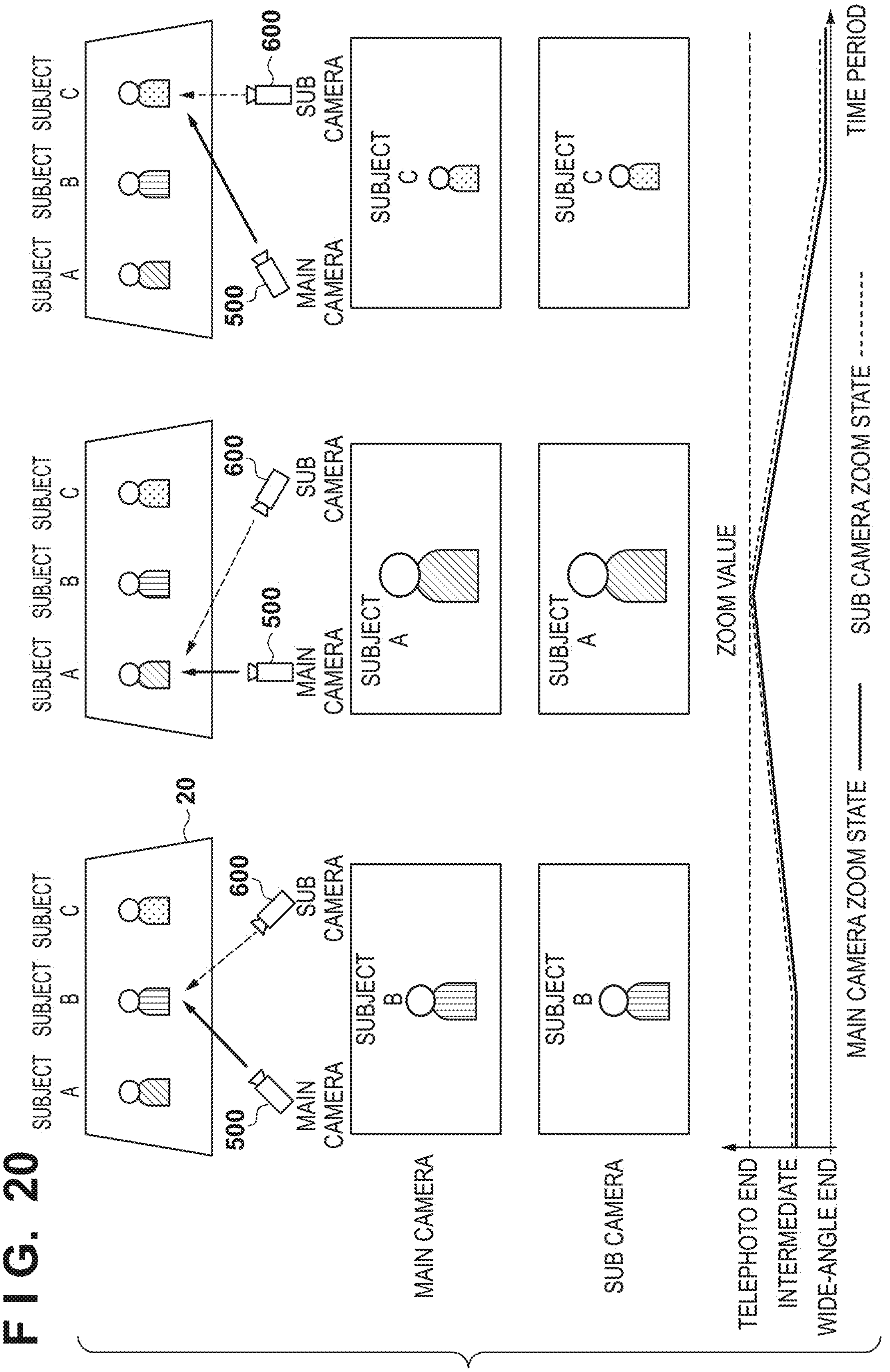
FIG. 20 is a schematic diagram of control corresponding to a role of a sub camera according to the third embodiment.

Using FIG. 20, the following describes an example of control on the sub camera for a case where the role set on the sub camera 600 is "main follow". FIG. 20 schematically shows how the capture control apparatus 100 controls the capture direction and the angle of view of the sub camera 600 in a case where the subject of interest and the angle of view of the main camera 500 change with the passage of time during image capture. In the figure, time elapses from left to the rightward direction. Note that in FIG. 20, a zoom state is indicated in three stages: "telephoto end", "middle", and "wide-angle end". This is because the range of the zoom value can differ between the sub camera and the main camera as shown in FIG. 18. "Telephoto end" corresponds to a state where the camera has zoomed in to the telephoto end, "wide-angle end" corresponds to a state where the camera has zoomed out to the wide-angle end, and "middle" corresponds to a zoom state that is in the middle between "telephoto end" and "wide-angle end"; however, an actual zoom value can differ between the sub camera and the main camera. For example, when the zoom state is "telephoto end", the zoom value of the main camera is main_min, and the zoom value of the sub camera is sub_min.

At first, the subject of interest (tracking target subject) of the main camera 500 is the subject B, and the zoom state thereof is "middle". Therefore, the CPU 101 determines the subject B as the tracking target subject of the sub camera 600, and controls the capture direction so that the sub camera 600 tracks the subject B. Also, the CPU 101 controls the zoom state of the sub camera 600 to be "middle".

Thereafter, the subject of interest of the main camera 500 is changed from the subject B to the subject A, and the zoom state thereof is changed to "telephoto end". In response, the CPU 101 changes the tracking target subject of the sub camera 600 from the subject B to the subject A, and controls the capture direction so that the sub camera 600 tracks the subject A. Furthermore, the CPU 101 controls the zoom state of the sub camera 600 to be "telephoto end".

Thereafter, the subject of interest of the main camera 500 is changed from the subject A to the subject C, and the zoom state thereof is changed to "wide-angle end". In response, the CPU 101 changes the tracking target subject of the sub camera 600 from the subject A to the subject C, and controls the capture direction so that the sub camera 600 tracks the subject C. Furthermore, the CPU 101 controls the zoom state of the sub camera 600 to be "wide-angle end".

As described above, in a case where the role of the sub camera 600 is "main follow", the CPU 101 automatically changes the tracking target subject and the zoom value of the sub camera 600 so as to follow the changes in the subject of interest and the angle of view (zoom value) of the main camera 500. Note that although the extent of the change in the zoom state of the sub camera 600 is controlled to be the same as the extent of the change in the zoom state of the main camera 500 in the example shown in FIG. 20, the actual zoom values may be different as long as the directions of the changes in the zoom values are in phase with each other. For example, when the zoom state of the main camera 500 is the telephoto end, the zoom state of the sub camera 600 may not be the telephoto end. Whether to bring the zoom value of the sub camera 600 in consistency with the zoom value of the main camera 500 may be settable using the role setting information.

Next, an example of control on the sub camera for a case where the role set on the sub camera 600 is "assist counter" will be described using FIG. 21, which is similar to FIG. 20.

At first, the subject of interest (tracking target subject) of the main camera 500 is the subject B, and the zoom state thereof is "telephoto end". Therefore, the CPU 101 determines the left-side subject A, among the subjects A and C other than the subject B, as the tracking target subject of the sub camera 600, and controls the capture direction so that the sub camera 600 tracks the subject A. Furthermore, the CPU 101 controls the zoom state of the sub camera 600 to be "wide-angle end", which is antiphase relative to the main camera 500.

Thereafter, the subject of interest of the main camera 500 is changed from the subject B to the subject A, and the zoom state thereof is changed to "middle". In response, the CPU 101 changes the tracking target subject of the sub camera 600 to the left-side subject B, among the subjects B and C other than the subject A, and controls the capture direction so that the sub camera 600 tracks the subject B. Also, as the zoom state of the main camera 500 has changed from "telephoto end" to "middle", the CPU 101 controls the zoom state of the sub camera 600 to change from "wide-angle end" to "middle" (antiphase).

Thereafter, the subject of interest of the main camera 500 is changed from the subject A to the subject C, and the zoom state thereof is changed to "wide-angle end". In response, the CPU 101 changes the tracking target subject of the sub camera 600 to the left-side subject A, among the subjects A and B other than the subject C, and controls the capture direction so that the sub camera 600 tracks the subject A. Also, as the zoom state of the main camera 500 has changed from "middle" to "wide-angle end", the CPU 101 controls the zoom state of the sub camera 600 to change from "middle" to "telephoto end" (antiphase).

As described above, in a case where the role of the sub camera 600 is "assist counter", the CPU 101 automatically changes the tracking target subject of the sub camera 600 to one of subjects other than the subject of interest of the main camera 500 in response to a change in the subject of interest of the main camera 500. Furthermore, the CPU 101 automatically changes the zoom value of the sub camera 600 in the direction opposite to the change in the angle of view (zoom value) of the main camera 500.

Figure 21:
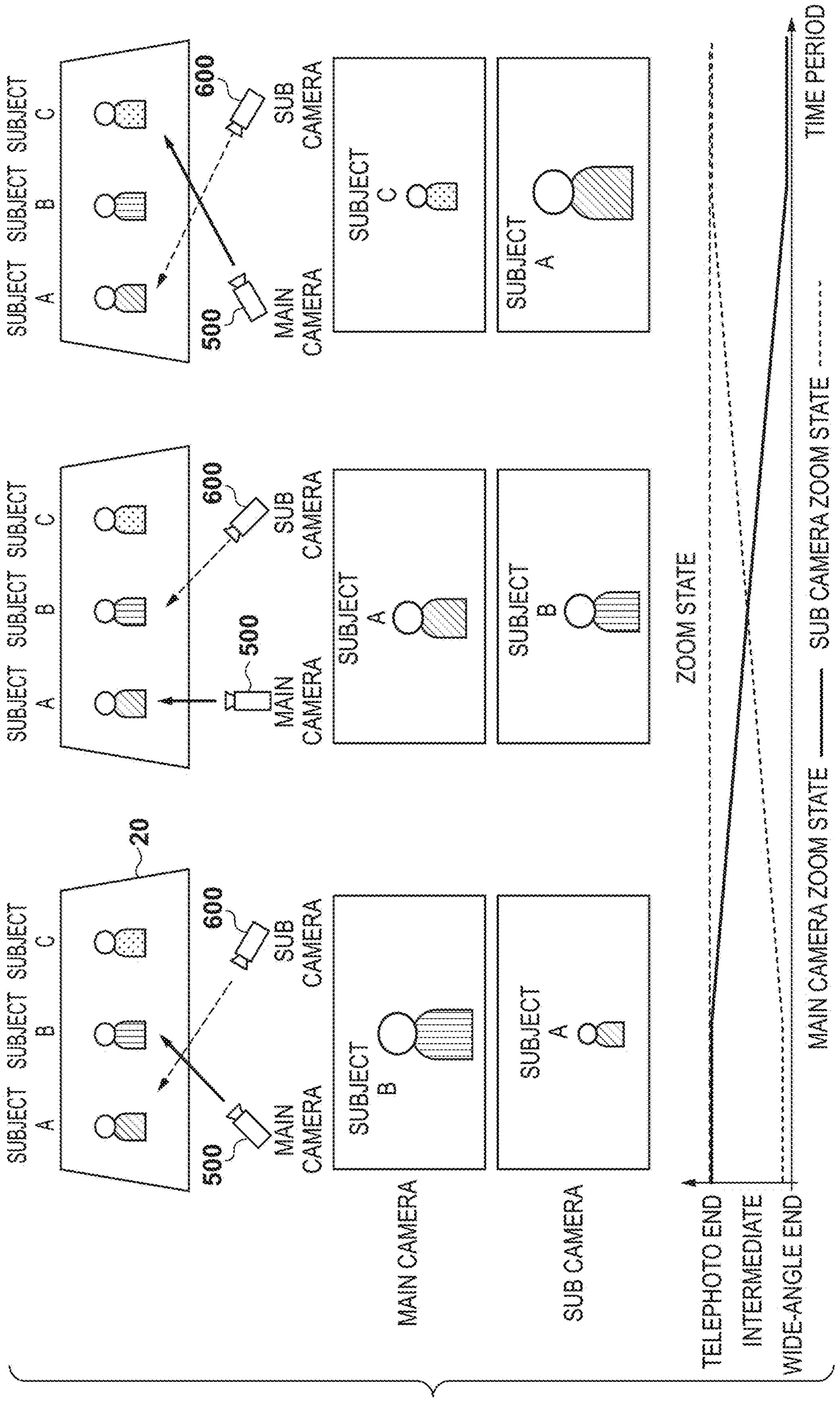
FIG. 21 is a schematic diagram of control corresponding to a role of a sub camera according to the third embodiment.

Note that although the zoom state of the sub camera 600 is controlled in such a manner that the extent of the change therein is the same as the extent of the change in the zoom state of the main camera 500 in the example shown in FIG. 21, the amounts of changes in the zoom values may be different as long as the directions of the changes in the zoom values are antiphase. For example, when the zoom state of the main camera 500 is the telephoto end, the zoom state of the sub camera 600 may not be the wide-angle end. The extent of the change in the zoom state of the sub camera 600 relative to the extent of the change in the zoom state of the main camera 500 may be settable using the role setting information.

Modification Example

The above has described an example in which the tracking target subject and the zoom value of the sub camera 600 are automatically controlled based on the subject of interest and the zoom value of the main camera 500. In the above-described example, automatic control is performed so that the sub camera tracks a single subject; however, it is also possible to perform automatic control so that the sub camera tracks a plurality of subjects inside the captured area.

Figure 22:
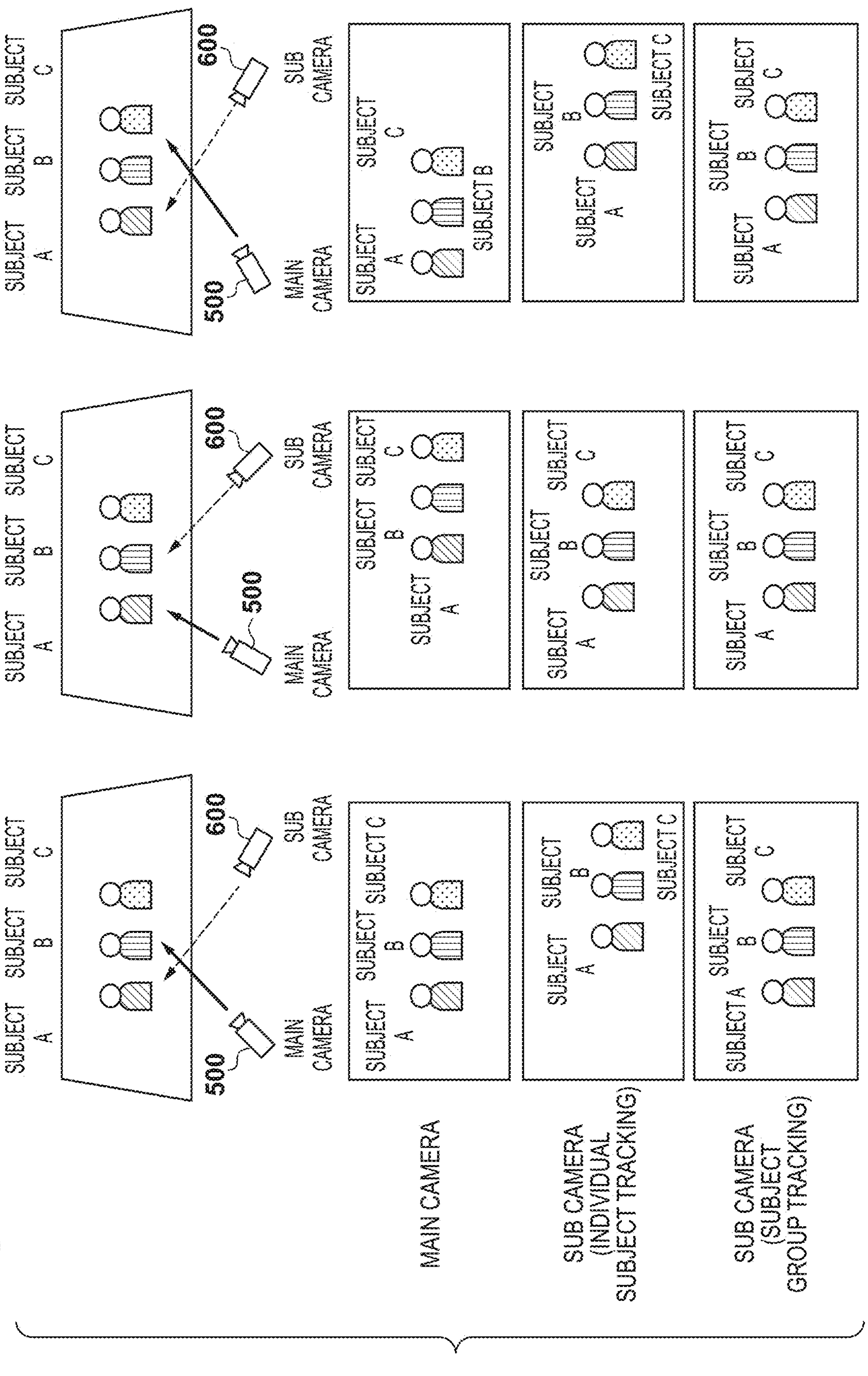
FIG. 22 is a schematic diagram of an operation of tracking a plurality of subjects according to a modification example of the third embodiment.

Using FIG. 22, a description is now given of an example of control for a case where the sub camera 600 tracks a single subject and a case where it tracks a plurality of subjects when the role set on the sub camera 600 is "assist follow". For ease of understanding and explanation, the following describes a case where the angle of view of the main camera 500 does not change, and only control on tracking target subjects is executed. Also, it is assumed that the angle of view of the sub camera 600 allows all of the subjects inside the captured area 20 to be captured at all times irrespective of the capture direction. Note that the capture directions of the sub camera 600 shown in the topmost level of FIG. 22 indicate the capture directions for a case where a single subject is tracked.

Similarly to FIG. 21, at first, the subject of interest (tracking target subject) of the main camera 500 is the subject B. Therefore, the CPU 101 determines the left-side subject A, among the subjects A and C other than the subject B, as the tracking target subject of the sub camera 600, and controls the capture direction so that the sub camera 600 tracks the subject A. If the capture direction is controlled so that the tracking target subject is positioned at the center of the screen, the subjects A to C in the video of the sub camera 600 are crowded together on the right, and thus poorly balanced, as shown in the second level from the bottom. In view of this, in a case where the video of the sub camera 600 includes a plurality of subjects including the tracking target subject, the capture direction can be controlled so as to track these plurality of subjects. For example, the CPU 101 can control the capture direction so as to track the mass center of the positions of the plurality of subjects A to C included in the video of the sub camera 600. As a result, the sub camera 600 captures a video shown in the lowermost level.

According to the example shown in FIG. 22, no matter which one of the subjects A to C is tracked by the sub camera 600, all of the subjects A to C are captured, and thus the capture direction of the sub camera 600 is substantially constant even if the subject of interest of the main camera 500 has changed.

Second Modification Example

Furthermore, after the tracking target subject of the sub camera 600 has been determined, the CPU 101 may control the sub camera 600 to focus on the tracking target subject. Although the CPU 601 basically controls the focusing distance on a continual basis in the sub camera 600 so as to focus on the designated tracking target subject, the capture control apparatus 100 can set an AF frame of the sub camera 600 at the position of the tracking target subject. This allows the sub camera 600 to focus on the tracking target subject quickly and reliably. Note that setting the AF frame when the pan speed has become slow (equal to or smaller than a threshold) has a possibility of reducing the time period required to achieve focus because there is a high possibility that the tracking target is positioned at the center of the screen.

Third Modification Example

Furthermore, the sub camera 600 can be controlled without using the overhead camera 300. In this case, the capture direction of the sub camera 600 can be determined from the positions of placement of the main camera 500 and the sub camera 600, and the capture direction of the main camera 500 (the direction in which the main camera 500 is facing the tracking target subject). The main camera 500 executes the subject detection processing, and the CPU 101 obtains and uses the results of the subject detection processing; as a result, the sub camera 600 can be controlled. For example, the CPU 101 obtains images of subject regions from the main camera 500 as the results of the subject detection processing. Then, the CPU 101 can control the sub camera 600 so as to execute subject tracking processing that uses the obtained images as templates. Alternatively, the CPU 101 may use the obtained images as templates, and control the sub camera 600 so as to track a subject region that has a low degree of correlation with the templates.

Fourth Modification Example

Although the capture control apparatus 100 and the role control apparatus 400 have been described as apparatuses that are independent from the main camera 500, it is also possible to embed the functions of the capture control apparatus 100 and the role control apparatus 400 in the main camera 500. In this case, the video of the overhead camera 300 is supplied to the main camera 500. This configuration can reduce the number of devices necessary to realize the multi-camera image capture system.

As described above, according to the present embodiment, when the operations of the sub camera are automatically controlled based on the state and the video of the main camera, automatic control corresponding to the role set on the sub camera is executed. Therefore, the capture control apparatus of the present embodiment can realize automatic capture control with a higher degree of freedom while saving labor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-168870, filed Sep. 28, 2023, which is hereby incorporated by reference herein in its entirety.

What is claimed is:

1. A capture control apparatus, comprising:

one or more processors that execute a program stored in a memory and thereby function as:

a control unit configured to control capture directions and angles of view of two or more sub cameras, among a plurality of cameras including a main camera and the sub cameras, based on roles set on the sub cameras and on a subject of interest and an angle of view of the main camera; and a determination unit configured to determine whether the main camera satisfies a predetermined condition, wherein in a case where it has been determined that the main camera satisfies the condition, the control unit selects at least one of the sub cameras, and changes content of control for the selected sub camera so as to track and capture the subject of interest of the main camera under a setting different from a setting of the main camera, wherein the determination unit makes the determination with respect to a plurality of conditions that include one or more of:

one or more conditions related to luminance of a video captured by the main camera;

one or more conditions related to one of more of luminance, a position, a moving speed, a size, and a depth of field of a subject region in the video captured by the main camera;

one or more conditions related to a movement of the main camera; and one or more conditions related to white balance of the main camera, wherein the control unit causes a type of a setting that is different between the selected sub camera and the main camera to vary in accordance with a condition that is satisfied by the main camera among the plurality of conditions, and wherein in a case where the main camera satisfies a condition related to the luminance of the video captured by the main camera or the luminance of the subject region, the control unit causes a setting of an exposure amount of the selected sub camera to be different from a setting of an exposure amount of the main camera.

2. The capture control apparatus according to claim 1, wherein in a case where it has been determined that the main camera satisfies the condition, the control unit controls the angle of view of the selected sub camera in phase with the angle of view of the main camera.

3. The capture control apparatus according to claim 1, wherein in a case where the main camera satisfies a condition related to one of more of the position, the moving speed, and the size of the subject region, the control unit causes a setting of the angle of view of the selected sub camera to be different from a setting of the angle of view of the main camera.

4. The capture control apparatus according to claim 1, wherein in a case where the main camera satisfies a condition related to the depth of field, the control unit causes a setting of an f-number of the selected sub camera to be different from a setting of an f-number of the main camera.

5. The capture control apparatus according to claim 1, wherein in a case where the main camera satisfies a condition related to the movement of the main camera, the control unit causes a setting of a shutter speed and/or capture sensitivity of the selected sub camera to be different from a setting of a shutter speed and/or capture sensitivity of the main camera.

6. The capture control apparatus according to claim 1, wherein in a case where the main camera satisfies a condition related to the white balance, the control unit causes a setting of white balance of the selected sub camera to be different from a setting of the white balance of the main camera.

7. The capture control apparatus according to claim 1, wherein the control unit selects a sub camera that has been set in advance from among the sub cameras.

8. The capture control apparatus according to claim 1, wherein the control unit selects a sub camera other than a sub camera that is currently capturing a video selected by an external apparatus from among the sub cameras.

9. The capture control apparatus according to claim 1, wherein the control unit selects a sub camera capable of performing image capture with a composition similar to a composition of the main camera from among the sub cameras.

10. The capture control apparatus according to claim 9, wherein the sub camera capable of performing image capture with the composition similar to the composition of the main camera is a sub camera which is capable of capturing an area that includes every subject captured by the main camera, and which is capable of capturing the subject in such a manner that a difference between a size of the captured subject and a size of the subject in the video of the main camera is equal to or smaller than a threshold.

11. The capture control apparatus according to claim 9, wherein the sub camera capable of performing image capture with the composition similar to the composition of the main camera is a sub camera which is placed at a position closest to the main camera, which is at a distance equal to or shorter than a threshold from the main camera, and which has an image capture optical system with a range of a focal length that overlaps with a range of a focal length of an image capture optical system of the main camera by at least a threshold percentage.

12. The capture control apparatus according to claim 1, wherein in a case where the sub cameras do not include a sub camera capable of performing image capture with a composition similar to a composition of the main camera, the control unit selects a sub camera with a lowest predetermined priority order from among the sub cameras.

13. The capture control apparatus according to claim 1, wherein in a case where the control unit has selected a plurality of sub cameras, the control unit causes content of control to vary with each of the selected sub cameras.

14. A capture control method executed by a capture control apparatus, the capture control method comprising:

controlling capture directions and angles of view of two or more sub cameras, among a plurality of cameras including a main camera and the sub cameras, based on roles set on the sub cameras and on a subject of interest and an angle of view of the main camera; and determining whether the main camera satisfies a predetermined condition, wherein the controlling includes selecting at least one of the two or more sub cameras in a case where it has been determined that the main camera satisfies the condition, and changing content of control for the selected sub camera so as to track and capture the subject of interest of the main camera under a setting different from a setting of the main camera, wherein the determining makes the determination with respect to a plurality of conditions that include one or more of:

one or more conditions related to luminance of a video captured by the main camera;

one or more conditions related to one of more of luminance, a position, a moving speed, a size, and a depth of field of a subject region in the video captured by the main camera;

one or more conditions related to a movement of the main camera; and one or more conditions related to white balance of the main camera, wherein the controlling further includes causing a type of a setting that is different between the selected sub camera and the main camera to vary in accordance with a condition that is satisfied by the main camera among the plurality of conditions, and in a case where the main camera satisfies a condition related to the luminance of the video captured by the main camera or the luminance of the subject region, causing a setting of an exposure amount of the selected sub camera to be different from a setting of an exposure amount of the main camera.

15. A capture control apparatus, comprising:

one or more processors that execute a program stored in a memory and thereby function as:

a control unit configured to control a capture direction and an angle of view of each of a plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state, and wherein in a case where contents of control on the angle of view associated with the roles set on the camera in the first state and the selected camera match and an amount of angle-of-view adjustment necessary for the selected camera to include, in a captured area, subjects to be captured by the selected camera and the camera in the first state is equal to or smaller than a threshold, the control unit changes the content of control for the selected camera so that the selected camera captures a video in which the subjects to be captured are included in the captured area in accordance with the roles set on the selected camera and the camera in the first state.

16. The capture control apparatus according to claim 15, wherein in a case where contents of control on the angle of view associated with the roles set on the camera in the first state and the selected camera do not match, the control unit changes the content of control for the selected camera to content of control that conforms with the role set on the camera in the first state.

17. The capture control apparatus according to claim 15, wherein in a case where contents of control on the angle of view associated with the roles set on the camera in the first state and the selected camera match and an amount of angle-of-view adjustment necessary for the selected camera to include, in a captured area, subjects to be captured by the selected camera and the camera in the first state is not equal to or smaller than a threshold, if a distance between the subject to be captured by the selected camera and the subject to be captured by the camera in the first state is shorter than a threshold, the control unit changes the content of control for the selected camera so that the selected camera captures the subject to be captured by the selected camera and the subject to be captured by the camera in the first state alternatingly in accordance with the roles set on the selected camera and the camera in the first state.

18. The capture control apparatus according to claim 15, wherein in a case where contents of control on the angle of view associated with the roles set on the camera in the first state and the selected camera match and an amount of angle-of-view adjustment necessary for the selected camera to include, in a captured area, subjects to be captured by the selected camera and the camera in the first state is not equal to or smaller than a threshold, if a distance between the subject to be captured by the selected camera and the subject to be captured by the camera in the first state is not shorter than a threshold, the control unit changes the content of control for the selected camera to content of control that conforms with the role set on the camera in the first state.

19. The capture control apparatus according to claim 15, wherein the determination unit determines a camera that autonomously performs image capture different from a role set thereon as the camera in the first state.

20. The capture control apparatus according to claim 15, wherein the determination unit determines a camera in which an abnormality has been detected as the camera in the first state.

21. The capture control apparatus according to claim 15, wherein the determination unit determines a camera in which an operation performed by a unit that is not under management by the control unit has been detected as the camera in the first state.

22. The capture control apparatus according to claim 15, wherein the control unit selects, from among cameras that are included among the plurality of cameras and are other than the camera in the first state, a camera which is similar to the camera in the first state in position and capability, and which has a predetermined priority order lower than a predetermined priority order of the camera in the first state.

23. The capture control apparatus according to claim 22, wherein the camera that is similar to the camera in the first state in position and capability is a camera whose position of placement is at a distance shorter than a threshold from a position of placement of the camera in the first state, and whose pan and tilt driving range and zoom range each have an overlap at a predetermined percentage or more.

24. The capture control apparatus according to claim 15, wherein in a case where cameras that are included among the plurality of cameras and are other than the camera in the first state do not include a camera that is similar to the camera in the first state in position and capability, the control unit selects, from among cameras on which the same role as the camera in the first state has been set, a camera whose predetermined priority order is the lowest among the plurality of cameras and is lower than a predetermined priority order of the camera in the first state.

25. The capture control apparatus according to claim 15, wherein in a case where a main camera that is different from the plurality of cameras exists, the control unit controls the capture directions and the angles of view of the plurality of cameras based on the roles that have been respectively set on the plurality of cameras, and on a subject of interest and an angle of view of the main camera.

26. The capture control apparatus according to claim 15, wherein in a case where it has been determined that the camera in the first state exists, the control unit notifies a user of the existence.

27. A capture control, comprising:

one or more processors that execute a program stored in a memory and thereby function as:

a control unit configured to control a capture direction and an angle of view of each of a plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state, and wherein in a case where cameras that are included among the plurality of cameras and are other than the camera in the first state include neither a camera that is similar to the camera in the first state in position and capability, nor a camera on which the same role as the camera in the first state has been set, the control unit selects a camera which has a lowest predetermined priority order among the plurality of cameras, and which is not the camera in the first state.

28. A capture control method executed by a capture control apparatus, the capture control method comprising:

controlling a capture direction and an angle of view of each of a plurality of cameras based on at least roles that have been respectively set on the plurality of cameras; and determining whether a camera in a first state that is not performing an operation associated with the role set thereon exists among the plurality of cameras, wherein the controlling includes selecting at least one of cameras that are included among the plurality of cameras and are other than the camera in the first state in a case where it has been determined that the camera in the first state exists, changing content of control for the selected sub camera so as to execute image capture that supplements a video to be captured by the camera in the first state, and in a case where contents of control on the angle of view associated with the roles set on the camera in the first state and the selected camera match and an amount of angle-of-view adjustment necessary for the selected camera to include, in a captured area, subjects to be captured by the selected camera and the camera in the first state is equal to or smaller than a threshold, changing the content of control for the selected camera so that the selected camera captures a video in which the subjects to be captured are included in the captured area in accordance with the roles set on the selected camera and the camera in the first state.

29. An image capture system, comprising:

a capture control apparatus; and a plurality of cameras that are connected to the capture control apparatus in a communication-enabled manner, wherein the capture control apparatus comprises:

one or more processors that execute a program stored in a memory and thereby function as:

a control unit configured to control capture directions and angles of view of two or more sub cameras, among the plurality of cameras including a main camera and the sub cameras, based on roles set on the sub cameras and on a subject of interest and an angle of view of the main camera; and a determination unit configured to determine whether the main camera satisfies a predetermined condition, wherein in a case where it has been determined that the main camera satisfies the condition, the control unit selects at least one of the sub cameras, and changes content of control for the selected sub camera so as to track and capture the subject of interest of the main camera under a setting different from a setting of the main camera, wherein the determination unit makes the determination with respect to a plurality of conditions that include one or more of:

one or more conditions related to luminance of a video captured by the main camera;

one or more conditions related to one of more of luminance, a position, a moving speed, a size, and a depth of field of a subject region in the video captured by the main camera;

one or more conditions related to a movement of the main camera; and one or more conditions related to white balance of the main camera, wherein the control unit causes a type of a setting that is different between the selected sub camera and the main camera to vary in accordance with a condition that is satisfied by the main camera among the plurality of conditions, and wherein in a case where the main camera satisfies a condition related to the luminance of the video captured by the main camera or the luminance of the subject region, the control unit causes a setting of an exposure amount of the selected sub camera to be different from a setting of an exposure amount of the main camera.

30. An image capture system, comprising:

a capture control apparatus; and a plurality of cameras that are connected to the capture control apparatus in a communication-enabled manner, wherein the capture control apparatus comprises:

one or more processors that execute a program stored in a memory and thereby function as:

a control unit configured to control a capture direction and an angle of view of each of the plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state, and wherein in a case where contents of control on the angle of view associated with the roles set on the camera in the first state and the selected camera match and an amount of angle-of-view adjustment necessary for the selected camera to include, in a captured area, subjects to be captured by the selected camera and the camera in the first state is equal to or smaller than a threshold, the control unit changes the content of control for the selected camera so that the selected camera captures a video in which the subjects to be captured are included in the captured area in accordance with the roles set on the selected camera and the camera in the first state.

31. A non-transitory computer-readable medium storing a program for causing a computer to function as a capture control apparatus that comprises:

a control unit configured to control capture directions and angles of view of two or more sub cameras, among a plurality of cameras including a main camera and the sub cameras, based on roles set on the sub cameras and on a subject of interest and an angle of view of the main camera; and a determination unit configured to determine whether the main camera satisfies a predetermined condition, wherein in a case where it has been determined that the main camera satisfies the condition, the control unit selects at least one of the sub cameras, and changes content of control for the selected sub camera so as to track and capture the subject of interest of the main camera under a setting different from a setting of the main camera, wherein the determination unit makes the determination with respect to a plurality of conditions that include one or more of:

one or more conditions related to luminance of a video captured by the main camera;

one or more conditions related to one of more of luminance, a position, a moving speed, a size, and a depth of field of a subject region in the video captured by the main camera;

one or more conditions related to a movement of the main camera; and one or more conditions related to white balance of the main camera, wherein the control unit causes a type of a setting that is different between the selected sub camera and the main camera to vary in accordance with a condition that is satisfied by the main camera among the plurality of conditions, and wherein in a case where the main camera satisfies a condition related to the luminance of the video captured by the main camera or the luminance of the subject region, the control unit causes a setting of an exposure amount of the selected sub camera to be different from a setting of an exposure amount of the main camera.

32. A non-transitory computer-readable medium storing a program for causing a computer to function as a capture control apparatus that comprises:

a control unit configured to control a capture direction and an angle of view of each of a plurality of cameras based on at least roles that have been respectively set on the plurality of cameras; and a determination unit configured to determine whether a camera in a first state that is not performing an operation associated with the role set thereon exists among the plurality of cameras, wherein in a case where it has been determined that the camera in the first state exists, the control unit selects a camera other than the camera in the first state from among the plurality of cameras, and changes content of control for the selected sub camera so as to execute image capture that supplements a video to be captured by the camera in the first state and wherein in a case where contents of control on the angle of view associated with the roles set on the camera in the first state and the selected camera match and an amount of angle-of-view adjustment necessary for the selected camera to include, in a captured area, subjects to be captured by the selected camera and the camera in the first state is equal to or smaller than a threshold, the control unit changes the content of control for the selected camera so that the selected camera captures a video in which the subjects to be captured are included in the captured area in accordance with the roles set on the selected camera and the camera in the first state.

* * * * *